United States Patent
Seike et al.

(10) Patent No.: US 7,391,301 B2
(45) Date of Patent: Jun. 24, 2008

(54) ANTITHEFT DEVICE, MONITORING DEVICE AND ANTITHEFT SYSTEM

(75) Inventors: Yasushi Seike, Kobe (JP); Naoki Sakai, Kobe (JP); Yoshihiko Maeno, Kobe (JP); Satoru Kishimoto, Kobe (JP)

(73) Assignee: Fujitsu Ten Limited, Kobe (JP)

( * ) Notice: Subject to any disclaimer, the term of this patent is extended or adjusted under 35 U.S.C. 154(b) by 550 days.

(21) Appl. No.: 10/819,214

(22) Filed: Apr. 7, 2004

(65) Prior Publication Data

US 2004/0263323 A1 Dec. 30, 2004

(30) Foreign Application Priority Data

Apr. 14, 2003 (JP) ............................. 2003-108723
Jul. 18, 2003 (JP) ............................. 2003-199420

(51) Int. Cl.
*G60R 25/10* (2006.01)

(52) U.S. Cl. .................... 340/426.1; 340/428; 340/429; 340/937; 340/426.26; 340/5.1; 340/5.2; 340/5.52; 340/5.72

(58) Field of Classification Search .............. 340/426.1, 340/428, 429, 937, 426.26, 5.1, 5.2, 5.52, 340/5.53, 5.72, 5.8, 5.81, 5.82

See application file for complete search history.

(56) References Cited

U.S. PATENT DOCUMENTS

| | | | |
|---|---|---|---|
| 5,315,285 A | * | 5/1994 | Nykerk .................. 340/426.23 |
| 6,950,020 B2 | * | 9/2005 | Shimamoto et al. .... 340/539.16 |
| 2004/0188164 A1 | * | 9/2004 | Maeno et al. ................ 180/287 |

FOREIGN PATENT DOCUMENTS

| | | |
|---|---|---|
| JP | A 11-007561 | 1/1999 |
| JP | A 2000-231691 | 8/2000 |

\* cited by examiner

*Primary Examiner*—Daryl C Pope
(74) *Attorney, Agent, or Firm*—Oliff & Berridge, PLC

(57) ABSTRACT

The present invention teaches an antitheft device whereby the detection accuracy of an unauthorized intruder into a vehicle can be improved, comprising a section for judging whether or not there is an approaching object T toward a vehicle M based on information obtained from a surround monitoring sensor for monitoring the surround of the vehicle M, a section for judging whether or not the approaching object T toward the vehicle M is a suspicious person based on information obtained from a motion sensor for monitoring the periphery and/or the inside of the vehicle M when it is judged that there is an approaching object T toward the vehicle M, and a section for conducting processing such as lighting-on of an indicator when the approaching object T toward the vehicle M is judged to be a suspicious person.

42 Claims, 30 Drawing Sheets

ANTITHEFT DEVICE, MONITORING DEVICE AND ANTITHEFT SYSTEM

BACKGROUND OF THE INVENTION

1. Field of the Invention

The present invention relates to an antitheft device, a monitoring device and an antitheft system and, more particularly, to an antitheft device for preventing vehicle theft, a monitoring device for monitoring a vehicle and an antitheft system.

2. Description of the Relevant Art

Both the number of cases and the incidence of theft such as vehicle theft and theft from a vehicle are tending upward. Therefore, in recent years, various antitheft devices for preventing vehicle theft (including theft from a vehicle) have been proposed (for example, Japanese Kokai No. 1999-7561 and No. 2000-231691).

FIG. 29 is a block diagram schematically showing the principal part of an antitheft system comprising a conventional antitheft device. Reference numeral 1 in the figure represents an antitheft device, comprising a microcomputer 2 including a CPU 3, and a ROM 4 and a RAM 5, an EEPROM 6 in which an ID code preset for each vehicle, and a receiving section 7 for receiving signals (signals including an ID code) sent from a portable transmitter 13 an authorized driver carries with him/her.

The microcomputer 2 is connected to a door open/closed state detection sensor 8 for detecting the open/closed state of doors, a door locked state detection sensor 9 for detecting the locked/unlocked state of the doors, an intrusion detection sensor 10 for detecting intruding objects into a vehicle, an audible alarm generator 11 for generating an audible alarm and a communication device 12 for reporting to the police, a security company or the like.

The microcomputer 2 sets or cancels an arming mode for being on the alert for vehicle theft and the like, based on a signal sent from the portable transmitter 13, the ID code stored in the EEPROM 6, the open/closed state of the doors and the locked/unlocked state thereof.

For example, when a proper ID code, or the ID code stored in the EEPROM 6 is received with all the doors locked, the arming mode is selected. On the other hand, when the proper ID code is received with all the doors unlocked, the arming mode is canceled.

When an intruder into the vehicle is detected by the intrusion detection sensor 10 with the arming mode set, the microcomputer 2 controls the audible alarm generator 11 so as to generate an audible alarm, or controls the communication device 12 so as to report the occurrence of vehicle theft to a security company or the like. Thus, by sounding an alarm or reporting to a security company or the like when an intruder into the vehicle was detected by the intrusion detection sensor 10, it appears to become possible to restrict damage to a minimum even if the damage was caused by vehicle theft or the like.

As a conventional intruder detection sensor, a vibration sensor for detecting breaking of glass and a sensor for ultrasonically detecting the motion of a person who intruded into the vehicle without authorization are exemplified, but there is a possibility that these sensors frequently cause errors in detection. For example, a cat walking on the vehicle roof or a person who passed by the vehicle might be detected as an intruder.

In order to reduce such errors in detection, the sensitivity of these sensors may be set lower, but the lower sensitivity might have the opposite effect of being incapable of detecting an intruder to be detected.

As described above, by sounding an alarm or reporting to a security company or the like when an intruder into the vehicle was detected by the intrusion detection sensor 10, it appears to become possible to minimize damage even if the damage was caused by vehicle theft or the like.

However, modi operandi of thefts have been sophisticated, for example, they wait for an alarm to stop, or they previously work for preventing an alarm from sounding. Therefore, antitheft devices having higher effects of crime prevention have been required. And it is also extremely important to appropriately monitor approaching objects toward the vehicle for the prevention of theft.

SUMMARY OF THE INVENTION

The present invention was developed in order to solve the above problem, and it is an object of the present invention to provide an antitheft device whereby the detection accuracy of an unauthorized intruder into a vehicle can be improved, an antitheft device having higher effects of crime prevention, a monitoring device which can appropriately monitor the vehicle, and an antitheft system having higher effects of crime prevention.

In order to achieve the above object, an antitheft device according to the first aspect of the present invention is characterized by being an antitheft device for protecting a vehicle from theft, comprising a first approaching object judgment section for judging whether or not there is an approaching object toward the vehicle based on information obtained from a surround monitoring unit for monitoring the surround of the vehicle, a first suspicious person judgment section for judging whether or not the approaching object toward the vehicle is a suspicious person based on information obtained from a periphery monitoring unit for monitoring the periphery and/or the inside of the vehicle when it is judged that there is an approaching object toward the vehicle by the first approaching object judgment section, and a first processing section for conducting a first predetermined processing when the approaching object toward the vehicle is judged to be a suspicious person by the first suspicious person judgment section.

Using the antitheft device according to the first aspect of the present invention, not only whether or not the object being present around the vehicle (e.g. within the range of about 0-1 m) is a suspicious person (for example, if the detected period of the object by the periphery monitoring unit is long, it can be determined that the object is hanging or doing some activity around the vehicle), but also whether or not the object came closer to the surround of the vehicle (e.g. within the range of about 1-30 m) is judged, and whether or not the object being present around the vehicle is a suspicious person is judged. As a result, it is possible to make the judgment with good accuracy.

An antitheft device according to the second aspect of the present invention is characterized by comprising a monitoring start controller for allowing the periphery monitoring unit to start monitoring when it is judged that there is an approaching object toward the vehicle by the first approaching object judgment section in the antitheft device according to the first aspect of the present invention.

Using the antitheft device according to the second aspect of the present invention, when it is judged that there is an approaching object toward the vehicle, the monitoring with the periphery monitoring unit is started, resulting in a reduction in power consumption.

An antitheft device according to the third aspect of the present invention is characterized by comprising a first stolen state judgment section for judging whether or not the vehicle has been in a stolen state based on the judgment result by the first suspicious person judgment section and information obtained from a theft detector for detecting a theft of the vehicle, and a second processing section for conducting a second predetermined processing when it is judged that the vehicle has been in a stolen state by the first stolen state judgment section in the antitheft device according to the first or second aspect of the present invention.

Using the antitheft device according to the third aspect of the present invention, whether or not the vehicle has been in a stolen state is judged in consideration of not only the information obtained from the theft detector (such as an impact detection sensor for detecting an impact applied to the vehicle, a tilting detection sensor for detecting a tilt of the vehicle and a vibration detection sensor for detecting vibrations of the vehicle) but also the information about whether or not the approaching object toward the vehicle is a suspicious person, so that the judgment can be made with good accuracy.

An antitheft device according to the fourth aspect of the present invention is characterized by being an antitheft device for protecting a vehicle from theft, comprising a second approaching object judgment section for judging whether or not there is an approaching object toward the vehicle based on information obtained from a periphery monitoring unit for monitoring the periphery and/or the inside of the vehicle, a monitored subject controller which allows detection of the presence or absence of a possibility that the approaching object is a human to be included in subjects to be monitored by the periphery monitoring unit when it is judged that there is an approaching object toward the vehicle by the second approaching object judgment section, a second suspicious person judgment section for judging whether or not the approaching object is a suspicious person based on the judgment result by the second approaching object judgment section and information obtained from the periphery monitoring unit whose subjects to monitor include the detection of the presence or absence of a possibility that the approaching object is a human, and a third processing section for conducting a third predetermined processing when the approaching object toward the vehicle is judged to be a suspicious person by the second suspicious person judgment section.

Using the antitheft device according to the fourth aspect of the present invention, whether or not the approaching object toward the vehicle is a suspicious person is judged in consideration of not only the information regarding the presence or absence of the approaching object toward the vehicle but also the information about whether or not there is a possibility that the approaching object is a human, so that the judgment can be made with good accuracy.

Both the information which forms a basis for the judgment on whether or not there is an approaching object toward the vehicle and the information which forms a basis for the judgment on whether or not there is a possibility that the approaching object is a human are obtained from the periphery monitoring unit, so that no other monitoring unit is required, resulting in a reduction in cost.

An antitheft device according to the fifth aspect of the present invention is characterized by the monitored subject controller which controls the periphery monitoring unit so as to be able to detect whether or not the approaching object is breathing in the antitheft device according to the fourth aspect of the present invention.

Using the antitheft device according to the fifth aspect of the present invention, whether or not there is a possibility that the approaching object is a human is judged by detecting whether or not the approaching object is breathing using the periphery monitoring unit, so that the judgment can be made with good accuracy. Here, as the periphery monitoring unit in this case, a radio wave sensor is exemplified. In cases where the radio wave sensor is adopted as the periphery monitoring unit, the sensor is allowed to capture only signals of frequencies of 100 Hz or less (for example, detect an object producing motions of about 5 cm/sec) when there is no approaching object toward the vehicle so as to detect the presence or absence of an approaching object toward the vehicle. On the other hand, when there is an approaching object toward the vehicle, the sensor is allowed to capture only signals of frequencies of 1 Hz or less (for example, detect the motion of the chest of about 2 mm/sec) so as to detect whether or not the approaching object toward the vehicle is breathing.

An antitheft device according to the sixth aspect of the present invention is characterized by the periphery monitoring unit which is a body temperature detector, the second approaching object judgment section which judges whether or not there is an approaching object toward the vehicle from the temperature conditions around and/or inside the vehicle based on information obtained from the body temperature detector being the periphery monitoring unit, and the monitored subject controller which controls the periphery monitoring unit so as to be able to detect whether or not the approaching object is producing motions specific to a suspicious person in the antitheft device according to the fourth aspect of the present invention.

Using the antitheft device according to the sixth aspect of the present invention, whether or not there is a possibility that the approaching object is a human is judged by detecting whether or not the approaching object is producing motions specific to a suspicious person using the periphery monitoring unit, so that the judgment can be made with good accuracy. Here, as the body temperature detector being the periphery monitoring unit in this case, an infrared ray sensor is exemplified. In cases where the infrared ray sensor is adopted as the periphery monitoring unit, less sensing elements are actuated when there is no approaching object toward the vehicle so as to detect the presence or absence of an approaching object toward the vehicle (for example, detect an object of 35-40° C.). On the other hand, when there is an approaching object toward the vehicle, increased sensing elements are actuated so as to detect the motions of the approaching object, resulting in a reduction in power consumption.

An antitheft device according to the seventh aspect of the present invention is characterized by being an antitheft device for protecting a vehicle from theft, comprising a third suspicious person judgment section for judging whether or not an approaching object toward the vehicle is a suspicious person from judging whether or not the motions of the approaching object are motions specific to a suspicious person based on pictorial data obtained from a picture-taking unit for taking pictures of the periphery of the vehicle, and a fourth processing section for conducting a fourth predetermined processing when the approaching object toward the vehicle is judged to be a suspicious person by the third suspicious person judgment section.

A person who simply passes by a vehicle with no intention to steal hardly moves vertically to the vehicle and only moves horizontally thereto. In other words, there is a high possibility that an object moving vertically to the vehicle (or whose vertical movement is large) is a theft. Using the antitheft device according to the seventh aspect of the present invention, whether or not the approaching object toward the vehicle is a suspicious person is judged from the movement of the approaching object, so that the judgment can be made with good accuracy.

An antitheft device according to the eighth aspect of the present invention is characterized by being an antitheft device for protecting a vehicle from theft, comprising a second stolen state judgment section for judging whether or not the vehicle has been in a stolen state, and a fifth processing section for conducting a fifth predetermined processing when it is judged that the vehicle has been in a stolen state by the second stolen state judgment section, wherein the second stolen state judgment section judges whether or not the vehicle has been in a stolen state based on information obtained from a tilting detector for detecting the degree of tilt of the vehicle.

As vehicle theft, a stolen vehicle is taken from the scene of the theft by driving the vehicle itself in some cases, and by using a wrecker or the like in other cases. In the case of loading a vehicle onto a wrecker, the vehicle will inevitably tilt greatly in any direction unless the vehicle is handled very carefully.

Using the antitheft device according to the eighth aspect of the present invention, whether or not the vehicle has been in a stolen state is judged based on the information obtained from the tilting detector for detecting the degree of tilt of the vehicle, so that it is possible to appropriately detect even the vehicle theft using a wrecker or the like.

An antitheft device according to the ninth aspect of the present invention is characterized by being an antitheft device for protecting a vehicle from theft, comprising a second stolen state judgment section for judging whether or not the vehicle has been in a stolen state, and a fifth processing section for conducting a fifth predetermined processing when it is judged that the vehicle has been in a stolen state by the second stolen state judgment section, wherein the second stolen state judgment section judges whether or not the vehicle has been in a stolen state based on information obtained from an impact detector for detecting the degree of an impact applied to the vehicle.

As described above, as vehicle theft, a stolen vehicle is taken from the scene of the theft by driving the vehicle itself in some cases, and by using a wrecker or the like in other cases. In the case of loading a vehicle onto a wrecker, the vehicle will be inevitably given a great impact unless the vehicle is handled very carefully.

Using the antitheft device according to the ninth aspect of the present invention, whether or not the vehicle has been in a stolen state is judged based on the information obtained from the impact detector for detecting the degree of an impact applied to the vehicle, so that it is possible to appropriately detect even the vehicle theft using a wrecker or the like.

An antitheft device according to the tenth aspect of the present invention is characterized by the second stolen state judgment section which judges whether or not the vehicle has been in a stolen state based on information obtained from the tilting detector or the impact detector and information about the velocity of the vehicle in the antitheft device according to the eighth or ninth aspect of the present invention.

Many of wreckers are of the type in which not the whole of a vehicle to be carried is loaded on a platform, but only the front portion thereof is loaded on the platform without the rear portion thereof being loaded on the platform. Therefore, rear wheels of the vehicle are on the road and as the wrecker moves, the rear wheels thereof rotate. As a result, it becomes possible to acquire information about the velocity of the vehicle from the revolutions of the rear wheels thereof.

Using the antitheft device according to the tenth aspect of the present invention, whether or not the vehicle has been in a stolen state is judged based on the information obtained from the tilting detector or the impact detector and the information about the velocity of the vehicle, so that it is possible to detect even the vehicle theft using a wrecker or the like with better accuracy.

An antitheft device according to the eleventh aspect of the present invention is characterized by being an antitheft device for protecting a vehicle from theft, comprising a biometric information storage section for storing biometric information about the body of an authorized user of the vehicle, a first authorized user judgment section for judging whether or not a person desiring to use the vehicle is the authorized user of the vehicle based on information obtained from a biometric information acquisition unit for acquiring information about the body of the person desiring to use the vehicle and the biometric information stored in the biometric information storage section, and a sixth processing section for conducting a sixth predetermined processing based on the judgment result by the first authorized user judgment section.

Using the antitheft device according to the eleventh aspect of the present invention, authentication of whether or not the person is the authorized user of the vehicle is conducted based on the biometric information about the body (such as a fingerprint, a voice print or a face), so that the person desiring to use the vehicle does not have to possess something special for authentication. And since people have their own fingerprints, voice print and the like, the use thereof leads to an improvement in security.

An antitheft device according to the twelfth aspect of the present invention is characterized by comprising a third approaching object judgment section for judging whether or not there is an approaching object toward the vehicle based on information obtained from a periphery monitoring unit for monitoring the periphery and/or the inside of the vehicle, and a unit starting controller for starting a unit used for biometric authentication based on the judgment result by the third approaching object judgment section in the antitheft device according to the eleventh aspect of the present invention.

Using the antitheft device according to the twelfth aspect of the present invention, when it is judged that there is an approaching object toward the vehicle, the operation of a unit used for biometric authentication (such as the biometric information acquisition unit) is started, resulting in a reduction in power consumption. And only by approaching the vehicle (or without touching a door knob, or without operating a wireless key or a smart key), the biometric authentication can be performed, so that the authentication activity can be smoothly conducted. Here, as such non-contact biometric authentication, face authentication using a camera or the like, vein authentication, iris authentication, retina authentication and voiceprint authentication are exemplified (almost all except for fingerprint authentication are adaptable).

An antitheft device according to the thirteenth aspect of the present invention is characterized by the sixth processing section which cancels an arming mode for being on the alert for vehicle theft and/or at least unlocks a driver's seat side door when the person desiring to use the vehicle is judged to be the authorized user of the vehicle by the first authorized user judgment section in the antitheft device according to the eleventh or twelfth aspect of the present invention.

Using the antitheft device according to the thirteenth aspect of the present invention, when the person desiring to use the vehicle is determined to be the authorized user of the vehicle as a result of the authentication based on the biometric information about the body, the arming mode is canceled or at least the driver's seat side door is unlocked (all the doors may be unlocked), so that the user can smoothly get on the vehicle.

An antitheft device according to the fourteenth aspect of the present invention is characterized by the sixth processing section which inhibits the use of all of or part of units mounted on the vehicle, or all of or part of functions of the units when the person desiring to use the vehicle is judged not to be the authorized user of the vehicle by the first authorized user judgment section in the antitheft device according to the eleventh or twelfth aspect of the present invention.

Using the antitheft device according to the fourteenth aspect of the present invention, when the person desiring to use the vehicle is determined not to be the authorized user of the vehicle as a result of the authentication based on the biometric information about the body, the use of all of or part of the units mounted on the vehicle, or all of or part of the functions thereof, is inhibited, leading to improved security.

An antitheft device according to the fifteenth aspect of the present invention is characterized by the first authorized user judgment section which judges whether or not the person desiring to use the vehicle is the authorized user of the vehicle based on at least one item of two or more items of biometric information about the body, and the sixth processing section which permits the use of all of or part of units mounted on the vehicle, or all of or part of functions of the units when the person desiring to use the vehicle is judged to be the authorized user of the vehicle by the first authorized user judgment section in the antitheft device according to the eleventh or twelfth aspect of the present invention.

At present, authentication techniques based on information about the body have many imperfect portions. Therefore, for example, even if a person desiring to use the vehicle is the authorized user of the vehicle, the person is not admitted as the authorized user in some cases. Using the antitheft device according to the fifteenth aspect of the present invention, since the authentication is conducted based on two or more items of biometric information about the body (such as a fingerprint and a voice print), the possibility of the authorized user of the vehicle being admitted as the authorized user can be improved.

When the authentication is conducted based on two items of biometric information about the body, there is a risk that different authentication results are obtained therefrom, for example, the person is admitted as the authorized user in one authentication, while in the other authentication, the person is not admitted as the authorized user. However, using the antitheft device according to the fifteenth aspect of the present invention, when the person is determined to be the authorized user based on at least one item of information about the body, the use of all of or part of the units, or all of or part of the functions thereof, is permitted, so that it is possible to avoid the occurrence of situations where the authorized user is not permitted to use the units at all. In reverse, it is possible to limit the use of the units by a person who might be an unauthorized user.

A monitoring device according to the first aspect of the present invention is characterized by being a monitoring device for monitoring a vehicle to detect the occurrence of abnormal conditions of the vehicle, comprising a fourth approaching object judgment section for judging whether or not there is an approaching object toward the vehicle based on information obtained from a surround monitoring unit for monitoring the surround of the vehicle, and a second picture-taking start controller for allowing a picture-taking unit for taking pictures of the surround of the vehicle to start taking pictures based on the judgment result by the fourth approaching object judgment section.

Using the monitoring device according to the first aspect of the present invention, whether or not there is an approaching object toward the vehicle is judged based on the information obtained from the surround monitoring unit for monitoring the surround of the vehicle (e.g. within the range of about 1-30 m), and when it is judged that there is an approaching object toward the vehicle, the picture taking of the surround of the vehicle is started by the picture-taking unit. As a result, it is possible to take pictures of objects giving damage on the vehicle (such as another vehicle or a human). Therefore, it becomes possible to determine who caused a hit-and-run accident, for example.

And it is difficult to operate the picture-taking unit such as a camera all the time during stop of the vehicle because of its high power consumption, but since the picture taking by the picture-taking unit is started when the approaching object is detected, the above problem can be solved.

A monitoring device according to the second aspect of the present invention is characterized by comprising an another vehicle judgment section for judging whether or not the approaching object is another vehicle, wherein the second picture-taking start controller allows the taking-picture unit to start taking pictures when the approaching object is judged to be another vehicle by the another vehicle judgment section in the monitoring device according to the first aspect of the present invention.

Using the monitoring device according to the second aspect of the present invention, when it is judged that the approaching object is another vehicle, the picture taking by the picture-taking unit is started. In other words, when the approaching object is not another vehicle but a human, the picture taking by the picture-taking unit is not started. Therefore, the picture taking is performed only in cases where greater damage is caused (or the picture taking is more necessary), resulting in a reduced power consumption.

As a method for judging whether or not the approaching object is another vehicle, a method is exemplified, wherein the velocity of the approaching object is found based on information obtained from the surround monitoring unit and the approaching object is judged to be another vehicle when the velocity thereof is 20 km/h or higher.

A monitoring device according to the third aspect of the present invention is characterized by comprising a first approaching situation calculation section for finding the approaching situation of the approaching object toward the vehicle based on information obtained from the surround monitoring unit and/or information obtained from pictorial data taken by the picture-taking unit, and a picture-taking frequency controller for controlling the frequency of picture taking by the picture-taking unit based on the approaching situation of the approaching object toward the vehicle found by the first approaching situation calculation section in the monitoring device according to the first or second aspect of the present invention.

Using the monitoring device according to the third aspect of the present invention, since the frequency of picture taking by the picture-taking unit is controlled based on the approaching situation of the approaching object toward the vehicle, it is possible to more appropriately take pictures of the approaching object as the balance between the frequency and its power consumption is kept. For example, when the velocity of the approaching object is fast, the picture taking is performed at comparatively short intervals, while the picture taking is performed at comparatively long intervals when the velocity of the approaching object is slow.

A monitoring device according to the fourth aspect of the present invention is characterized by the first approaching situation calculation section which judges whether or not the approaching object has been within a prescribed area of the surround of the vehicle based on information obtained from the surround monitoring unit and/or information obtained from pictorial data taken by the picture-taking unit, and the picture-taking frequency controller which controls the picture-taking unit so that the frequency of picture taking becomes higher when it is judged that the approaching object has been within the prescribed area by the first approaching situation calculation section in the monitoring device according to the third aspect of the present invention.

Using the monitoring device according to the fourth aspect of the present invention, when the approaching object has been within the prescribed area (e.g. within the range of 5 m or less from the vehicle), the frequency of picture taking of the approaching object becomes higher. Therefore, the frequency of picture taking becomes higher as the risk of its collision against the vehicle increases, so that it is possible to more appropriately take pictures of the approaching object as the balance between the frequency and its power consumption is kept. For example, when the approaching object is present within the range of 5-30 m from the vehicle, the picture taking is performed every one second, while as many pictures as possible are taken continuously when the approaching object is present within the range of 5 m from the vehicle.

A monitoring device according to the fifth aspect of the present invention is characterized by being a monitoring device for monitoring a vehicle to detect the occurrence of abnormal conditions of the vehicle, comprising a fifth approaching object judgment section for judging whether or not there is an approaching object toward the vehicle based on information obtained from a periphery monitoring unit for monitoring the periphery and/or the inside of the vehicle, and a third picture-taking start controller for allowing a picture-taking unit for taking pictures of the periphery of the vehicle to start taking pictures based on the judgment result by the fifth approaching object judgment section.

Using the monitoring device according to the fifth aspect of the present invention, the start of picture taking by the picture-taking unit for taking pictures of the periphery of the vehicle is controlled based on the judgment result by the fifth approaching object judgment section for judging whether or not there is an approaching object toward the vehicle. Or, the picture taking of the periphery of the vehicle can be started when the presence of an approaching object toward the vehicle is detected, leading to a reduction in power consumption.

A monitoring device according to the sixth aspect of the present invention is characterized by comprising a pictorial information storage section for storing information about a picture showing a physical characteristic such as a face of an authorized user of the vehicle, a second authorized user judgment section for judging whether or not the approaching object is the authorized user of the vehicle based on pictorial information about the approaching object toward the vehicle obtained from the picture-taking unit and the pictorial information stored in the pictorial information storage section, and a seventh processing section for conducting a seventh predetermined processing based on the judgment result by the second authorized user judgment section in the monitoring device according to the fifth aspect of the present invention.

Using the antitheft device according to the sixth aspect of the present invention, the authentication of whether or not the approaching object is the authorized user of the vehicle is conducted based on the physical characteristic, so that the person desiring to use the vehicle does not have to possess something special for authentication.

A monitoring device according to the seventh aspect of the present invention is characterized by the seventh processing section which cancels an arming mode for being on the alert for vehicle theft and/or at least unlocks a driver's seat side door when the approaching object is judged to be the authorized user of the vehicle by the second authorized user judgment section in the monitoring device according to the sixth aspect of the present invention.

Using the monitoring device according to the seventh aspect of the present invention, when the approaching object is determined to be the authorized user of the vehicle as a result of the pictorial authentication, the arming mode is canceled, or at least the driver's seat side door is unlocked (all the doors may be unlocked), so that the user can get on the vehicle smoothly.

A monitoring device according to the eighth aspect of the present invention is characterized by comprising a first at-work judgment section for judging whether or not the approaching object is working around the vehicle based on information obtained from the periphery monitoring unit, wherein the seventh processing section conducts processing to be conducted in the case of a suspicious person being present around the vehicle, when the approaching object is judged not to be the authorized user by the second authorized user judgment section and it is judged that the approaching object is working around the vehicle by the first at-work judgment section in the monitoring device according to the sixth or seventh aspect of the present invention.

Using the monitoring device according to the eighth aspect of the present invention, when the approaching object is determined not to be the authorized user of the vehicle as a result of the pictorial authentication and it is judged that the approaching object is working around the vehicle based on the information obtained from the periphery monitoring unit, it is determined that there is a suspicious person around the vehicle, so that the processing to be conducted in a case where there is a suspicious person (such as generating an audible alarm, lighting on an indicator and reporting to a security company or the like) is conducted.

As a method for judging whether or not the approaching object is working around the vehicle based on the information obtained from the periphery monitoring unit, exemplified are a method wherein whether or not the detected time of a signal at a prescribed level L1 or higher has continued for a given period of time is judged, and a method wherein whether or not a signal at a prescribed level L2 (>L1) or higher was detected a given times or more is judged.

A monitoring device according to the ninth aspect of the present invention is characterized by comprising a second at-work judgment section for judging whether or not the approaching object is working around the vehicle based on pictorial information about the approaching object toward the vehicle obtained from the picture-taking unit, wherein the seventh processing section conducts processing to be conducted in the case of a suspicious person being present around the vehicle, when the approaching object is judged not to be the authorized user by the second authorized user judgment section and it is judged that the approaching object is working around the vehicle by the second at-work judgment section in the monitoring device according to the sixth or seventh aspect of the present invention.

Using the monitoring device according to the ninth aspect of the present invention, when the approaching object is determined not to be the authorized user of the vehicle as a result of the pictorial authentication and it is judged that the approaching object is working around the vehicle based on the pictorial information obtained from the picture-taking unit, it is determined that there is a suspicious person around the vehicle, so that the processing to be conducted in a case where there is a suspicious person (such as generating an audible alarm, lighting on an indicator and reporting to a security company or the like) is conducted.

As a method for judging whether or not the approaching object is working around the vehicle based on the pictorial information obtained from the picture-taking unit, a method is exemplified, wherein whether or not a trail of up-and-down (vertical) movements of the approaching object to the vehicle was obtained is judged. And if whether the object which accomplished such movements is near human or not is additionally judged, the accuracy of the judgment can be improved.

A monitoring device according to the tenth aspect of the present invention is characterized by being a monitoring device for monitoring a vehicle to detect the occurrence of abnormal conditions of the vehicle, comprising a second approaching situation calculation section for finding the approaching situation of the approaching object toward the vehicle based on information obtained from a surround monitoring unit for monitoring the surround of the vehicle, and a monitoring frequency controller for controlling the frequency of monitoring by the surround monitoring unit based on the approaching situation of the approaching object toward the vehicle found by the second approaching situation calculation section.

Using the monitoring device according to the tenth aspect of the present invention, the frequency of monitoring by the surround monitoring unit for monitoring the surround of the vehicle (e.g. within the range of 1-30 m) is controlled based on the approaching situation of the approaching object toward the vehicle, so that it is possible to appropriately monitor the approaching object as the balance between the frequency and its power consumption is kept.

A monitoring device according to the eleventh aspect of the present invention is characterized by the second approaching situation calculation section which judges whether or not the approaching object has been within a prescribed area of the surround of the vehicle based on the information obtained from the surround monitoring unit, and the monitoring frequency controller which controls the surround monitoring unit so that the frequency of monitoring becomes higher when it is judged that the approaching object has been within the prescribed area by the second approaching situation calculation section in the monitoring device according to the tenth aspect of the present invention.

Using the monitoring device according to the eleventh aspect of the present invention, when the approaching object has been within the prescribed area (e.g. within the range of 5 m or less from the vehicle), the frequency of monitoring of the approaching object becomes higher. Therefore, the frequency of monitoring becomes higher as the risk of its collision against the vehicle increases, so that it is possible to more appropriately monitor the approaching object as the balance between the frequency and its power consumption is kept.

A monitoring device according to the twelfth aspect of the present invention is characterized by being a monitoring device for monitoring a vehicle to detect the occurrence of abnormal conditions of the vehicle, comprising a risk level calculation section for calculating the risk level of an approaching object toward the vehicle, and a monitoring priority controller for controlling a surround monitoring unit so as to monitor an approaching object at a higher risk level with priority given based on the risk levels calculated by the risk level calculation section when there are multiple approaching objects toward the vehicle.

As the surround monitoring unit, a radio wave sensor and a camera are exemplified. The more radio wave sensors or cameras are mounted on a vehicle, the more appropriately objects being present in every direction can be monitored, but the number of radio wave sensors or cameras which can be mounted on the vehicle is limited. Therefore, it is difficult to appropriately monitor every approaching object being present around the vehicle.

Using the monitoring device according to the twelfth aspect of the present invention, the risk levels of the approaching objects are calculated, and the approaching object at a higher risk level is given priority to be monitored. As a result, since the monitored subjects are differentiated, the approaching objects can be appropriately monitored even if a lot of radio wave sensors or cameras are not mounted.

A monitoring device according to the thirteenth aspect of the present invention is characterized by the risk level calculation section which calculates the risk level of the approaching object based on at least one or more parameters from among the distance from the vehicle, the type of the approaching object and the approaching situation of the approaching object in the twelfth aspect of the monitoring device.

Using the monitoring device according to the thirteenth aspect of the present invention, since the risk level of the approaching object is calculated based on at least one or more parameters from among the distance from the vehicle, the type of the approaching object and the approaching situation thereof, the risk level thereof can be more properly found. For example, the shorter the distance from the vehicle is, the higher the risk is. The risk of a vehicle is higher than that of a human. And the faster the approaching object moves, the higher the risk becomes.

A monitoring device according to the fourteenth aspect of the present invention is characterized by the monitoring priority controller which controls the surround monitoring unit so that approaching objects at a first prescribed risk level or higher are included in subjects to be monitored in the monitoring device according to the twelfth or thirteenth aspect of the present invention.

Using the monitoring device according to the fourteenth aspect of the present invention, since the approaching objects at the first prescribed risk level or higher are included in the subjects to be monitored, it is possible to appropriately monitor the objects on which importance should be placed in the monitoring.

A monitoring device according to the fifteenth aspect of the present invention is characterized by the monitoring priority controller which controls the surround monitoring unit so that an approaching object at a maximum risk level is given top priority to be monitored when the risk level of the approaching object is a second prescribed level or higher in the monitoring device according to the twelfth or thirteenth aspect of the present invention.

Using the monitoring device according to the fifteenth aspect of the present invention, when the risk level of the approaching object at a maximum risk level is the second prescribed level or higher, the approaching object is given top priority to be monitored. Or, when there is an approaching object to which the greatest attention should be paid, the monitoring of the approaching object is given top priority. Thus, it is possible to appropriately monitor the approaching object to which the greatest attention should be paid.

An antitheft system according to the first aspect of the present invention is characterized by being an antitheft system comprising an antitheft device having a third stolen state judgment section for judging whether or not a vehicle has been in a stolen state and an eighth processing section for conducting an eighth predetermined processing when it is judged that the vehicle has been in a stolen state by the third stolen state judgment section, and a controller for controlling electronic equipment mounted on the vehicle, wherein the eighth processing section conducts processing including outputting of a theft signal to the controller and the controller sets the electronic equipment to be in abnormal conditions when receiving the theft signal.

In the antitheft system according to the first aspect of the present invention, when the vehicle comes into the stolen state, the conditions of the electronic equipment are set to be abnormal, resulting in a lowered commercial value of the vehicle. Thus, it is possible to decrease a desire to steal the vehicle of a person who tries vehicle theft.

An antitheft system according to the second aspect of the present invention is characterized by the controller which controls the switch-on/-off of lamps, the controller prohibiting the switch-on of the lamps when receiving the theft signal in the antitheft system according to the first aspect of the present invention.

In the antitheft system according to the second aspect of the present invention, it is possible to make the stolen vehicle a defective vehicle with lamps which do not normally light up. Thus, it is possible to decrease a desire to steal the vehicle of a person who tries vehicle theft. Moreover, vehicle theft occurs more often during the night than in the daytime, and it is very difficult to drive the stolen vehicle with the lamps which do not normally light up at night. As a result, it is possible to prevent a transfer of the stolen vehicle and make a capture of the stolen vehicle easy to do.

An antitheft system according to the third aspect of the present invention is characterized by the controller which controls the operation of meters, the controller prohibiting the operation of the meters when receiving the theft signal in the antitheft system according to the first aspect of the present invention.

In the antitheft system according to the third aspect of the present invention, the stolen vehicle can be made a defective vehicle with meters (such as a speedometer and a tachometer) which do not normally indicate. Thus, it is possible to decrease a desire to steal the vehicle of a person who tries vehicle theft. Moreover, it is very difficult to drive the stolen vehicle with the meters which do not normally indicate. As a result, it is possible to prevent a transfer of the stolen vehicle and make a capture of the stolen vehicle easy to do.

An antitheft system according to the fourth aspect of the present invention is characterized by being an antitheft system comprising an antitheft device having an arming mode setting section for setting an arming mode for being on the alert for vehicle theft, an arming mode canceling section for canceling the arming mode, a fourth stolen state judgment section for judging whether or not the vehicle has been in a stolen state while the arming mode has been set, and a ninth processing section for conducting a ninth predetermined processing when it is judged that the vehicle has been in a stolen state by the fourth stolen state judgment section, and a controller for controlling electronic equipment mounted on the vehicle, wherein the antitheft device comprises an arming signal output section for outputting an arming signal to the controller when predetermined conditions are met, the controller controls the electronic equipment so as to realize a state of inconvenience for driving the vehicle when receiving the arming signal, and the predetermined conditions include that the arming mode has been set by the arming mode setting section.

In the antitheft system according to the fourth aspect of the present invention, when the predetermined conditions are met, the arming signal is output to the controller, and the controller realizes a state of inconvenience for driving the vehicle. For example, a seat position is moved toward the front, resulting in a state where it is not easy to get on the vehicle. And the predetermined conditions include that the arming mode has been set by the arming mode setting section. Therefore, it is possible to realize the state of inconvenience for driving the vehicle, not when theft was detected (or an intruder was detected) but when the arming mode was set (or an authorized user went away from the vehicle).

As a result, even if a theft works on an intrusion detection sensor and the like so that an intrusion into the vehicle cannot be detected, the theft cannot get the vehicle in its normal condition. Thus, it is possible to decrease a desire to steal the vehicle of a person who tries vehicle theft.

An antitheft system according to the fifth aspect of the present invention is characterized by the predetermined conditions which include that a prescribed time has elapsed after setting of the arming mode in the antitheft system according to the fourth aspect of the present invention.

The power consumption required for realizing/clearing of the state of inconvenience for driving the vehicle is negligible, and if the realizing/clearing of the state can be conducted in an instant, it appears that problems are rarely caused. But when the power consumption required for such processing is large, or when the processing takes a long time, the following problems are caused:

a) when the time during which the user is away from the vehicle is short, there is a possibility that it becomes impossible to start the vehicle swiftly; and b) a wasteful consumption of a battery.

In the antitheft system according to the fifth aspect of the present invention, the predetermined conditions include that the prescribed time (e.g. 3 minutes) has elapsed since the arming mode was set, so that it is possible to make the state of inconvenience for driving the vehicle unrealized when the authorized user comes back to the vehicle within 3 minutes. Thus, the above problem can be solved.

An antitheft system according to the sixth aspect of the present invention is characterized by the antitheft device which comprises a cancel signal output section for outputting a cancel signal to the controller when the arming mode is canceled by the arming mode canceling section, and the controller which controls the electronic equipment so as to clear the state of inconvenience for driving the vehicle when receiving the cancel signal in the antitheft system according to the fourth or fifth aspect of the present invention.

In the antitheft system according to the sixth aspect of the present invention, when the arming mode is canceled, the cancel signal is output to the controller, and the state of inconvenience for driving the vehicle is cleared by the controller. For example, the seat position is returned to its normal position. Thus, the authorized user can start driving the vehicle without wasting time.

An antitheft system according to the seventh aspect of the present invention is characterized by the controller which controls seats, the controller moving a seat position forward or tilting a backrest of a seat toward the front when receiving the arming signal in any of the antitheft systems according to the fourth through sixth aspects of the present invention.

In the antitheft system according to the seventh aspect of the present invention, by moving the seat position forward or tilting the backrest of the seat toward the front, the state of inconvenience for driving the vehicle is realized.

An antitheft system according to the eighth aspect of the present invention is characterized by the controller which smokes windows, the controller smoking the windows when receiving the arming signal in any of the antitheft systems according to the fourth through sixth aspects of the present invention.

In the antitheft system according to the eighth aspect of the present invention, by smoking the windows, the state of inconvenience for driving the vehicle is realized. Here, as a method for smoking the windows, a method wherein glass is shutter-controlled using liquid crystal glass is exemplified.

An antitheft system according to the ninth aspect of the present invention is characterized by the controller which controls an engine or a transmission, the controller locking a gear or restricting gear shifting when receiving the arming signal in any of the antitheft systems according to the fourth through sixth aspects of the present invention.

In the antitheft system according to the ninth aspect of the present invention, by locking the gear or restricting gear shifting, the state of inconvenience for driving the vehicle is realized. For example, by locking the gear at the parking position or the neutral position, or prohibiting the gear shifting of the transmission, the acceleration or speed of the stolen vehicle can be controlled. Thus, it is possible to prevent a transfer of the stolen vehicle, which makes it easy to realize a capture of the stolen vehicle.

An antitheft system according to the tenth aspect of the present invention is characterized by the controller which controls the locked state or free state of a steering wheel, the controller making the steering wheel in the locked state or free state when receiving the arming signal in any of the antitheft systems according to the fourth through sixth aspects of the present invention.

In the antitheft system according to the tenth aspect of the present invention, by making the steering wheel in the locked state or free state, the state of inconvenience for driving the vehicle is realized. Even if a theft gets into the vehicle, the theft cannot drive the vehicle. Here, as a method for making the steering wheel in the free state, a method is exemplified, wherein part of a transmission system for transmitting the movement of the steering wheel to tires is cut off (or tires are immobilized even if the steering wheel is operated).

An antitheft system according to the eleventh aspect of the present invention is characterized by the controller which controls the opening/closing of door mirrors, the controller prohibiting the opening operation of the door mirrors when receiving the arming signal in any of the antitheft systems according to the fourth through sixth aspects of the present invention.

In the antitheft system according to the eleventh aspect of the present invention, by prohibiting the opening operation of the door mirrors, the state of inconvenience for driving the vehicle is realized. Thus, the stolen vehicle can be made a defective vehicle.

An antitheft system according to the twelfth aspect of the present invention is characterized by the controller which controls battery charging, the controller prohibiting the battery charging when receiving the arming signal in any of the antitheft systems according to the fourth through sixth aspects of the present invention.

In the antitheft system according to the twelfth aspect of the present invention, by prohibiting the battery charging, the state of inconvenience for driving the vehicle is realized. Thus, even if a theft starts the engine by direct coupling of its IG, driving the vehicle cannot be continued because the battery is not charged.

DESCRIPTION OF THE PREFERRED EMBODIMENTS

The preferred embodiments of the antitheft device, monitoring device and antitheft system according to the present invention are described below by reference to the Figures of the drawings.

Figure 1:
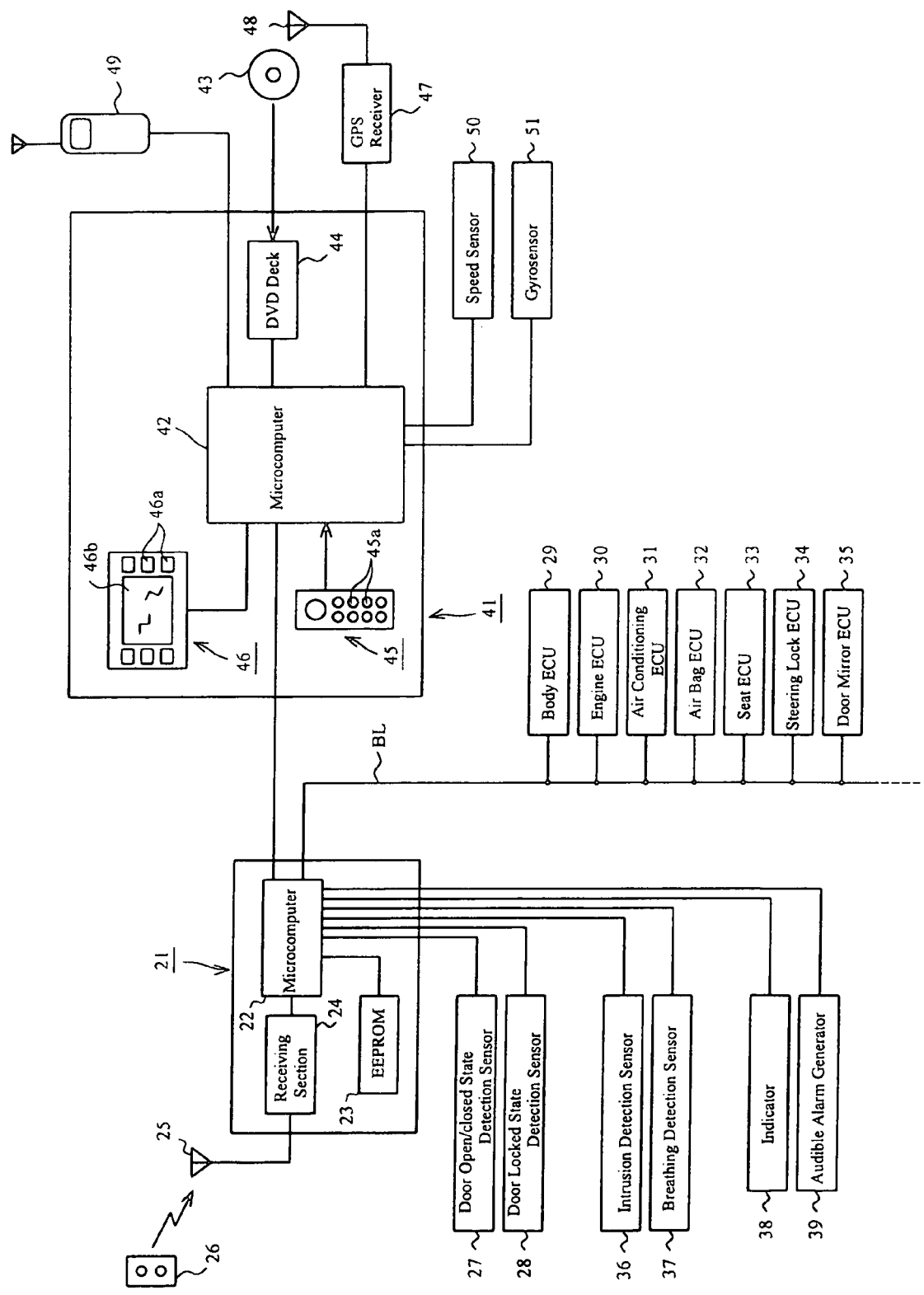
FIG. 1 is a block diagram schematically showing the principal part of an antitheft system comprising an antitheft device according to a first embodiment of the present invention.

FIG. 1 is a block diagram schematically showing the principal part of an antitheft system comprising an antitheft device according to a first embodiment. Reference numeral 21 in the figure represents an antitheft device comprising a microcomputer 22, an EEPROM 23 in which data indicating an ID code preset for each vehicle is stored and a receiving section 24 for receiving a signal (a signal including the ID code, and a locking command code or an unlocking command code) sent from a portable transmitter 26 an authorized driver should carry with him/her. An antenna 25 is connected to the receiving section 24.

A door open/closed state detection sensor 27 for detecting the open/closed state of doors and a door locked state detection sensor 28 for detecting the locked/unlocked state of the doors are connected to the microcomputer 22, wherein the open/closed state of the doors and the locked state thereof can be grasped.

The microcomputer 22 is connected to a bus line BL, and is connected through the bus line BL to a body ECU (Electronic Control Unit) 29 for controlling door locks or windows of its own vehicle (hereinafter, referred to as the vehicle M), an engine ECU 30 for controlling an engine of the vehicle M, an air conditioning ECU 31, an air bag ECU 32, a seat ECU 33 for controlling shifting of seat positions and the like, a steering lock ECU 34 for fixing a steering wheel and the like, a door mirror ECU 35 for controlling opening/closing of door mirrors, and the like.

Here, each of these ECUs is assigned an individual identification number. The body ECU 29 has an identification number '01', the engine ECU 30 has '02', the air conditioning ECU 31 has '03', the air bag ECU 32 has '04', the seat ECU 33 has '05', the steering lock ECU 34 has '06' and the door mirror ECU 35 has '07'.

When receiving a signal including the proper ID code (or the ID code stored in the EEPROM 23) and the locking command code with all of the doors being closed, the microcomputer 22 controls the body ECU 29 so as to make all of the doors locked. On the other hand, when receiving a signal including the proper ID code and the unlocking command code, the microcomputer 22 controls the body ECU 29 so as to make all of the doors unlocked.

To the microcomputer 22, an intrusion detection sensor 36 for detecting an object intruding into or approaching the vehicle M, installed inside the vehicle M, a breathing detection sensor 37 for detecting whether or not the object intruding into or approaching the vehicle M is breathing, installed inside the vehicle M, an indicator 38 and an audible alarm generator 39 for generating an audible alarm are connected. In addition, the microcomputer 22 is connected to a microcomputer 42 of multimedia equipment 41 so that data can be exchanged between the microcomputers 22 and 42.

Here, as the intrusion detection sensor 36, a sensor with a low power consumption is suitable. An ultrasonic sensor for detecting an object intruding into or approaching the vehicle M and a vibration sensor for detecting a break of glass are exemplified. As a method for detecting breathing, a method of detecting slight changes in chest (e.g. 2 mm/sec) is exemplified.

The multimedia equipment 41 comprises the microcomputer 42, a DVD deck 44 for reading map data from a DVD-ROM 43 holding the map data and the like therein, a remote control 45 having button switches 45a, and a display device 46 having button switches 46a and a display panel 46b.

Multiple infrared LEDs and multiple phototransistors (not shown) are arranged face to face at the top, bottom and both sides of the display panel 46b so that the position touched by a finger therein can be detected. The detected results can be acquired by the microcomputer 42.

A GPS receiver 47 connected to the microcomputer 42 receives GPS signals from satellites through an antenna 48. The microcomputer 42 can calculate its own vehicle position based on the GPS signals. In addition, a mobile communication device 49 such as a cellular phone is connected to the microcomputer 42 so that telephone conversations or exchange of information on a network such as the Internet can be carried out using the mobile communication device 49.

A speed sensor 50 for detecting data regarding the velocity of the vehicle M and a gyrosensor 51 for acquiring data regarding the traveling direction of the vehicle M are connected to the microcomputer 42. When the multimedia equipment 41 receives a theft occurrence signal from the antitheft device 21, it can be reported to the police, a security company or the like using the mobile communication device 49 that the vehicle M has been in a stolen state.

Here, as to the exchange of information with the outside sources or the report to the police, the security company or the like, the information network service 'G-BOOK' developed by Toyota Motor Corporation may be adopted. Using this information network service, it becomes possible to remotely control the antitheft device 21 as well as the multimedia equipment 41.

Figure 2:
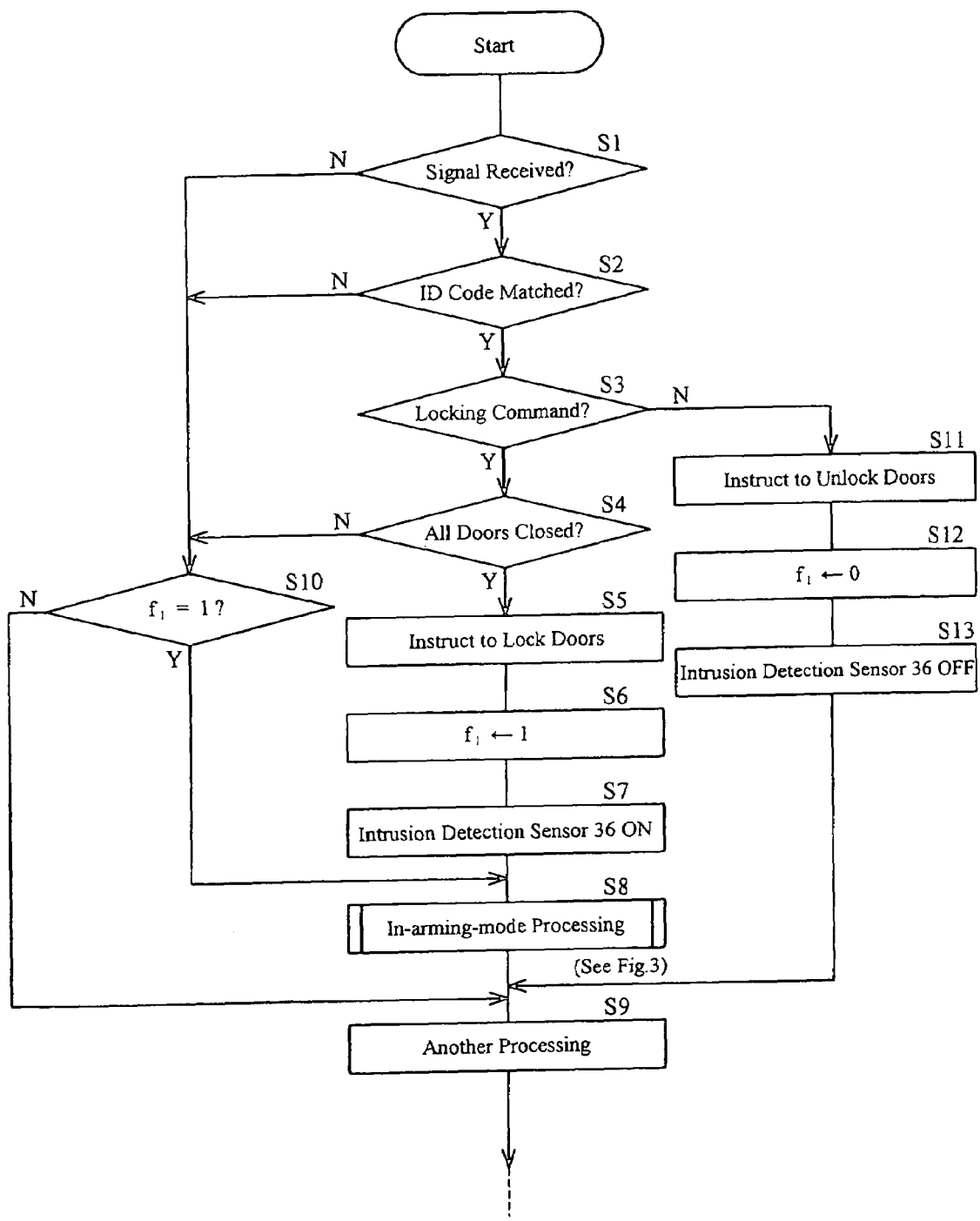
FIG. 2 is a flow chart showing the processing operation performed by a microcomputer in the antitheft device according to the first embodiment.

The main operation ① performed by the microcomputer 22 in the antitheft device 21 according to the first embodiment is described below by reference to a flow chart shown in FIG. 2. First, whether or not a signal sent from a transmitter such as the portable transmitter 26 was received is judged (Step 1). When it is judged that the signal was received, whether or not an ID code identical to the ID code stored in the EEPROM 23 is included in the received signal is judged (Step 2).

When it is judged that the identical ID code is included, whether or not the locking command code is included in the received signal is judged (Step 3). When it is judged that the locking command code is included, whether or not all of the doors of the vehicle M have been closed is judged based on signals obtained from the door open/closed state detection sensor 27 (Step 4).

When it is judged that all of the doors of the vehicle M have been closed, a door locking instruction signal is output to the body ECU 29 so as to lock the doors (Step 5). By turning a flag $f_1$ to 1, the arming mode is set (Step 6), the intrusion detection sensor 36 is actuated (Step 7), in-arming-mode processing is conducted (Step 8, see FIG. 3) and then, the operation goes to another processing (Step 9).

On the other hand, when it is judged that all of the doors have not been closed, whether the flag $f_1$ is 1 or not is judged (Step 10). When it is judged that the flag $f_1$ is 1 (or the arming mode has been set), the operation goes to Step 8, wherein the in-arming-mode processing is conducted. On the other hand, when it is judged that the flag $f_1$ is not 1, it bypasses Step 8 and goes to Step 9.

When it is judged that the locking command code is not included (the unlocking command code is included) in the received signal in Step 3, a door unlocking instruction signal is output to the body ECU 29 so as to unlock the doors (Step 11). By turning the flag $f_1$ to 0, the arming mode is canceled (Step 12), the operation of the intrusion detection sensor 36 is ended (Step 13) and then, the operation goes to another processing (Step 9).

When it is judged that no signal sent from a transmitter such as the portable transmitter 26 has been received in Step 1, or when no ID code identical to the ID code stored in the EEPROM 23 is included in the received signal in Step 2, the operation goes to Step 10, wherein whether the flag $f_1$ is 1 or not is judged.

Figure 3:
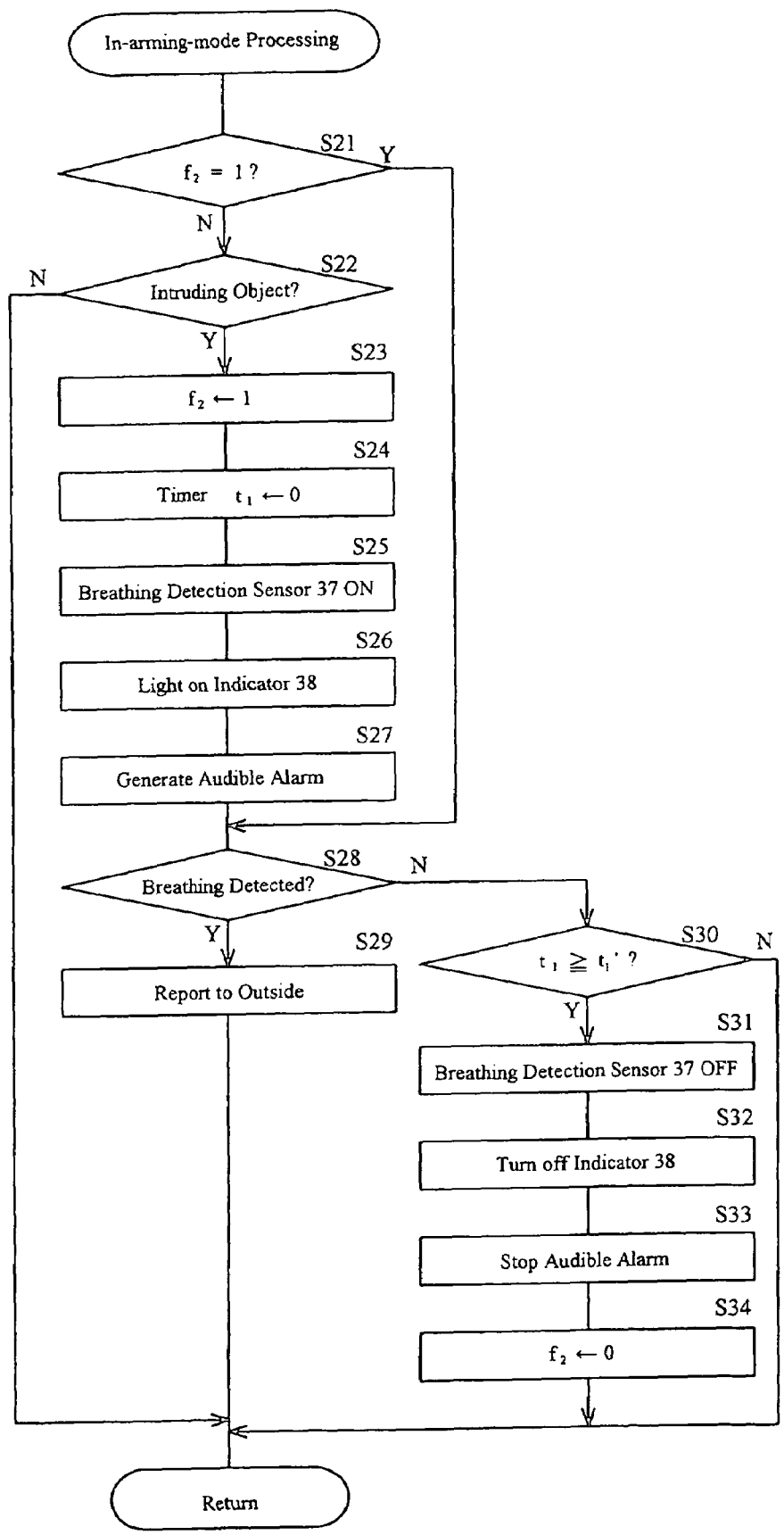
FIG. 3 is a flow chart showing the processing operation performed by the microcomputer in the antitheft device according to the first embodiment.

The 'in-arming-mode processing' operation ①-a performed by the microcomputer 22 in the antitheft device 21 according to the first embodiment is described below by reference to a flow chart shown in FIG. 3. First, whether a flag $f_2$ indicating that an object intruding into or approaching the vehicle M was detected is 1 or not is judged (Step 21).

When it is judged that the flag $f_2$ is not 1 (or no object intruding into or approaching the vehicle M has been detected), whether or not an object intruding into or approaching the vehicle M was detected by the intrusion detection sensor 36 is judged (Step 22). When it is judged that an intruding or approaching object was detected, the flag $f_2$ is changed to 1 (Step 23), a timer $t_1$ is set at 0 and is started up (Step 24) and the breathing detection sensor 37 is actuated (Step 25). And in order to threat the intruding or approaching object, the indicator 38 is lit up (Step 26) and the audible alarm generator 39 is controlled so as to generate an audible alarm (Step 27).

Whether or not breathing was detected by the breathing detection sensor 37 is judged (Step 28). When it is judged that breathing was detected, it is considered that the object intruding into or approaching the vehicle M is a theft, and by outputting a theft occurrence signal to the multimedia equipment 41, it is reported to the outside (Step 29). A warning display may be shown on the display panel of the multimedia equipment 41. On the other hand, when it is judged that breathing has not been detected, whether or not the timer $t_1$ has counted to a prescribed period $t_1'$ or more is judged (Sep. 30). When it is judged that the timer $t_1$ has counted to the prescribed period $t_1'$ or more, the operation of the breathing detection sensor 37 is ended (Step 31), the indicator 38 is turned off (Step 32) and the audible alarm generator 39 is controlled so as to stop generating the audible alarm (Step 33) and thereafter, the flag $f_2$ is changed to 0 (Step 34). On the other hand, when it is judged that the timer $t_1$ has not counted to more than the prescribed period $t_1'$ in Step 30, the processing operation ①-a is ended at once.

When it is judged that the flag $f_2$ is 1 (or an object intruding into or approaching the vehicle M was detected) in Step 21, the operation bypasses Steps 22-27 and goes to Step 28, wherein whether or not breathing was detected by the breathing detection sensor 37 is judged. When it is judged that no object intruding into or approaching the vehicle M has been detected in Step 22, the processing operation ①-a is ended at once.

Using the antitheft device according to the above first embodiment, in consideration of not only the information regarding the presence or absence of an object intruding into or approaching the vehicle M from the intrusion detection sensor 36, but also the information regarding the presence or absence of breathing (or the information of whether there is a possibility that the object intruding into or approaching the vehicle M is at least a human) from the breathing detection sensor 37, whether or not the vehicle M has been in a stolen state is judged, so that the judgment can be made with good accuracy.

Here, in the antitheft device according to the above first embodiment, as a unit for detecting whether there is a possibility that the intruding or approaching object is at least a human, the breathing detection sensor is adopted, but the unit is not limited to the breathing detection sensor. In an antitheft device according to another embodiment, a body temperature detection sensor for detecting temperatures (e.g. 35-40° C.), a touch sensor for detecting a touch on the vehicle M (such as a door handle thereof), a camera for taking pictures or the like may be adopted.

In the case of a camera being adopted as the unit, by examining the motions (particularly vertical motions) of the intruding or approaching object to be a target based on data of pictures taken by the camera, the judgment on whether or not the intruding or approaching object is a person who is trying to steal the vehicle can be made with better accuracy.

For example, a person who simply passes by the vehicle M with no intention of stealing moves horizontally to the vehicle M with hardly moving vertically thereto. In other words, there is a high possibility that an object moving vertically to the vehicle M (or an object producing large vertical movements) is a person attempting to steal the vehicle. And in the case of the camera being adopted as the unit, the pictorial data with a theft seen therein may be sent to a security company or the like.

In the antitheft device according to the above first embodiment, only the case wherein when it is judged that the vehicle M has been in a stolen state, that is reported to a security company or the like was described, but a response to the judgment is not limited to the report to the outside. In an antitheft device according to another embodiment, by outputting theft signals to the body ECU 29, the engine ECU 30, the air conditioning ECU 31, the air bag ECU 32, a lamp ECU (not shown) for controlling switch-on/-off of each type of lamps, a meter ECU (not shown) for controlling the operation of each type of meters and the like, it may become impossible to unlock the doors or change gears, an air-cooling unit may be driven by a heating instruction, an air bag may be expanded, lighting of the lamps may be prohibited, or the actuation of the meters (such as a speedometer and a tachometer) may be prohibited. Here, in order to implement these prohibiting controls, each ECU may have a construction including a section for conducting such control when receiving the theft signal.

In still another embodiment, through a screen shown on the display panel 46b of the multimedia equipment 41, the detection area of the intrusion detection sensor 36 or the breathing detection sensor 37 (a body temperature detection sensor, a touch sensor or a camera) may be selected.

Figure 4:
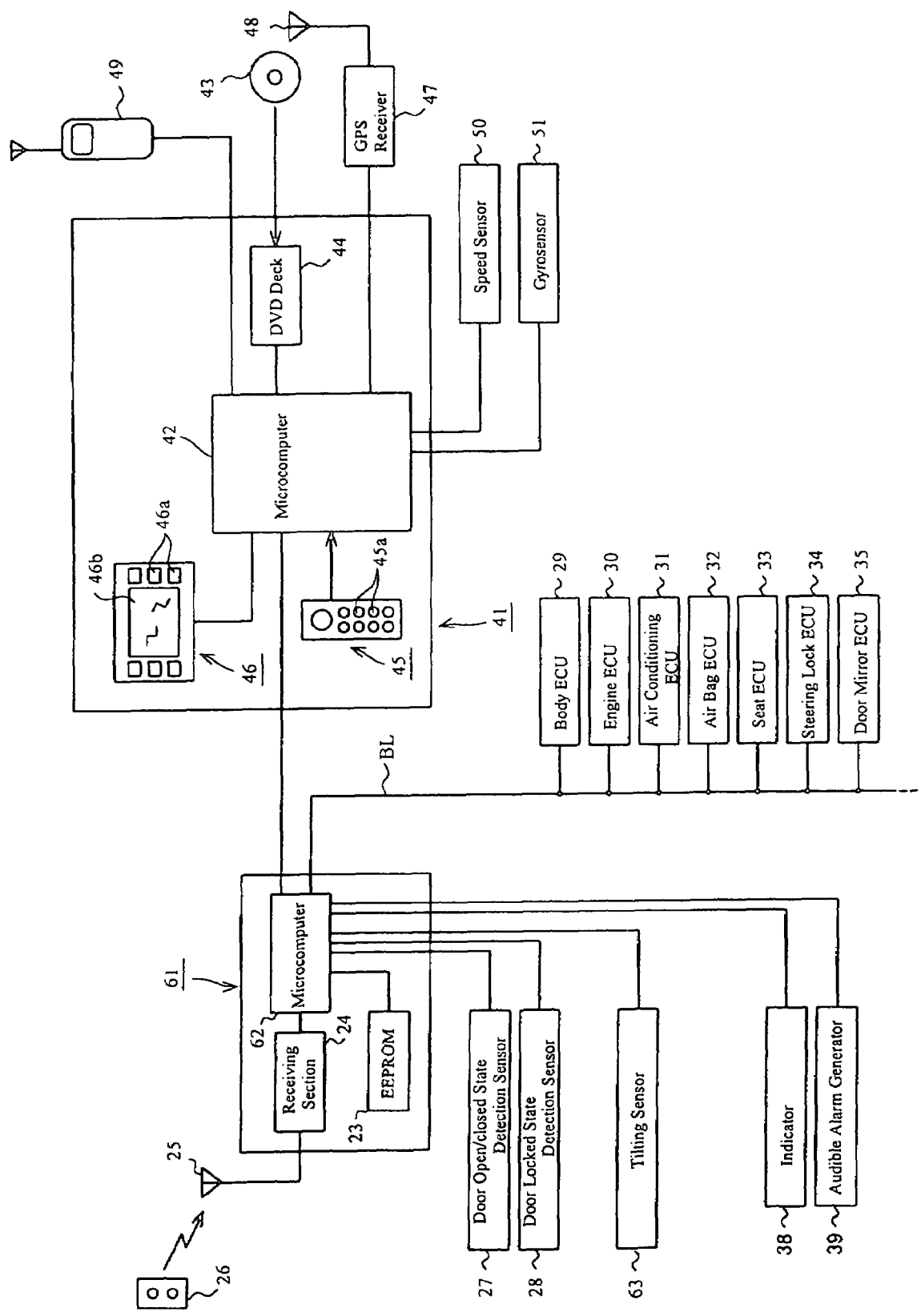
FIG. 4 is a block diagram schematically showing the principal part of an antitheft system comprising an antitheft device according to a second embodiment.

FIG. 4 is a block diagram schematically showing the principal part of an antitheft system comprising an antitheft device according to a second embodiment. Here, the same components as those of the antitheft system shown in FIG. 1 are similarly marked and are not described here.

Reference numeral 61 in the figure represents an antitheft device comprising a microcomputer 62, an EEPROM 23 and a receiving section 24 for receiving signals sent from a portable transmitter 26, and an antenna 25 is connected to the receiving section 24.

A door open/closed state detection sensor 27 and a door locked state detection sensor 28 are connected to the microcomputer 62, wherein the open/closed state of doors and the locked state thereof can be grasped. And the microcomputer 62 is connected to a bus line BL and is connected through the bus line BL to a body ECU 29, an engine ECU 30, an air conditioning ECU 31, an air bag ECU 32, a seat ECU 33, a steering lock ECU 34, a door mirror ECU 35 and the like.

To the microcomputer 62, a tilting sensor 63 for detecting the tilt degree of the vehicle M, an indicator 38 and an audible alarm generator 39 are connected. In addition, the microcomputer 62 is connected to a microcomputer 42 of multimedia equipment 41 so that data can be exchanged between the microcomputers 62 and 42.

The main operation ② performed by the microcomputer 62 in the antitheft device according to the second embodiment is described below by reference to a flow chart shown in FIG. 5. Here, since the main operation ② is similar to the main operation ① performed by the microcomputer 22 in the antitheft device 21 except for Steps 7, 8 and 13, only different portions are described below.

Figure 5:
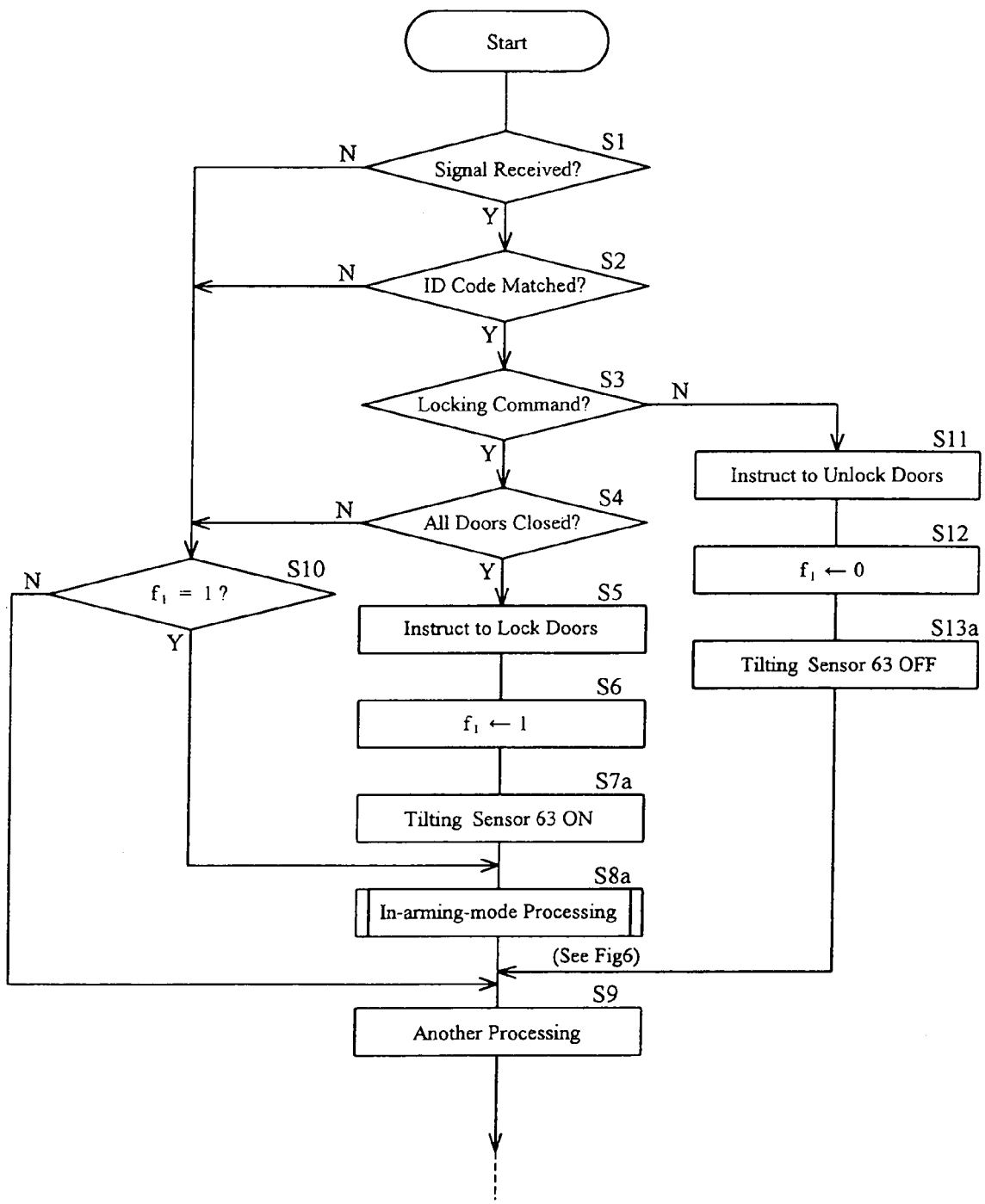
FIG. 5 is a flow chart showing the processing operation performed by a microcomputer in the antitheft device according to the second embodiment.

FIG. 5 is a flow chart showing the main operation ② performed by the microcomputer 62 in the antitheft device 61 according to the second embodiment. Here, since the main operation ② performed by the microcomputer 62 is similar to the processing operation ① performed by the microcomputer 22 in the antitheft device 21 except for Steps 7, 8 and 13 shown in FIG. 2, only different Steps 7a, 8a (see FIG. 6) and 13a are described below. In Step 7a, the processing to actuate the tilting sensor 63 is conducted, while in Step 13a, the processing to stop the operation of the tilting sensor 63 is conducted.

Figure 6:
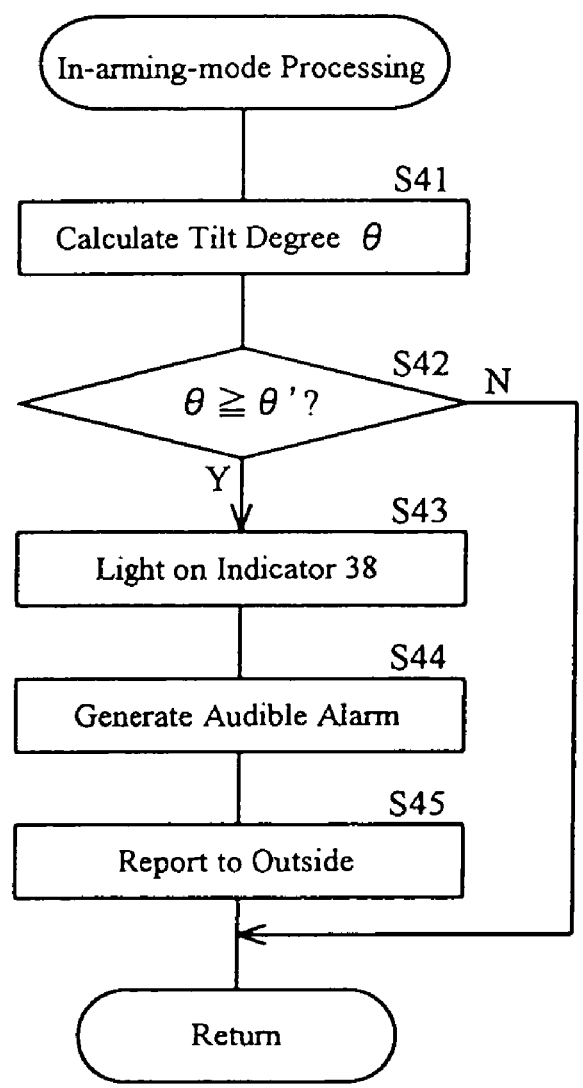
FIG. 6 is a flow chart showing the processing operation performed by the microcomputer in the antitheft device according to the second embodiment.

The 'in-arming-mode processing' operation ①-a performed by the microcomputer 62 in the antitheft device 61 according to the second embodiment is described below by reference to a flow chart shown in FIG. 6. First, based on a signal obtained from the tilting sensor 63, the tilt degree θ of the vehicle M is found (Step 41), and whether or not the obtained tilt degree θ is a prescribed value θ' or more is judged (Step 42).

When it is judged that the tilt degree θ is the prescribed value θ' or more, it is considered that the vehicle M is being stolen using a wrecker or the like. In order to threat a theft, the indicator 38 is lit on (Step 43), the audible alarm generator 39 is controlled so as to generate an audible alarm (Step 44), and a theft occurrence signal is output to the multimedia equipment 41 so as to report to the outside (Step 45). On the other hand, when it is judged that the tilt degree θ is not the prescribed value θ' or more, the processing operation ②-a is ended at once.

Using the antitheft device according to the above second embodiment, whether or not the vehicle M has been in a stolen state is judged based on the tilt degree θ of the vehicle M, so that it is possible to detect a vehicle theft using a wrecker or the like with good accuracy. Here, the judgment on whether or not the vehicle theft using a wrecker or the like was carried out is made based on the tilt degree obtained by the tilting sensor, but in an antitheft device according to another embodiment, the judgment may be made based on the impact degree obtained by an impact detection sensor for detecting the degree of an impact applied to the vehicle M.

In still another embodiment, not only the tilt degree and impact degree but also speed information of the vehicle M may be taken into consideration. Thus, the judgment on whether or not a theft using a wrecker or the like is being carried out can be made with better accuracy.

Figure 7:
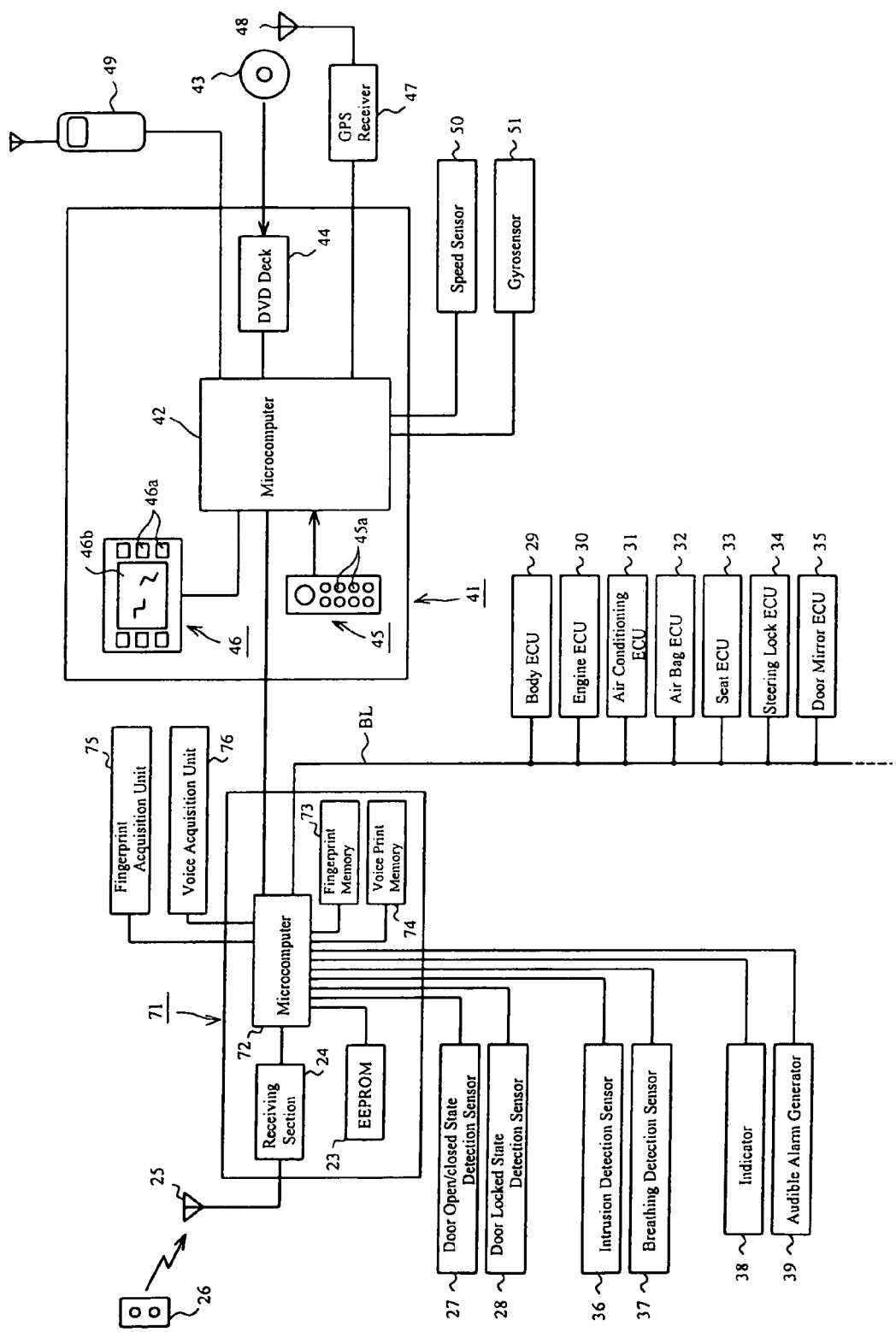
FIG. 7 is a block diagram schematically showing the principal part of an antitheft system comprising an antitheft device according to a third embodiment.

FIG. 7 is a block diagram schematically showing the principal part of an antitheft system comprising an antitheft device according to a third embodiment. Here, the same components as the antitheft system shown in FIG. 1 are similarly marked and are not described below.

Reference numeral 71 represents an antitheft device comprising a microcomputer 72, an EEPROM 23, a receiving section 24 for receiving signals sent from a portable transmitter 26, a fingerprint information storage section 73 for storing information regarding a fingerprint of an authorized user of the vehicle M, and a voice print information storage section 74 for storing information regarding a voice print of the authorized user of the vehicle M. An antenna 25 is connected to the receiving section 24.

A door open/closed state detection sensor 27 and a door locked state detection sensor 28 are connected to the microcomputer 72, wherein the open/closed state of doors and the locked state thereof can be grasped. And the microcomputer 72 is connected to a bus line BL and is connected through the bus line BL to a body ECU 29, an engine ECU 30, an air conditioning ECU 31, an air bag ECU 32, a seat ECU 33, a steering lock ECU 34, a door mirror ECU 35 and the like.

To the microcomputer 72, an intrusion detection sensor 36, a breathing detection sensor 37, an indicator 38, an audible alarm generator 39, a fingerprint acquisition unit 75 for acquiring a fingerprint of a person desiring to use the vehicle M and a voice acquisition unit (a microphone) 76 for acquiring a voice of the person desiring to use the vehicle M are connected. In addition, the microcomputer 72 is connected to a microcomputer 42 of multimedia equipment 41 so that data can be exchanged between the microcomputers 72 and 42.

Figure 8:
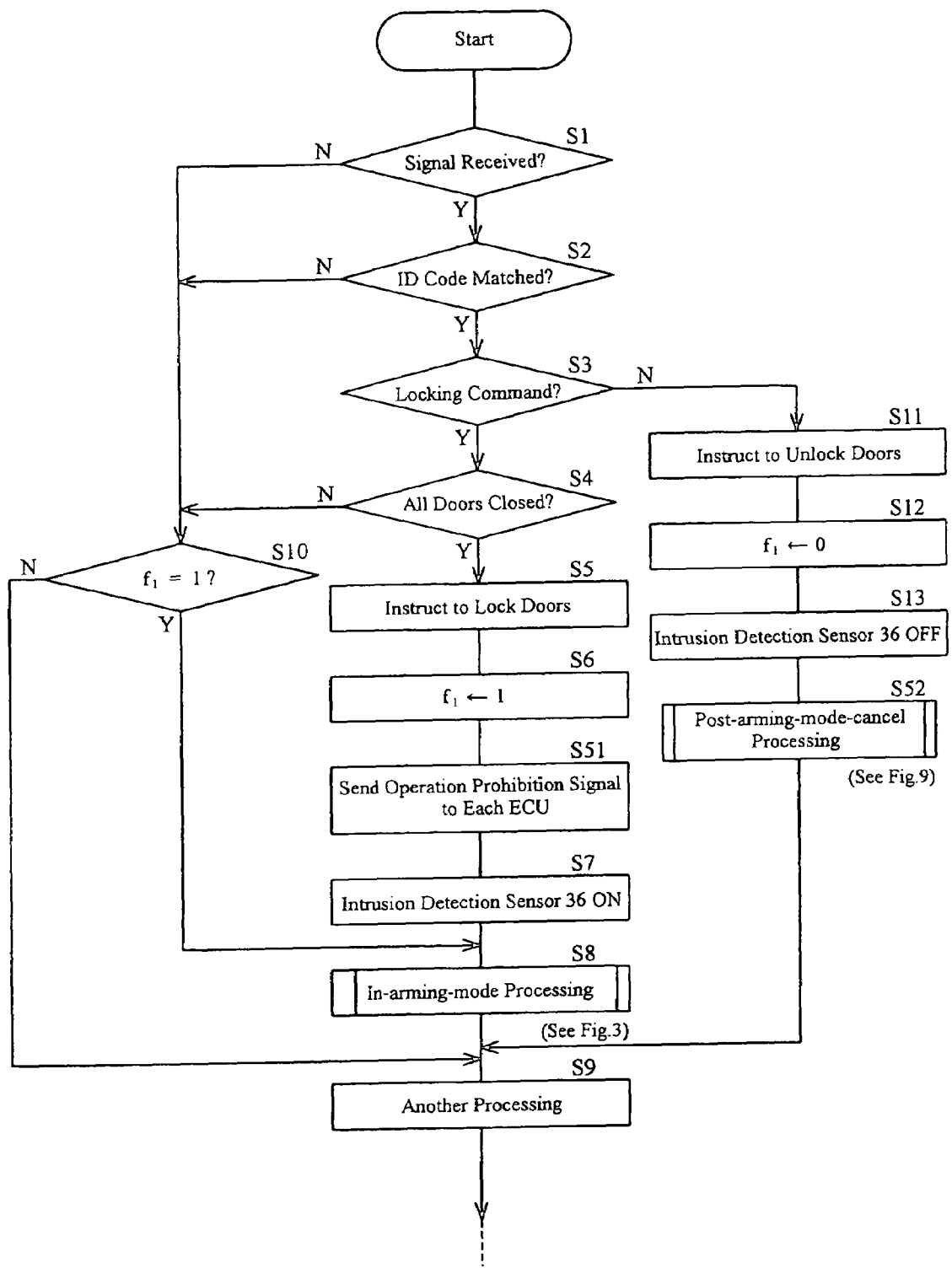
FIG. 8 is a flow chart showing the processing operation performed by a microcomputer in the antitheft device according to the third embodiment.

The main operation ③ performed by the microcomputer 72 in the antitheft device 71 according to the third embodiment is described below by reference to a flow chart shown in FIG. 8. Here, since the main operation ③ performed by the microcomputer 72 is similar to the processing operation ① performed by the microcomputer 22 in the antitheft device 21 shown in FIG. 2 except for a part thereof, only different portions are described below.

After setting the arming mode by tuning a flag $f_1$ to 1 in Step 6, the microcomputer 72 sends operation prohibition signals to the body ECU 29, engine ECU 30, air conditioning ECU 31, air bag ECU 32, seat ECU 33, steering lock ECU 34, door mirror ECU 35 and the like (Step 51), and then, it goes to Step 7.

Here, the operation prohibition signals are sent in such a manner as to be added to identification numbers assigned to each ECU. For example, when a signal made of an identification number '01' with the operation prohibition signal being added thereto is supplied to the bus line BL, the operation of the body ECU 29 is prohibited. When a signal made of an identification number '02' with the operation prohibition signal being added thereto is supplied to the bus line BL, the operation of the engine ECU 30 is prohibited.

By turning the flag $f_1$ to 0 in Step 12, the microcomputer 72 cancels the arming mode. After the operation of the intrusion detection sensor 36 is ended in Step 13, the post-arming-mode-cancel processing (Step 52, see FIG. 9) is conducted, and then, it goes to Step 9.

Figure 9:
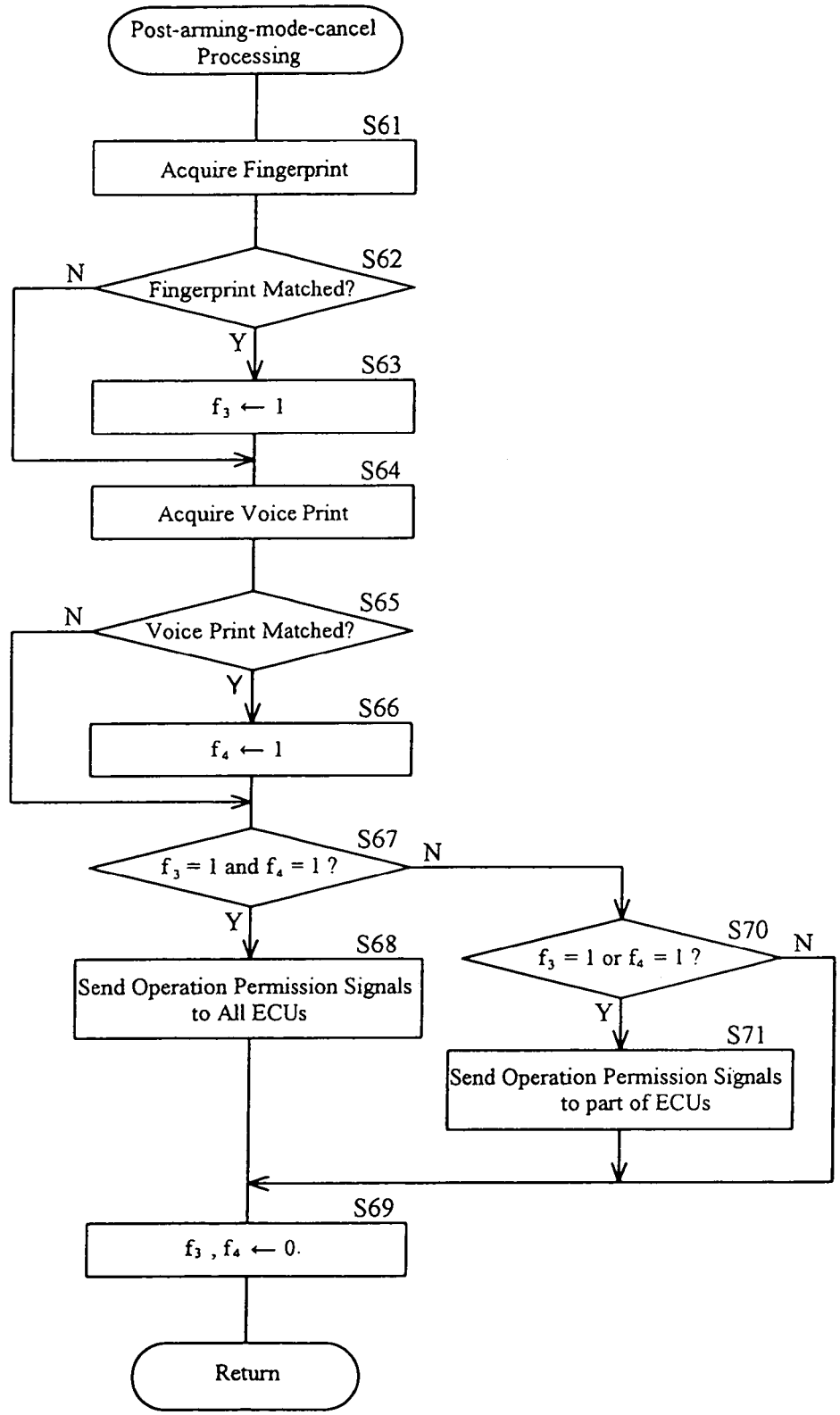
FIG. 9 is a flow chart showing the processing operation performed by the microcomputer in the antitheft device according to the third embodiment.

The 'post-arming-mode-cancel processing' operation ③-a performed by the microcomputer 72 in the antitheft device 71 according to the third embodiment is described below by reference to a flow chart shown in FIG. 9. First, information regarding a fingerprint of a person desiring to use the vehicle M is acquired based on a signal obtained from the fingerprint acquisition unit 75 (Step 61), and based on the acquired fingerprint information and the fingerprint information stored in the fingerprint information storage section 73, whether or not the person desiring to use the vehicle M is the authorized user of the vehicle M is judged (Step 62).

When it is judged that the person desiring to use the vehicle M is the authorized user of the vehicle M, a flag $f_3$ indicating that the person desiring to use the vehicle M was authenticated as the authorized user thereof through the fingerprint is turned to 1 (Step 63). Following that, information regarding a voice print of the person desiring to use the vehicle M is acquired based on a signal obtained from the voice acquisition unit 76 (Step 64), and based on the acquired voice print information and the voice print information stored in the voice print information storage section 74, whether or not the person desiring to use the vehicle M is the authorized user of the vehicle M is judged (Step 65). On the other hand, when it is judged that the person was not authenticated through the fingerprint in Step 62, the operation bypasses Step 63 and directly goes to Step 64.

When it is judged that the person desiring to use the vehicle M is the authorized user of the vehicle M in Step 65, a flag $f_4$ indicating that the person desiring to use the vehicle M was authenticated as the authorized user through the voice print is turned to 1 (Step 66), and then, the operation goes to Step 67. On the other hand, when it is judged that the person was not authenticated through the voice print, the operation bypasses Step 66 and directly goes to Step 67.

In Step 67, whether or not both the flags $f_3$ and $f_4$ are 1 is judged. When it is judged that both the flags $f_3$ and $f_4$ are 1 (or the person was authenticated through both of the fingerprint and the voice print), operation permission signals are sent to all of the ECUs on which the operation prohibiting control was conducted in Step 51 (see FIG. 8) (Step 68), and then, the flags $f_3$ and $f_4$ are changed to 0 (Step 69).

Here, the operation permission signals are sent in such a manner as to be added to the identification numbers assigned to each ECU, similarly to the operation prohibition signals. For example, when a signal made of the identification number '01' with the operation permission signal being added thereto is supplied to the bus line BL, the operation of the body ECU 29 is permitted. When a signal made of the identification number '02' with the operation permission signal being added thereto is supplied to the bus line BL, the operation of the engine ECU 30 is permitted.

On the other hand, when it is judged either of the flags $f_3$ and $f_4$ is not 1 in Step 67, whether or not either of the flags $f_3$ and $f_4$ is 1 is judged (Step 70). When it is judged that either of the flags $f_3$ and $f_4$ is 1 (or the person was authenticated through either of the fingerprint and the voice print), operation permission signals are sent to a part of the ECUs on which the operation prohibiting control was conducted in Step 51 (see FIG. 8) (Step 71), and then, the flags $f_3$ and $f_4$ are changed to 0 (Step 69). When it is judged that neither the flag $f_3$ nor the flag $f_4$ is 1 in Step 70, the flags $f_3$ and $f_4$ are changed to 0 without sending the operation permission signals to any ECUs (Step 69).

Using the antitheft device according to the above third embodiment, the authentication of whether or not a person is the authorized user of the vehicle M is conducted based on biometric information regarding the body (here, a fingerprint and a voice print), so that the person who desires to use the vehicle M does not have to possess something special for authentication. And everyone has his/her own fingerprint and voice print, resulting in an improvement in security. Here, the fingerprint information and voice print information are adopted as the biometric information regarding the body, but the biometric information is not limited thereto. Pictorial information about a face and the like may be adopted.

In an antitheft device according to another embodiment, in Step 71, the door locking function or a part of functions (such as an entry function) of a device having an entry section such as a navigation system (or an audio system) may be canceled so as to make a condition where a preset personal identification number or the like can be input, and when a proper personal identification number is input (or the person desiring to use the vehicle M is verified as the authorized user of the vehicle M through the personal authentication), the vehicle M may be made in its usable condition as normal (for example, operation permission signals are sent to all of the ECUs). Here, the personal authentication is not limited to the entry of the personal identification number. For example, the insertion operation of a preselected CD may be adopted.

When the vehicle M was made in its usable condition (or the arming mode was canceled) through such personal authentication being rather supplemental, using a radio wave communication unit or the like, it may be reported for confirmation to a security company or an authorized user of the vehicle M (such as an owner of the vehicle M).

Using the antitheft device according to the above third embodiment, the authentication of whether or not a person is the authorized user of the vehicle M is conducted based on multiple different items of biometric information about the body (here, a fingerprint and a voice print). And when the person was authenticated through all of the items of biometric information about the body, all of the ECUs are allowed to operate, while when the person was authenticated only through a part of the items of biometric information, only a part of the ECUs are allowed to operate, so that the permitted ranges of operation are differentiated. But in an antitheft device according to another embodiment, based on one item of biometric information about the body (such as a voice print), the permitted ranges of operation may be differentiated according to the authentication levels. For example, when a person desiring to use the vehicle M is admitted as the authorized user thereof at a level of 99% or more, all of the ECUs may be allowed to operate, while a part of the ECUs may be allowed to operate when the person desiring to use the vehicle M is admitted as the authorized user thereof at a level from 90% inclusive to 99% exclusive.

By the way, it is preferable to keep the units used for biometric authentication (such as the fingerprint acquisition unit 75, voice acquisition unit 76 and a camera for taking pictures of faces) in the OFF state for power savings in the power OFF mode during parking. In an antitheft device according to another embodiment, a sensor for monitoring the periphery of the vehicle M may be arranged so that these units are allowed to start operating when an approaching object toward the vehicle M was detected. Since particularly the camera consumes a large amount of power, it is very important to limit the operating period of time thereof.

It is possible to judge whether or not the approaching person toward the vehicle M is the authorized user thereof from the biometric authentication. Therefore, in an antitheft device according to another embodiment, the arming mode may be canceled or the doors may be unlocked when the biometric authentication could be obtained. Thus it becomes possible to smoothly get on the vehicle.

Figure 10:
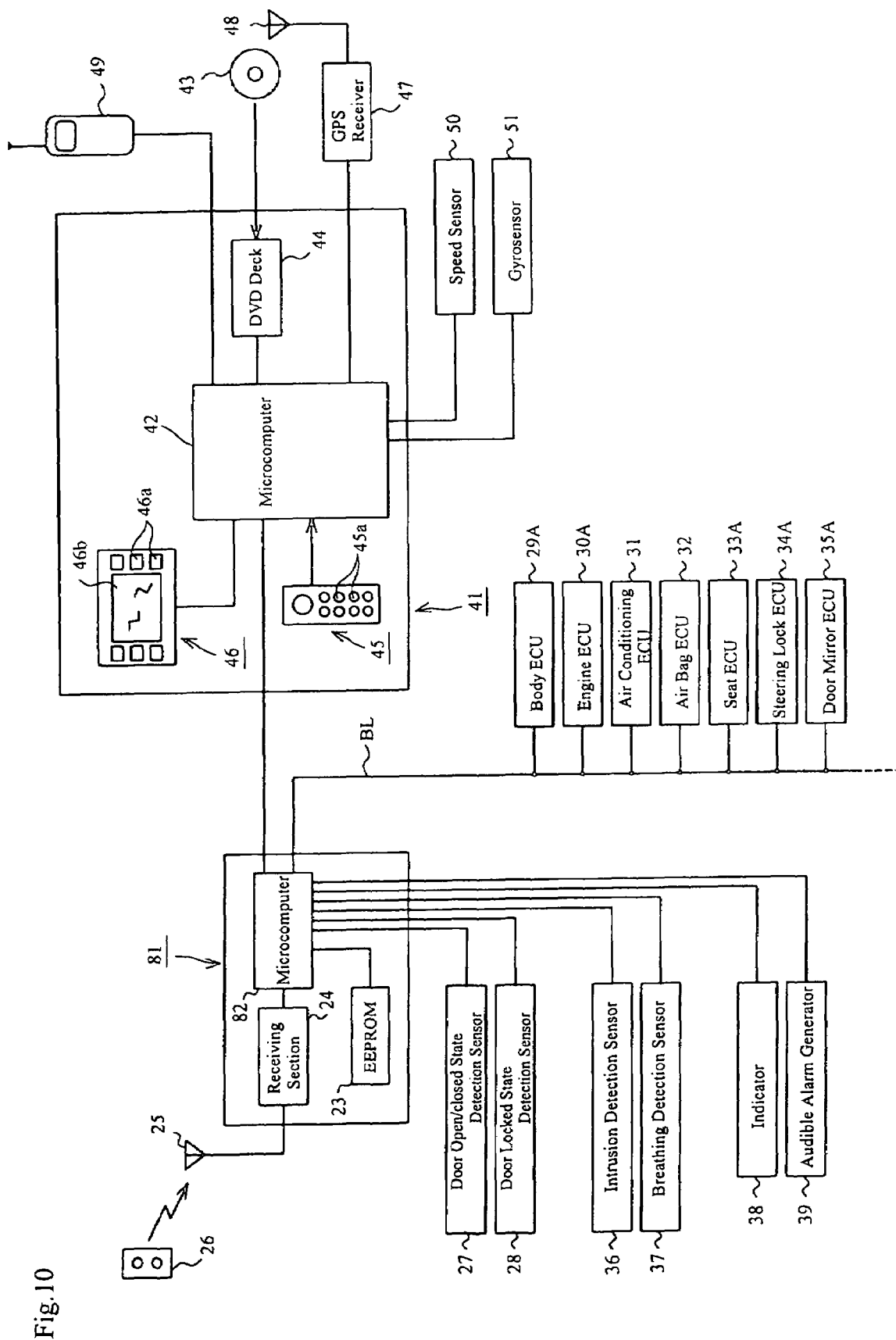
FIG. 10 is a block diagram schematically showing the principal part of an antitheft system comprising an antitheft device according to a fourth embodiment.

FIG. 10 is a block diagram schematically showing the principal part of an antitheft system comprising an antitheft device according to a fourth embodiment. Here, the same components as those of the antitheft system shown in FIG. 1 are similarly marked and are not described here.

Reference numeral 81 in the figure represents an antitheft device comprising a microcomputer 82, an EEPROM 23 and a receiving section 24 for receiving signals sent from a portable transmitter 26, and an antenna 25 is connected to the receiving section 24.

A door open/closed state detection sensor 27 and a door locked state detection sensor 28 are connected to the microcomputer 82, wherein the open/closed state of doors and the locked state thereof can be grasped. And the microcomputer 82 is connected to a bus line BL and is connected through the bus line BL to a body ECU 29A, an engine ECU 30A, an air conditioning ECU 31, an air bag ECU 32, a seat ECU 33A, a steering lock ECU 34A, a door mirror ECU 35A and the like.

Here, each of these ECUs is assigned an individual identification number. The body ECU 29A has an identification number '01', the engine ECU 30A has '02', the air-conditioning ECU 31 has '03', the air bag ECU 32 has '04', the seat ECU 33A has '05', the steering lock ECU 34A has '06', and the door mirror ECU 35A has '07'.

The body ECU 29A has a function of smoking windows when receiving an arming signal sent to itself, while the body ECU 29A has a function of canceling the smoking of the windows when receiving a cancel signal sent to itself.

The engine ECU 30A has a function of fixing a gear at the parking position when receiving an arming signal sent to itself, while the engine ECU 30A has a function of releasing the fixed gear when receiving a cancel signal sent to itself.

The seat ECU 33A has a function of moving forward a seat position (or tilting a backrest portion of a seat toward the front) when receiving an arming signal sent to itself, while the seat ECU 33A has a function of resetting the seat to its original position when receiving a cancel signal sent to itself.

The steering lock ECU 34A has a function of locking a steering wheel when receiving an arming signal sent to itself, while the steering lock ECU 34A has a function of unlocking the steering wheel when receiving a cancel signal sent to itself.

The door mirror ECU 35A has a function of closing door mirrors (or prohibiting the opening operation of the door mirrors) when receiving an arming signal sent to itself, while the door mirror ECU 35A has a function of resetting the door mirrors to their original state when receiving a cancel signal sent to itself.

To the microcomputer 82, an intrusion detection sensor 36, a breathing detection sensor 37, an indicator 38 and an audible alarm generator 39 are connected. In addition, the microcomputer 82 is connected to a microcomputer 42 of multimedia equipment 41 so that data can be exchanged between the microcomputers 82 and 42.

Figure 11:
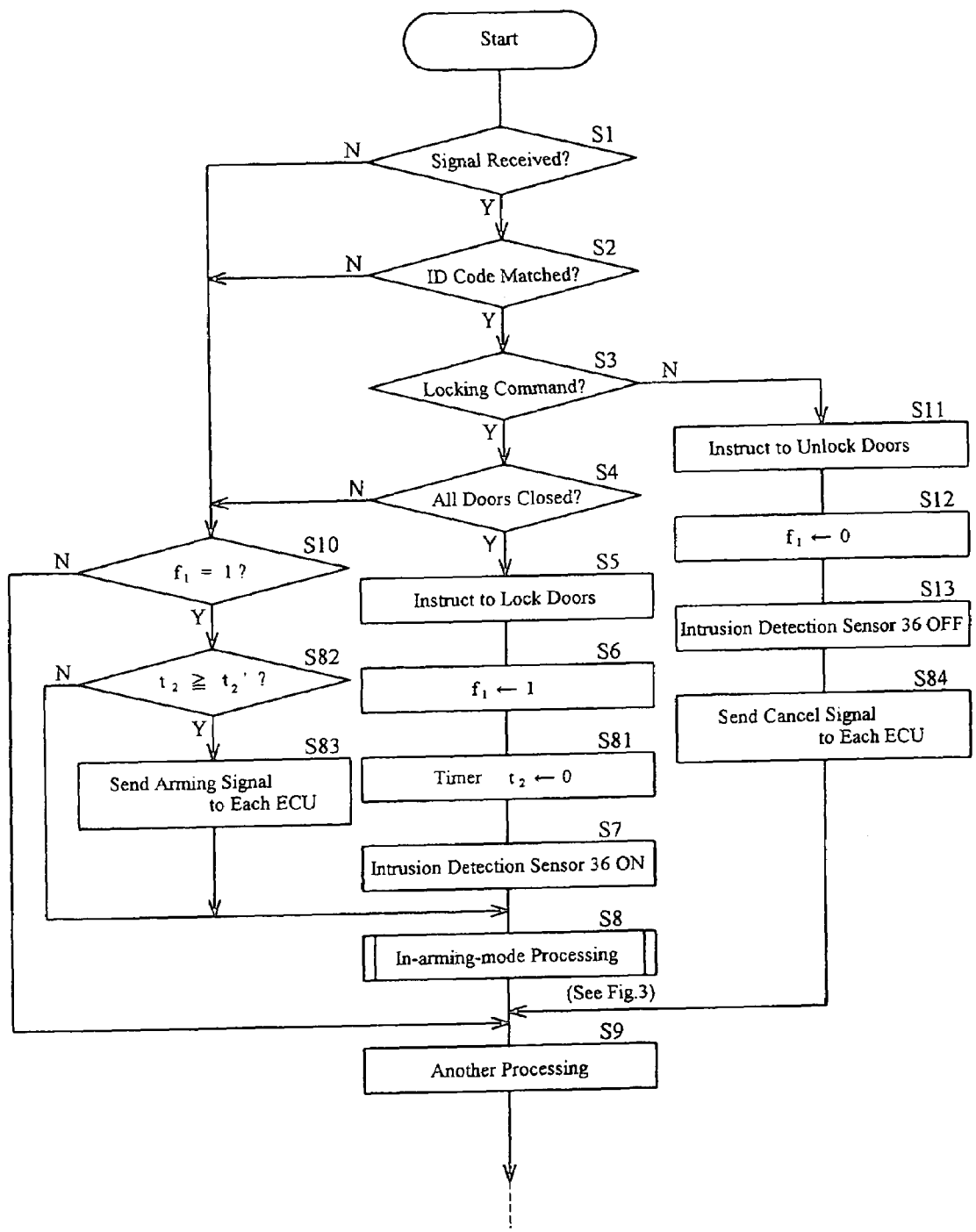
FIG. 11 is a flow chart showing the processing operation performed by a microcomputer in the antitheft device according to the fourth embodiment.

The main operation ④ performed by the microcomputer 82 in the antitheft device 81 according to the fourth embodiment is described below by reference to a flow chart shown in FIG. 11. Here, since the main operation ④ performed by the microcomputer 82 is similar to the processing operation ① performed by the microcomputer 22 in the antitheft device 21 shown in FIG. 2 except for a part thereof, only different portions are described below.

After setting the arming mode by turning a flag $f_1$ to 1 in Step 6, the microcomputer 82 sets a timer $t_2$ at 0 and starts it up (Step 81), and then goes to Step 7.

When the microcomputer 82 judges that the flag $f_1$ is 1 (or the arming mode has been set) in Step 10, whether or not the timer $t_2$ has been counted to a prescribed time $t_2'$ (e.g. 3 minutes) or more is judged (Step 82). When it is judged that the timer $t_2$ has counted to the prescribed time $t_2'$ or more, arming signals are sent to the body ECU 29A, engine ECU 30A, seat ECU 33A, steering lock ECU 34A, door mirror ECU 35A and the like in order to realize a state of inconvenience for driving the vehicle (Step 83). And then, it goes to Step 8. On the other hand, when it is judged that the timer $t_2$ has not counted to the prescribed time $t_2'$ or more, it goes to Step 8 at once.

Here, the arming signals are sent with the identification numbers assigned to each ECU. For example, when a signal made of the identification number '01' with the arming signal being added thereto is supplied to the bus line BL, the windows are smoked by the body ECU 29A. When a signal made of the identification number '02' with the arming signal being added thereto is supplied to the bus line BL, the gear is fixed at the parking position by the engine ECU 30A.

By turning the flag $f_1$ to 0 in Step 12, the microcomputer 82 cancels the arming mode, ends the operation of the intrusion detection sensor 36 in Step 13, and then, sends cancel signals to the body ECU 29A, engine ECU 30A, seat ECU 33A, steering lock ECU 34A, door mirror ECU 35A and the like (Step 84), and then goes to Step 9.

Using the antitheft device according to the above fourth embodiment, the arming signals are output to each ECU when the prescribed time $t_2'$ elapsed after the arming mode setting, and the state of inconvenience for driving the vehicle (for example, a state where a seat position is moved forward so that a person feels hard to get on the vehicle) is realized.

And the state of inconvenience for driving the vehicle can be realized not when stealing was detected (for example, an intruder was detected) but before stealing is detected. Therefore, even if a theft works on the intrusion detection sensor or the like so as not to detect an intrusion into the vehicle, it is impossible to get the vehicle in its normal condition. As a result, it is possible to reduce a desire to steal the vehicle of a person who tries vehicle theft.

Here, in the antitheft device according to the fourth embodiment, when the prescribed time $t_2'$ has elapsed after the arming mode was set, the arming signals are output. But in another embodiment, the arming signals may be output without waiting for the elapse of the prescribed time $t_2'$ after setting of the arming mode.

Here, only the cases where the windows are smoked, the gear is fixed, the seat position is moved, the steering wheel is locked, or the door mirrors are closed in order to implement the state of inconvenience for driving the vehicle were described, but the state of inconvenience for driving the vehicle is not limited to these cases. Other situations such as a state of prohibited battery charging may be realized.

In an antitheft device according to another embodiment, the arming mode may have two or more levels, so that a user can freely select a level so as to set the vehicle environment according to the level. For example, the arming mode has two different levels and at the higher level, a state of inconvenience for driving the vehicle may be realized by moving a seat position or a steering wheel position when the arming mode was set. On the other hand, at the lower level, the seat position or the steering wheel position is not moved when the arming mode was set, and thereafter, when a stolen state was detected (for example, when an intruder into the vehicle was detected), a situation where the intruder can be captured may be realized by moving the seat position or the steering wheel position, or titling a backrest portion of a seat toward the front.

In the antitheft devices according to the above first through fourth embodiments, with the timing when the arming mode was set, or the timing when the vehicle M came into a stolen state, the control such as smoking the door windows or prohibiting lighting of the lamps is conducted, but these control instructions may be remotely controlled from the outside (such as a security company or an owner of the vehicle) through a communication unit. Here, it is preferable not to constantly enable the remote control but to limit the remote control to cases where the stolen state was detected.

Figure 12:
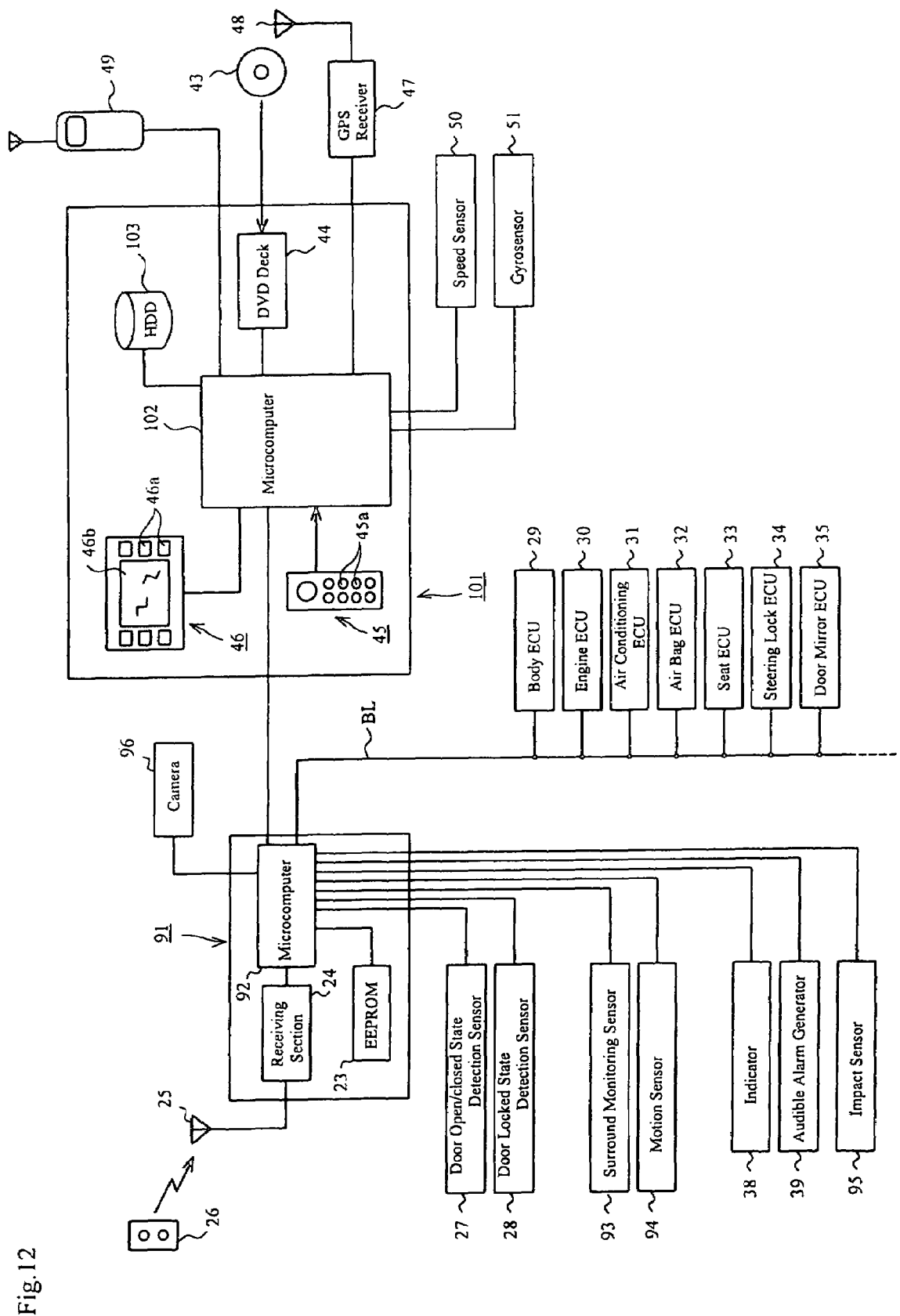
FIG. 12 is a block diagram schematically showing the principal part of an antitheft system comprising an antitheft device according to a fifth embodiment.

FIG. 12 is a block diagram schematically showing the principal part of an antitheft system comprising an antitheft device according to a fifth embodiment. Here, the same components as those of the antitheft system shown in FIG. 1 are similarly marked and are not described here.

Reference numeral 91 in the figure represents an antitheft device comprising a microcomputer 92, an EEPROM 23 and a receiving section 24 for receiving signals sent from a portable transmitter 26, and an antenna 25 is connected to the receiving section 24.

A door open/closed state detection sensor 27 and a door locked state detection sensor 28 are connected to the microcomputer 92, wherein the open/closed state of doors and the locked state thereof can be grasped. And the microcomputer 92 is connected to a bus line BL and is connected through the bus line BL to a body ECU 29, an engine ECU 30, an air conditioning ECU 31, an air bag ECU 32, a seat ECU 33, a steering lock ECU 34, a door mirror ECU 35 and the like.

Figure 13:
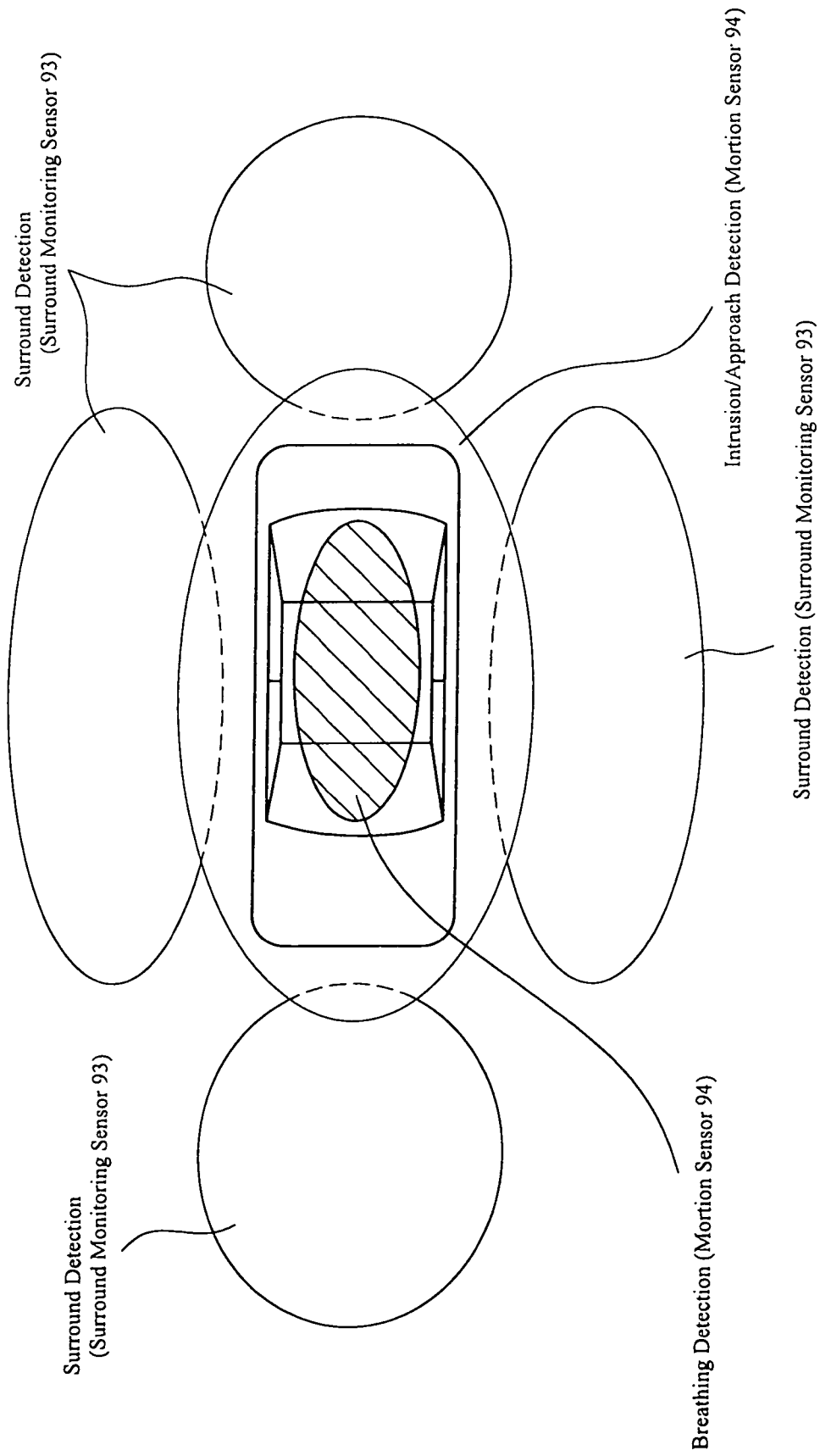
FIG. 13 is an illustration of the detection areas of surround monitoring sensors and the detection areas of motion sensors.

To the microcomputer 92, a surround monitoring sensor 93 for monitoring the surround of the vehicle M (e.g. within the range of about 1-30 m), a motion sensor 94 (such as a radio wave sensor) for monitoring the periphery of the vehicle M (e.g. within the range of about 0-1 m), an indicator 38, an audible alarm generator 39, an impact sensor 95 for detecting an impact applied to the vehicle M and a camera 96 for taking pictures of the periphery of the vehicle M are connected. FIG. 13 is an illustration of the detection area of the surround monitoring sensor 93 and that of the motion sensor 94.

In addition, the microcomputer 92 is connected to a microcomputer 102 of multimedia equipment 101 so that data can be exchanged between the microcomputers 92 and 102. Here, the multimedia equipment 101 has a hard disk 103, in which data of various types can be stored.

Figure 14:
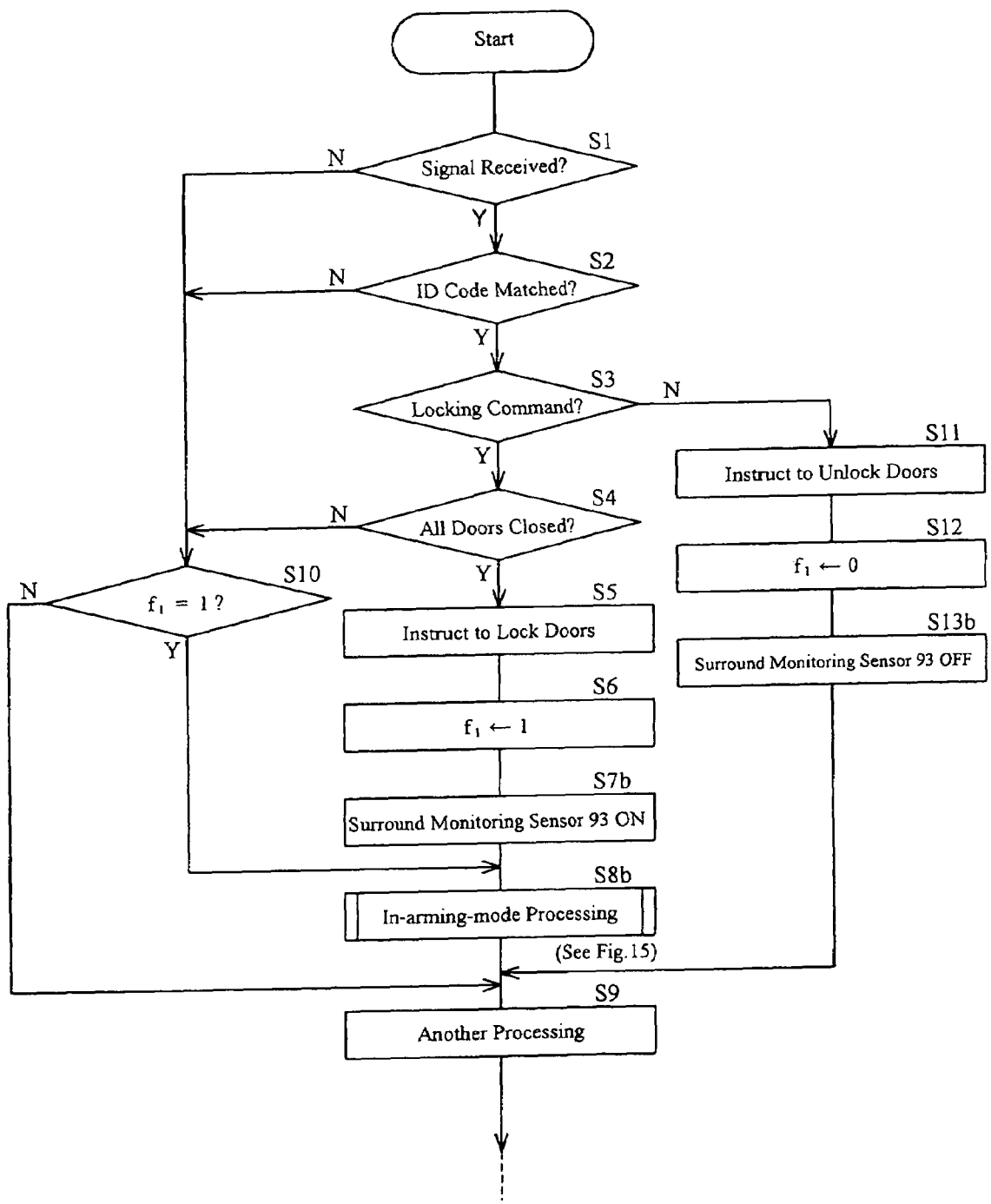
FIG. 14 is a flow chart showing the processing operation performed by a microcomputer in the antitheft device according to the fifth embodiment.

The main operation ⑤ performed by the microcomputer 92 in the antitheft device according to the fifth embodiment is described below by reference to a flow chart shown in FIG. 14. Here, since the main operation ⑤ is similar to the main operation ① performed by the microcomputer 22 in the antitheft device 21 except for Steps 7, 8 and 13, only different Steps 7b, 8b (see FIG. 15) and 13b are described below. In Step 7b, the processing to actuate the surround monitoring sensor 93 is conducted, while in Step 13b, the processing to end the operation of the surround monitoring sensor 93 is conducted.

Figure 15A:
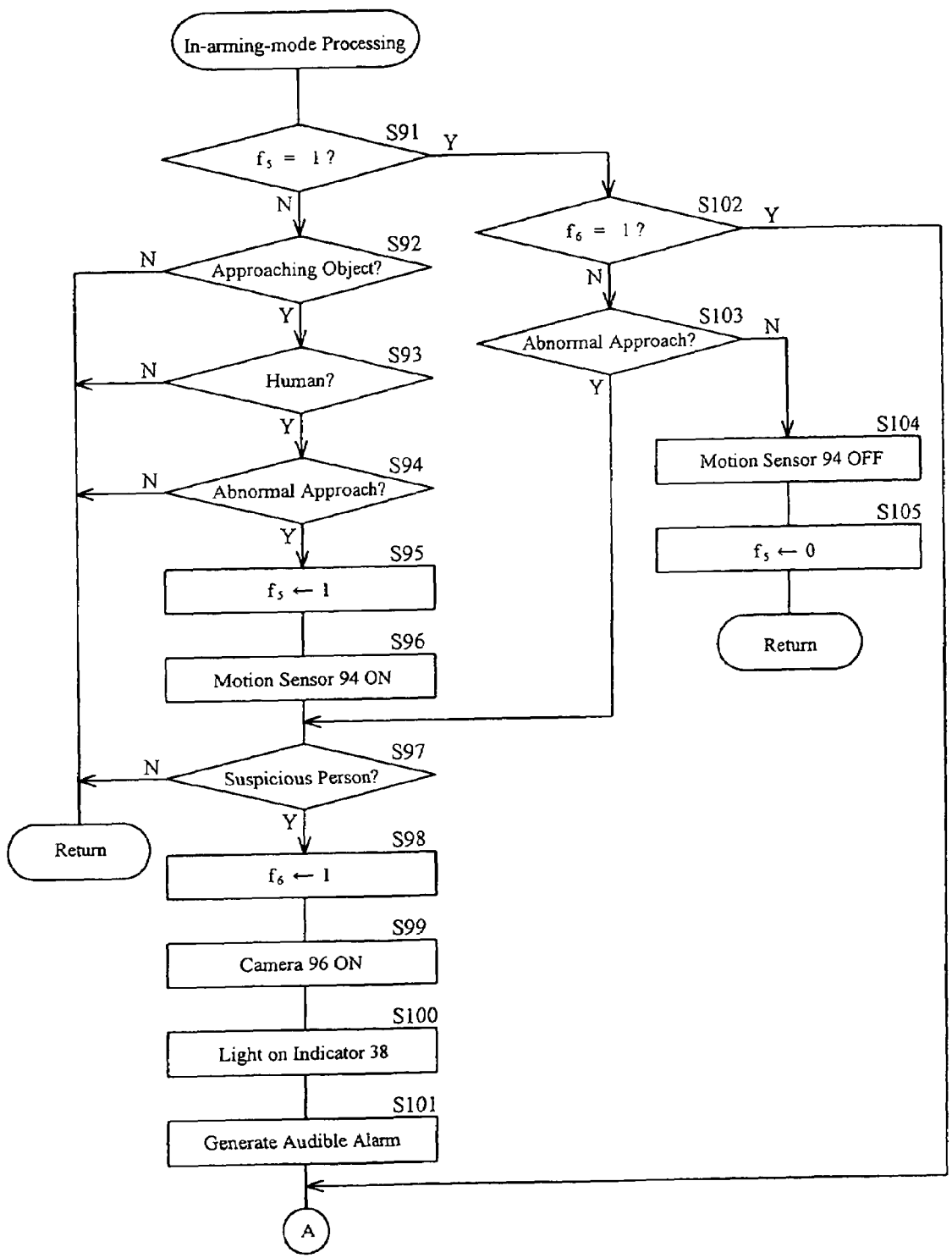
FIG. 15A is a flow chart showing the processing operation performed by the microcomputer in the antitheft device according to the fifth embodiment.

The 'in-arming-mode processing' operation ⑤-a performed by the microcomputer 92 in the antitheft device 91 according to the fifth embodiment is described below by reference to a flow chart shown in FIG. 15. First, whether a flag $f_5$ is 1 or not is judged (when the flag $f_5$ is 1, it indicates that an approaching object too close to the vehicle M was detected) (Step 91).

When it is judged that the flag $f_5$ is not 1 (or an approaching object T toward the vehicle M has not been detected), whether or not the approaching object T toward the vehicle M was detected by the surround monitoring sensor 93 is judged (Step 92). When it is judged that the approaching object T was detected, whether or not the approaching object T is a human is judged based on information obtained from the surround monitoring sensor 93 (Step 93). Here, as a method for judging whether or not the approaching object T is a human, a method is exemplified, wherein whether or not the speed of the approaching object T is not more than 10 km/h is judged.

When it is judged that the approaching object T is a human in Step 93, whether or not the approaching object T is abnormally close to the vehicle M (for example, whether or not the approaching object T is within the range of 2 m from the vehicle M) is judged (Step 94). When it is judged that the approaching object T is abnormally close thereto, the flag $f_5$ is changed to 1 (Step 95), and the motion sensor 94 for monitoring the periphery of the vehicle M is actuated (Step 96). Then, based on information obtained from the motion sensor 94, whether or not the approaching object T is doing some activity around the vehicle M is judged (Step 97).

Here, as a method for judging whether or not the approaching object T is doing some activity around the vehicle M based on the information obtained from the motion sensor 94, a method is exemplified, wherein whether or not the detected period of time of the approaching object T by the motion sensor 94 is long is judged. When the detected period of time is long, it can be judged that the approaching object T is not just a passerby but a person hanging around.

Figure 15B:
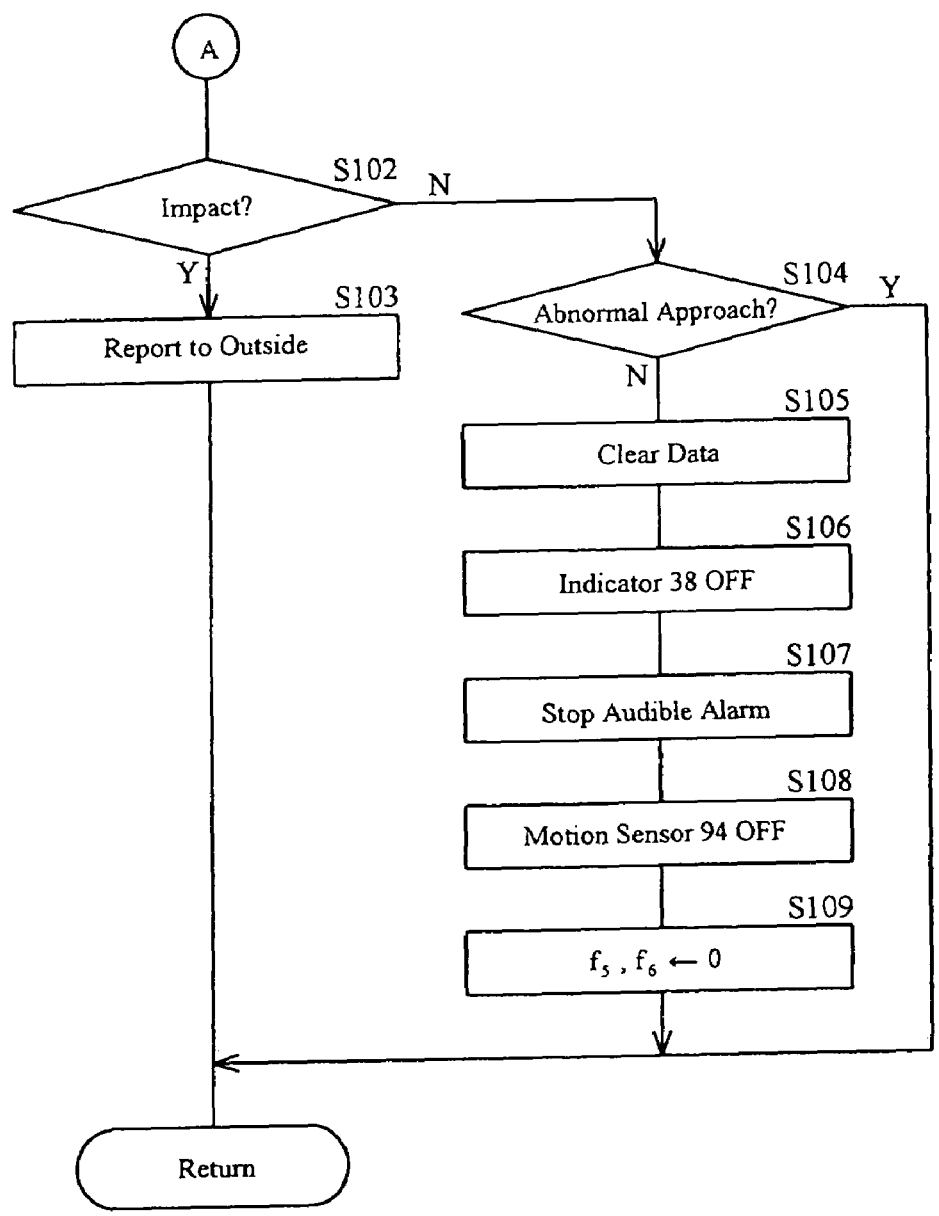
FIG. 15B is a flow chart showing the processing operation performed by the microcomputer in the antitheft device according to the fifth embodiment.

When it is judged that the approaching object T is doing some activity around the vehicle M, the approaching object T is determined as a suspicious person, and a flag $f_6$ is turned to 1 (Step 98). The camera 96 is switched on so that pictures of the periphery of the vehicle M are taken at fixed intervals (Step 99). In order to threat the suspicious person, the indicator 38 is lit on (Step 100) and the audible alarm generator 39 is controlled so as to generate an audible alarm (Step 101). And then, the operation goes to Step 106 (FIG. 15B). Here, the pictorial data obtained from the camera 96 is output to the multimedia equipment 101 so as to be temporarily stored in the hard disk 103.

On the other hand, when it is judged that the approaching object T has not been detected in Step 92, or that the approaching object T is not a human in Step 93, or that the approaching object T is not too close to the vehicle M in Step 94, or that the approaching object T is not a suspicious person in Step 97, the processing operation ⑤-a is ended at once.

When it is judged that the flag $f_5$ is 1 (or there is an approaching object T too close to the vehicle M) in Step 91, whether the flag $f_6$ is 1 or not is judged (Step 102). When it is judged that the flag $f_6$ is 1 (or there is a suspicious person), the operation goes to Step 106 (FIG. 15B). On the other hand, when it is judged that the flag $f_6$ is not 1, whether or not the approaching object T is too close to the vehicle M even now is judged (Step 103).

When it is judged that the approaching object T is too close to the vehicle M even now, the operation goes to Step 97, wherein whether or not the approaching object T is a suspicious person is judged. On the other hand, when it is judged that the approaching object T went away from the vehicle M, the motion sensor 94 is switched off (Step 104) and the flag $f_5$ is changed to 0 (Step 105). Then, the processing operation ⑤-a is ended.

In Step 106 (FIG. 15B), based on information obtained from the impact sensor 95 being a theft detector here, whether or not the vehicle M has been under the action of an impact is judged. When it is judged that the vehicle M has been under the action of an impact, it is considered that the vehicle M has been in a stolen state and by outputting a theft occurrence signal to the multimedia equipment 101, it is reported to the outside (Step 103). A warning display or the like may be shown on a display panel of the multimedia equipment 101.

On the other hand, when it is judged that no impact has been applied to the vehicle M, whether or not the approaching object T is too close to the vehicle M even now is judged (Step 104). When it is judged that the approaching object T is too close to the vehicle M even now, the processing operation ⑤-a is ended at once. On the other hand, when it is judged that the approaching object T went away from the vehicle M, the pictorial data stored in the hard disk 103 is cleared (Step 105), the indicator 38 is turned off (Step 106), the audible alarm generator 39 is controlled so as to stop generating the audible alarm (Step 107), the motion sensor 94 is switched off (Step 108), the flags $f_5$ and $f_6$ are changed to 0 (Step 109), and the processing operation ⑤-a is ended.

Using the antitheft device according to the above fifth embodiment, not only whether or not an object being present around the vehicle M (e.g. within the range of about 0-1 m) is a suspicious person (for example, whether the detected period of time thereof by the motion sensor 94 is long or not), but also whether or not the object came closer to the surround of the vehicle M (e.g. within the range of about 1-30 m) is judged, and whether or not the object being present around the vehicle M is a suspicious person is judged, so that the judgment can be made with good accuracy.

When it is judged that there is an approaching object toward the vehicle M, monitoring by the motion sensor 94 is started, resulting in a reduced power consumption. Whether or not the vehicle M has been in a stolen state is judged in consideration of not only the information obtained from the impact sensor 95, but also the information that the approaching object toward the vehicle M is a suspicious person, so that the judgment can be made with good accuracy. Here, as a theft detector, the impact sensor 95 is adopted, but the theft detector is not limited to the impact sensor 95. Other sensors such as a tilting sensor for detecting the tilt of the vehicle M or a vibration sensor for detecting vibrations of the vehicle M may be adopted.

Figure 16:
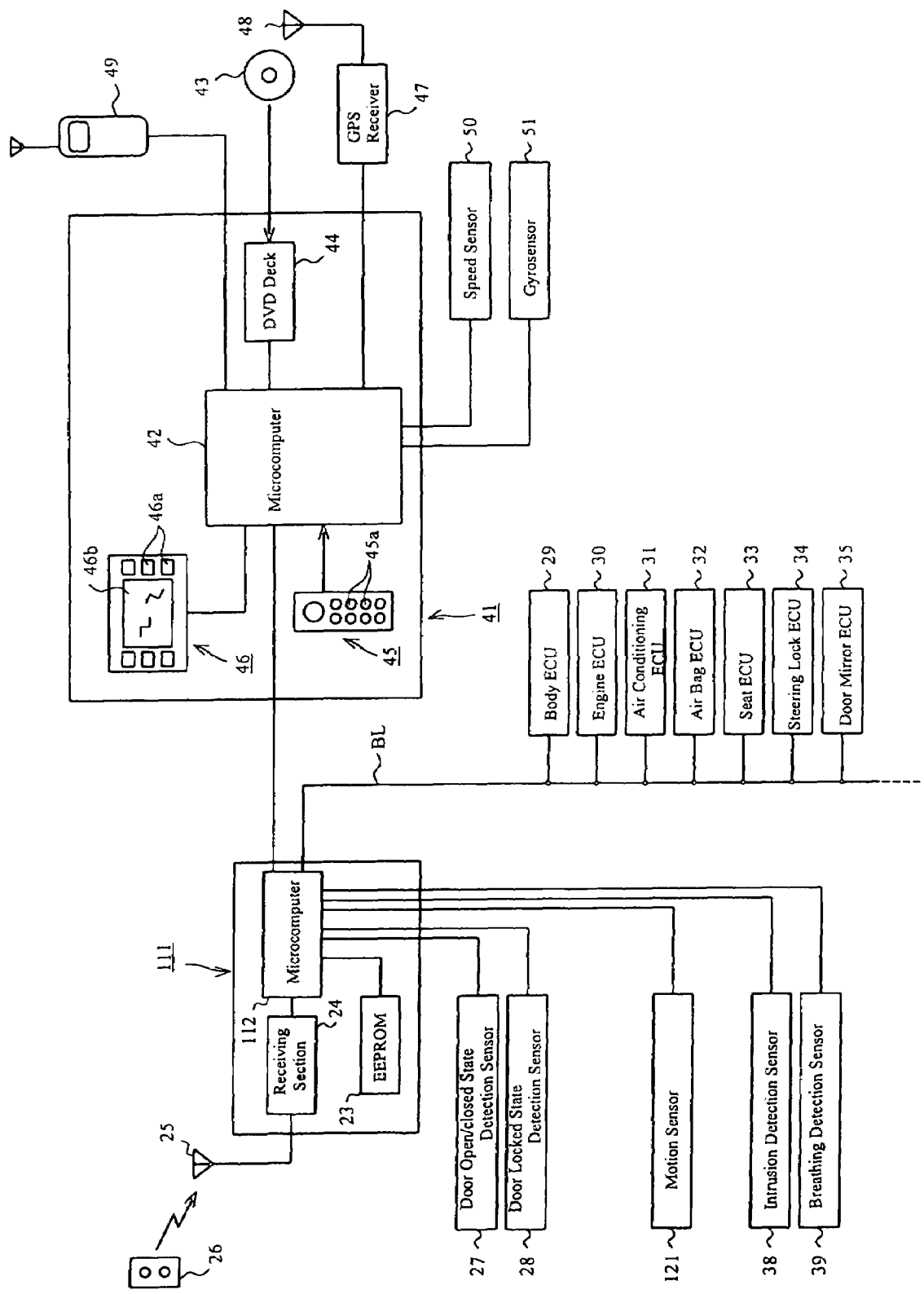
FIG. 16 is a block diagram schematically showing the principal part of an antitheft system comprising an antitheft device according to a sixth embodiment.

FIG. 16 is a block diagram schematically showing the principal part of an antitheft system comprising an antitheft device according to a sixth embodiment. Here, the same components as those of the antitheft system shown in FIG. 1 are similarly marked and are not described here.

Reference numeral 111 in the figure represents an antitheft device comprising a microcomputer 112, an EEPROM 23 and a receiving section 24 for receiving signals sent from a portable transmitter 26, and an antenna 25 is connected to the receiving section 24.

A door open/closed state detection sensor 27 and a door locked state detection sensor 28 are connected to the microcomputer 112, wherein the open/closed state of doors and the locked state thereof can be grasped. And the microcomputer 112 is connected to a bus line BL and is connected through the bus line BL to a body ECU 29, an engine ECU 30, an air conditioning ECU 31, an air bag ECU 32, a seat ECU 33, a steering lock ECU 34, a door mirror ECU 35 and the like.

To the microcomputer 112, a motion sensor 121 (such as a radio wave sensor) for monitoring the periphery of the vehicle M (e.g. within the range of about 0-1 m), an indicator 38 and an audible alarm generator 39 are connected. In addition, the microcomputer 112 is connected to a microcomputer 42 of multimedia equipment 41 so that data can be exchanged between the microcomputers 112 and 42.

Figure 17:
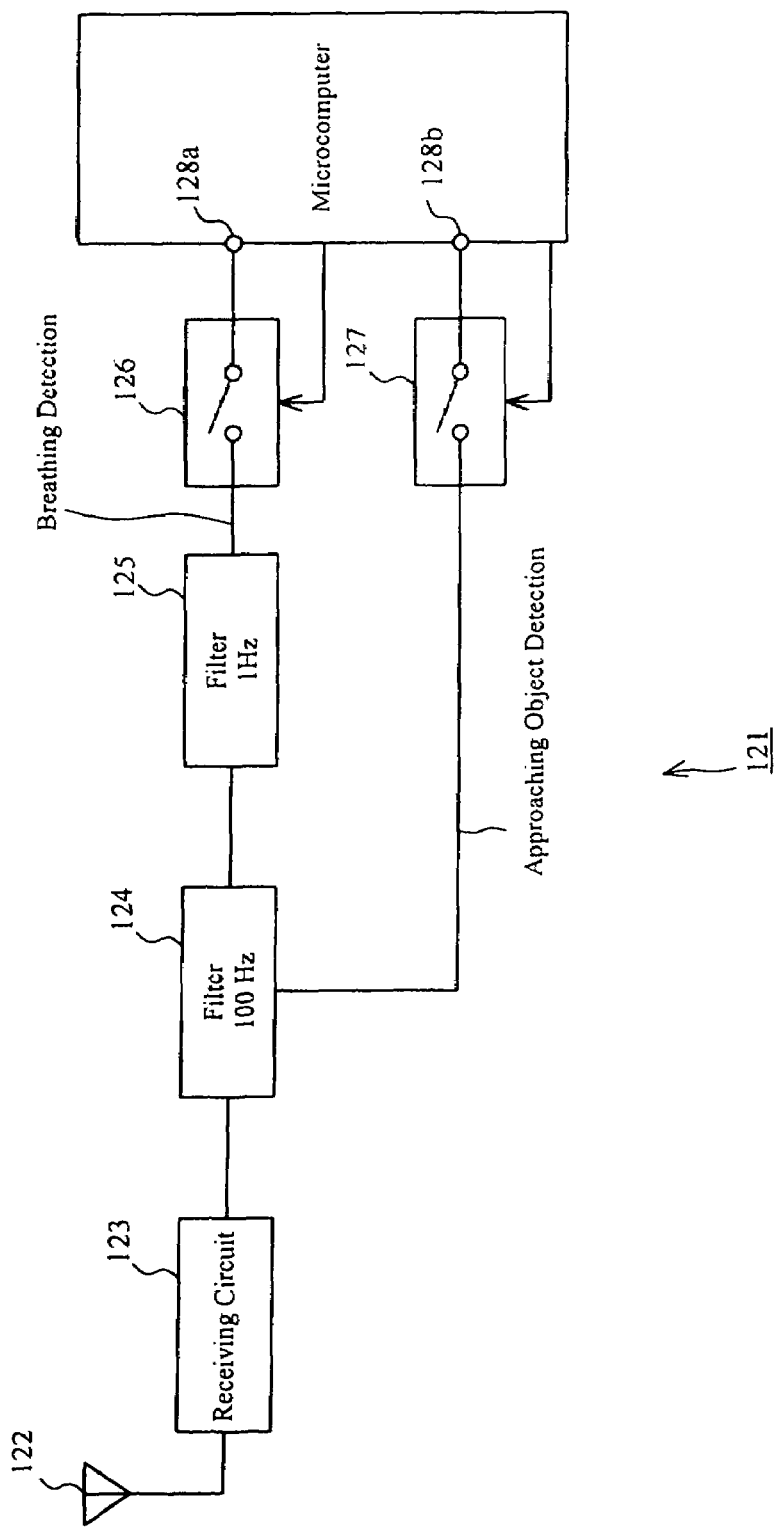
FIG. 17 is a block diagram schematically showing the principal part of a motion sensor.

FIG. 17 is a block diagram schematically showing the principal part of the motion sensor 121. The motion sensor 121 comprises an antenna 122, a receiving circuit 123, a filter 124 for capturing signals of frequencies of 100 Hz or less, a filter 125 for capturing signals of frequencies of 1 Hz or less, switches 126 and 127, and a microcomputer 128.

The microcomputer 128 can control the ON/OFF switching of the switches 126 and 127. For example, when the switch 127 is turned in the ON state, signals within a bandwidth of 100 Hz or less are captured. That is suitable for detecting the motions of human hands which are expressed by signals of 20-100 Hz, so that an approaching object T toward the vehicle M can be detected. On the other hand, when the switch 126 is turned in the ON state, signals within a bandwidth of 1 Hz or less are captured. That is suitable for detecting the motions of a human chest in breathing which are expressed by signals of about 0.5 Hz, so that breathing of the approaching object T can be detected.

Figure 18:
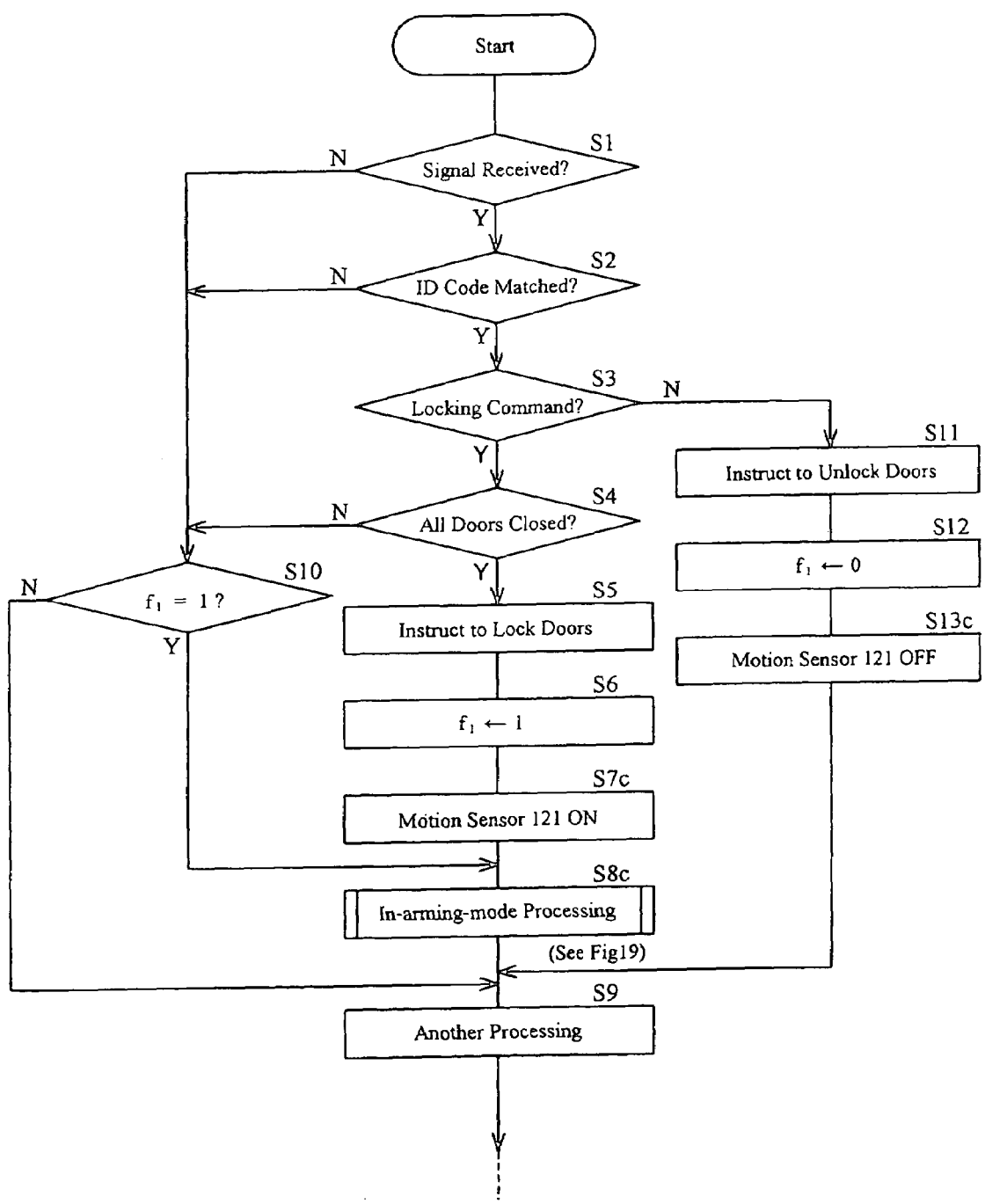
FIG. 18 is a flow chart showing the processing operation performed by a microcomputer in the antitheft device according to the sixth embodiment.

The main operation ⑥ performed by the microcomputer 112 in the antitheft device according to the sixth embodiment is described below by reference to a flow chart shown in FIG. 18. Here, since the main operation ⑥ is similar to the main operation ① performed by the microcomputer 22 in the antitheft device 21 except for Steps 7, 8 and 13, only different Steps 7c, 8c (see FIG. 19) and 13c are described below. In Step 7c, the processing to actuate the motion sensor 121 (at this time, the switch 126 is in the OFF state while the switch 127 is in the ON state) is conducted, while in Step 13c, the processing to end the operation of the motion sensor 121 is conducted.

Figure 19:
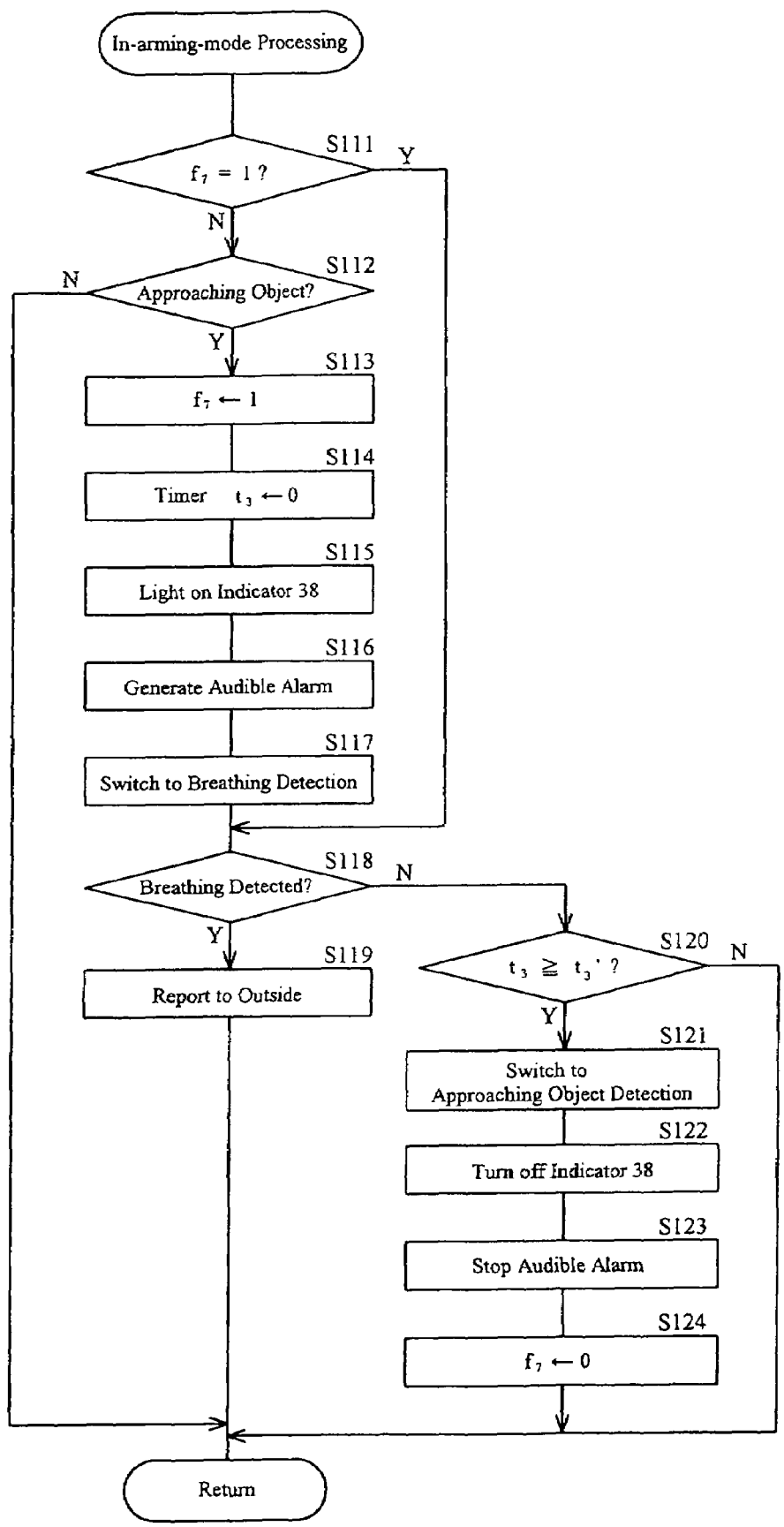
FIG. 19 is a flow chart showing the processing operation performed by the microcomputer in the antitheft device according to the sixth embodiment.

The 'in-arming-mode processing' operation ⑥-a performed by the microcomputer 112 in the antitheft device 111 according to the sixth embodiment is described below by reference to a flow chart shown in FIG. 19. First, whether a flag $f_7$ is 1 or not is judged (when the flag $f_7$ is 1, it indicates that an approaching object toward the vehicle M was detected) (Step 111).

When it is judged that the flag $f_7$ is not 1 (or no approaching object T toward the vehicle M has been detected), whether or not the approaching object T toward the vehicle M was detected is judged based on information obtained from the motion sensor 121 (Step 112). When it is judged that the approaching object T was detected, the flag $f_7$ is turned to 1 (Step 113), and a timer $t_3$ is set at 0 and is started up (Step 114). In order to threat the approaching object T, the indicator 38 is lit on (Step 115), and the audible alarm generator 39 is controlled so as to generate an audible alarm (Step 116). By making the switch 127 in the OFF state and making the switch 126 in the ON state, a situation where breathing of the approaching object T can be detected is realized (Step 117).

Based on information obtained from the motion sensor 121, whether or not breathing was detected is judged (Step 118). When it is judged that breathing was detected, the approaching object T toward the vehicle M is considered as a theft and by outputting a theft occurrence signal to the multimedia equipment 41, it is reported to the outside (Step 119). A warning display may be shown on a display panel of the multimedia equipment 41.

On the other hand, when it is judged that breathing has not been detected, whether or not the timer $t_3$ has counted to a prescribed time $t_3'$ or more is judged (Step 120). When it is judged that the timer $t_3$ has counted to the prescribed time $t_3'$ or more, by making the switch 126 in the OFF state and making the switch 127 in the ON state, a situation where an approaching object toward the vehicle M can be detected is realized (Step 121), the indicator 38 is turned off (Step 122), the audible alarm generator 39 is controlled so as to stop generating the audible alarm (Step 123), and then, the flag $f_7$ is changed to 0 (Step 124). On the other hand, when it is judged that the timer $t_3$ has not counted to the prescribed time $t_3'$ or more in Step 120, the processing operation ⑥-a is ended at once.

When it is judged that the flag $f_7$ is 1 (or an approaching object toward the vehicle M was detected) in Step 111, the operation bypasses Steps 112-117 and goes to Step 118, wherein whether or not breathing was detected is judged. When it is judged that no approaching object toward the vehicle M has been detected in Step 112, the processing operation ⑥-a is ended at once.

Using the antitheft device according to the above sixth embodiment, whether or not the approaching object T toward the vehicle M is a suspicious person is judged in consideration of not only the information of the presence or absence of the approaching object T toward the vehicle M, but also the information of a possibility that the approaching object T is a human (here, the presence or absence of breathing), so that the judgment can be made with good accuracy.

Both the information which forms the basis for judging whether or not there is an approaching object T toward the vehicle M, and the information which forms the basis for judging whether or not there is a possibility that the approaching object T is a human can be obtained from the motion sensor 121, so that no other monitoring device is required, resulting in a reduced cost. At this time, the filter of the motion sensor is switched according to the type of motions to be detected (such as motions of hands or a chest), so that highly accurate detection can be conducted. Here, the approaching object detection and the breathing detection are switched therebetween, but in another embodiment, these detections may be conducted simultaneously.

In the antitheft device according to the above sixth embodiment, as the periphery monitoring unit of the vehicle M, the motion sensor 121 is adopted. Bur in an antitheft device according to another embodiment, a body temperature detector (such as an infrared ray sensor) may be adopted, wherein approach of an object having a temperature of about 35-40° C. is detected, and after detecting an approaching object, the motion of the object is detected so that whether or not there is a possibility that the object is a human is judged. At this time, a construction may be adopted, wherein multiple detecting elements of the infrared ray sensor are arranged, the detecting elements are partly operated in the initial monitoring condition so that whether or not there is a living thing is detected using a few of the detecting elements, and when the presence of a living thing is detected, the shape or motion of the living thing is detected by operating all of the detecting elements. Thus, it becomes possible both to reduce a power consumption and to improve the detection accuracy.

Figure 20:
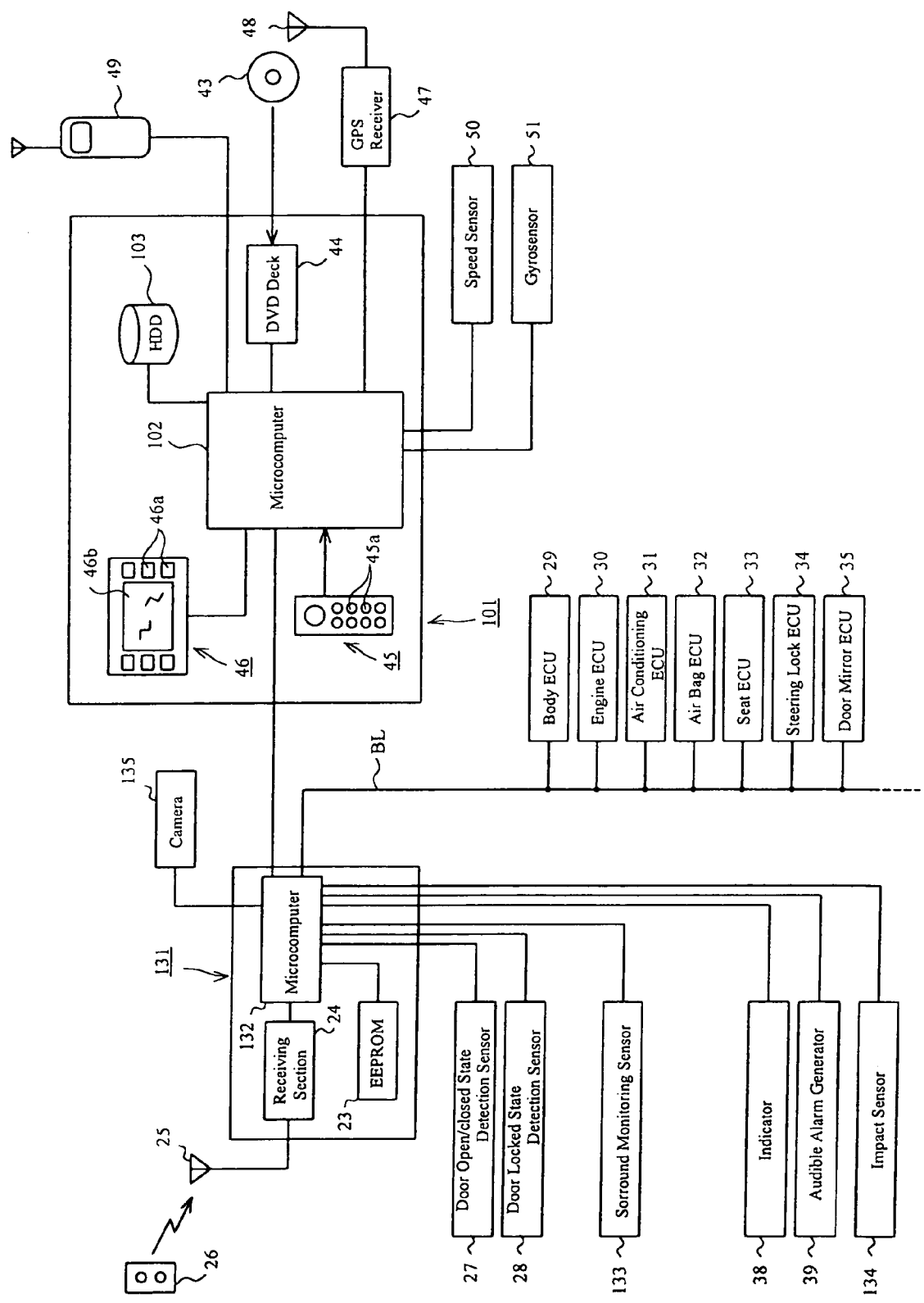
FIG. 20 is a block diagram schematically showing the principal part of an antitheft system comprising a monitoring device according to a seventh embodiment.

FIG. 20 is a block diagram schematically showing the principal part of an antitheft system comprising a monitoring device according to a seventh embodiment. Here, the same components as those of the antitheft system shown in FIG. 1 are similarly marked and are not described here. Reference numeral 131 in the figure represents a monitoring device comprising a microcomputer 132, an EEPROM 23 and a receiving section 24 for receiving signals sent from a portable transmitter 26, and an antenna 25 is connected to the receiving section 24.

A door open/closed state detection sensor 27 and a door locked state detection sensor 28 are connected to the microcomputer 132, wherein the open/closed state of doors and the locked state thereof can be grasped. And the microcomputer 132 is connected to a bus line BL and is connected through the bus line BL to a body ECU 29, an engine ECU 30, an air conditioning ECU 31, an air bag ECU 32, a seat ECU 33, a steering lock ECU 34, a door mirror ECU 35 and the like.

To the microcomputer 132, a surround monitoring sensor 133 for monitoring the surround of the vehicle M (e.g. within the range of about 1-30 m), an indicator 38, an audible alarm generator 39, an impact sensor 134 for detecting an impact applied to the vehicle M and a camera 135 for taking pictures of the surround of the vehicle M are connected. In addition, the microcomputer 132 is connected to a microcomputer 102 of multimedia equipment 101 so that data can be exchanged between the microcomputers 132 and 102. Here, the multimedia equipment 101 has a hard disk 103, in which data of various types can be stored.

Figure 21:
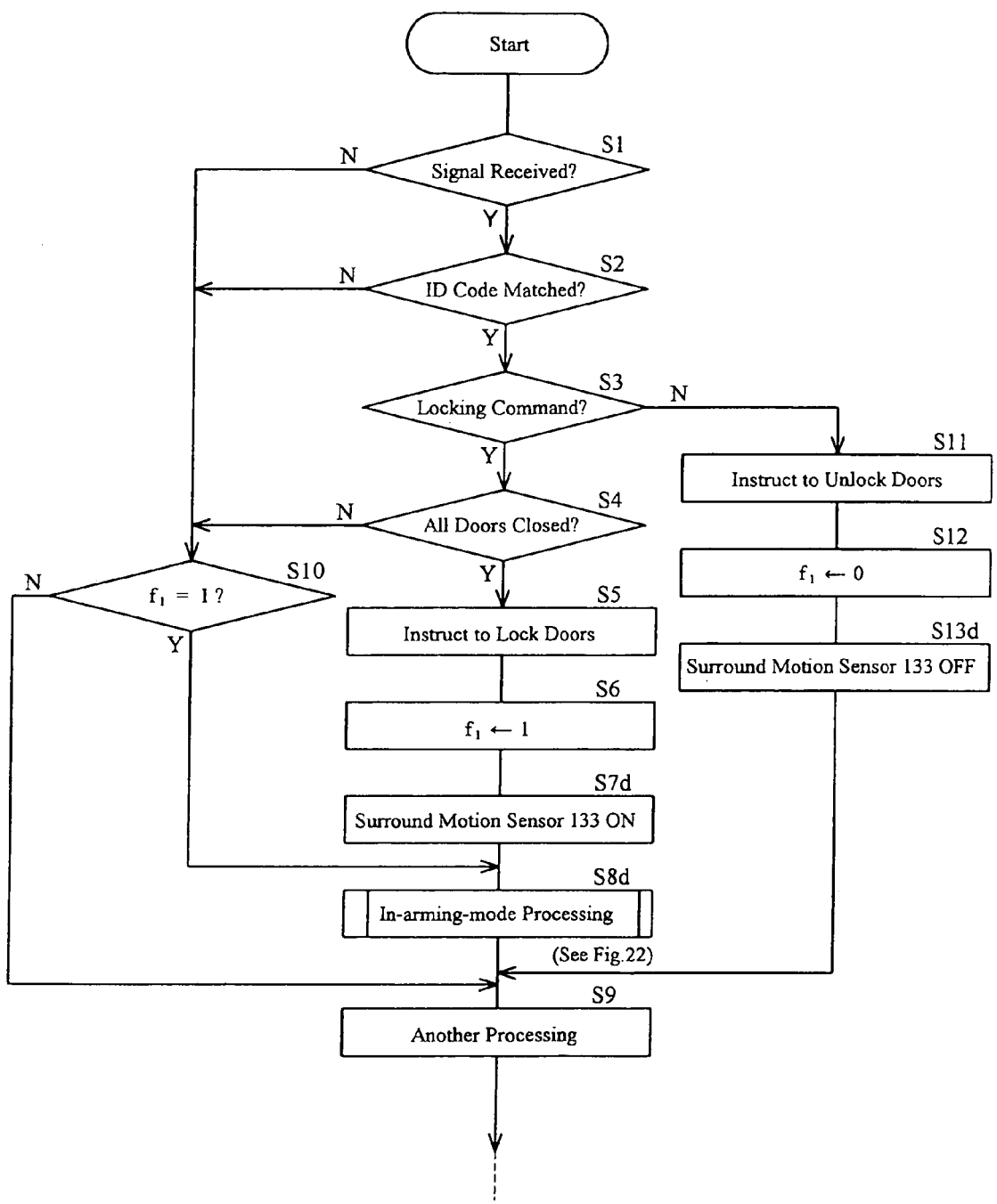
FIG. 21 is a flow chart showing the processing operation performed by a microcomputer in the monitoring device according to the seventh embodiment.

The main operation ⑦ performed by the microcomputer 132 in the monitoring device according to the seventh embodiment is described below by reference to a flow chart shown in FIG. 21. Here, since the main operation ⑦ is similar to the main operation ① performed by the microcomputer 22 in the antitheft device 21 except for Steps 7, 8 and 13, only different Steps 7d, 8d (see FIG. 22) and 13d are described below. In Step 7d, the processing to actuate the surround monitoring sensor 133 is conducted, while in Step 13d, the processing to end the operation of the surround monitoring sensor 133 is conducted.

Figure 22:
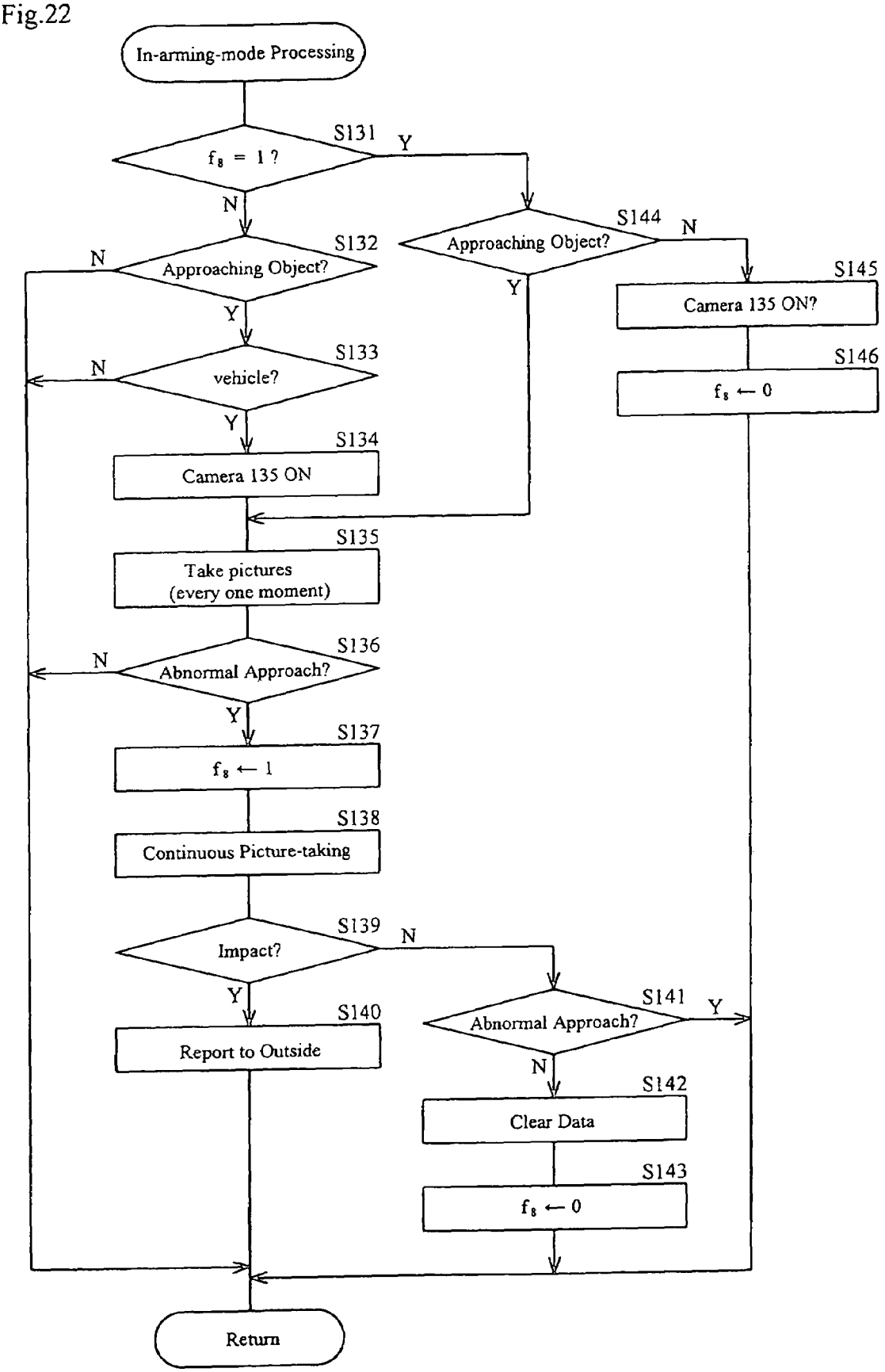
FIG. 22 is a flow chart showing the processing operation performed by the microcomputer in the monitoring device according to the seventh embodiment.

The 'in-arming-mode processing' operation ⑦-a performed by the microcomputer 132 in the monitoring device 131 according to the seventh embodiment is described below by reference to a flow chart shown in FIG. 22. First, whether a flag $f_8$ is 1 or not is judged (when the flag $f_8$ is 1, it indicates that a vehicle too close to the vehicle M was detected (Step 131).

When it is judged that the flag $f_8$ is not 1 (or no vehicle too close to the vehicle M has been detected), whether or not an approaching object T toward the vehicle M was detected by the surround monitoring sensor 133 is judged (Step 132). When it is judged that an approaching object T was detected, whether or not the approaching object T is a vehicle is judged based on information obtained from the surround monitoring sensor 93 (Step 133). Here, as a method for judging whether or not the approaching object T is a vehicle, a method is exemplified, wherein whether or not the speed of the approaching object T is not less than 10 km/h is judged.

When it is judged that the approaching object T is a vehicle in Step 133, the camera 135 is switched on (Step 134) and pictures of the surround of the vehicle M are taken at fixed intervals (e.g. every one second) (Step 135). Whether or not another vehicle being the approaching object T is abnormally close to the vehicle M (for example, whether or not the another vehicle is within the range of 5 m from the vehicle M) is judged (Step 136). When it is judged that the another vehicle being the approaching object T is abnormally close thereto, the flag $f_8$ is changed to 1 (Step 137) and pictures of the surround of the vehicle M are continuously taken at shorter intervals (Step 138). Here, the pictorial data obtained from the camera 135 is output to the multimedia equipment 101 so as to be temporarily stored in the hard disk 103 thereof.

Based on information obtained from the impact sensor 134 being an impact detector here, whether or not an impact has been applied to the vehicle M is judged (Step 139). When it is judged that an impact has been applied to the vehicle M, it is considered that the another vehicle being the approaching object T collided with the vehicle M and by outputting a theft occurrence signal to the multimedia equipment 101, it is reported to the outside (Step 140). A warning display or the like may be shown on a display panel of the multimedia equipment 101.

On the other hand, when it is judged that no impact has been applied to the vehicle M, whether or not the another vehicle being the approaching object T is too close to the vehicle M even now is judged (Step 141). When it is judged that the another vehicle being the approaching object T is too close to the vehicle M even now, the processing operation ⑦-a is ended at once. On the other hand, when it is judged that the another vehicle being the approaching object T went away from the vehicle M, the pictorial data stored in the hard disk 103 is cleared (Step 142), the flag $f_8$ is changed to 0 (Step 143), and the processing operation ⑦-a is ended.

On the other hand, when it is judged that no approaching object T has been detected in Step 132, or that the approaching object T is not a vehicle in Step 133, or that the another vehicle being the approaching object T is not too close to the vehicle M in Step 136, the processing operation ⑦-a is ended at once.

When it is judged that the flag $f_8$ is 1 (or there is another vehicle too close to the vehicle M) in Step 131, whether or not the another vehicle is approaching the vehicle M even now is judged based on information obtained from the surround monitoring sensor 133 (Step 144). When it is judged that the another vehicle is approaching the vehicle M, the operation goes to Step 135, wherein pictures thereof are taken. On the other hand, when it is judged that the another vehicle is not approaching the vehicle M, the camera 134 is switched off (Step 145), the flag $f_8$ is changed to 0 (Step 146) and the processing operation ⑦-a is ended.

Using the monitoring device according to the above seventh embodiment, based on the information obtained from the surround monitoring sensor 133 for monitoring the surround of the vehicle M (e.g. within the range of about 1-30 m), whether or not there is another vehicle approaching the vehicle M is judged. When it is judged that there is another vehicle approaching the vehicle M, the picture taking of the surround of the vehicle M is started by the camera 135. Therefore, pictures of the object which gives damage on the vehicle M can be taken. As a result, for example, it becomes possible to identify a person who caused a hit-and-run accident. The camera 135 consumes a high power, so that it is difficult to operate the camera 135 at all times during stop of the vehicle M, but since the picture taking by the camera 135 is started when another vehicle approaching the vehicle M was detected, the above problem can be solved.

In the monitoring device according to the above seventh embodiment, the frequency of the picture taking by the camera 135 is varied based on the position relation between the another vehicle being the approaching object T and the vehicle M. But in a monitoring device according to another embodiment, based on the speed of another vehicle being an approaching object T, the frequency of the picture taking by a camera 135 may be varied. In the monitoring device according to the above seventh embodiment, pictures are taken by the camera only when the approaching object T is a vehicle, but in another embodiment, pictures may be taken by a camera without relation to types of approaching objects T. For example, even when the approaching object T is a human, pictures may be taken. Thus, it becomes easy to identify a passerby who did mischief on the vehicle M.

Here, as an impact detector, the impact sensor 134 is adopted, but the impact detector is not limited to the impact sensor 134. Other sensors such as a tilting sensor for detecting the tilt of the vehicle M or a vibration sensor for detecting vibrations of the vehicle M may be adopted. The monitoring device according to the above seventh embodiment is used for detecting a hit-and-run on the vehicle M and the like, but can be adopted as an antitheft device as well.

Figure 23:
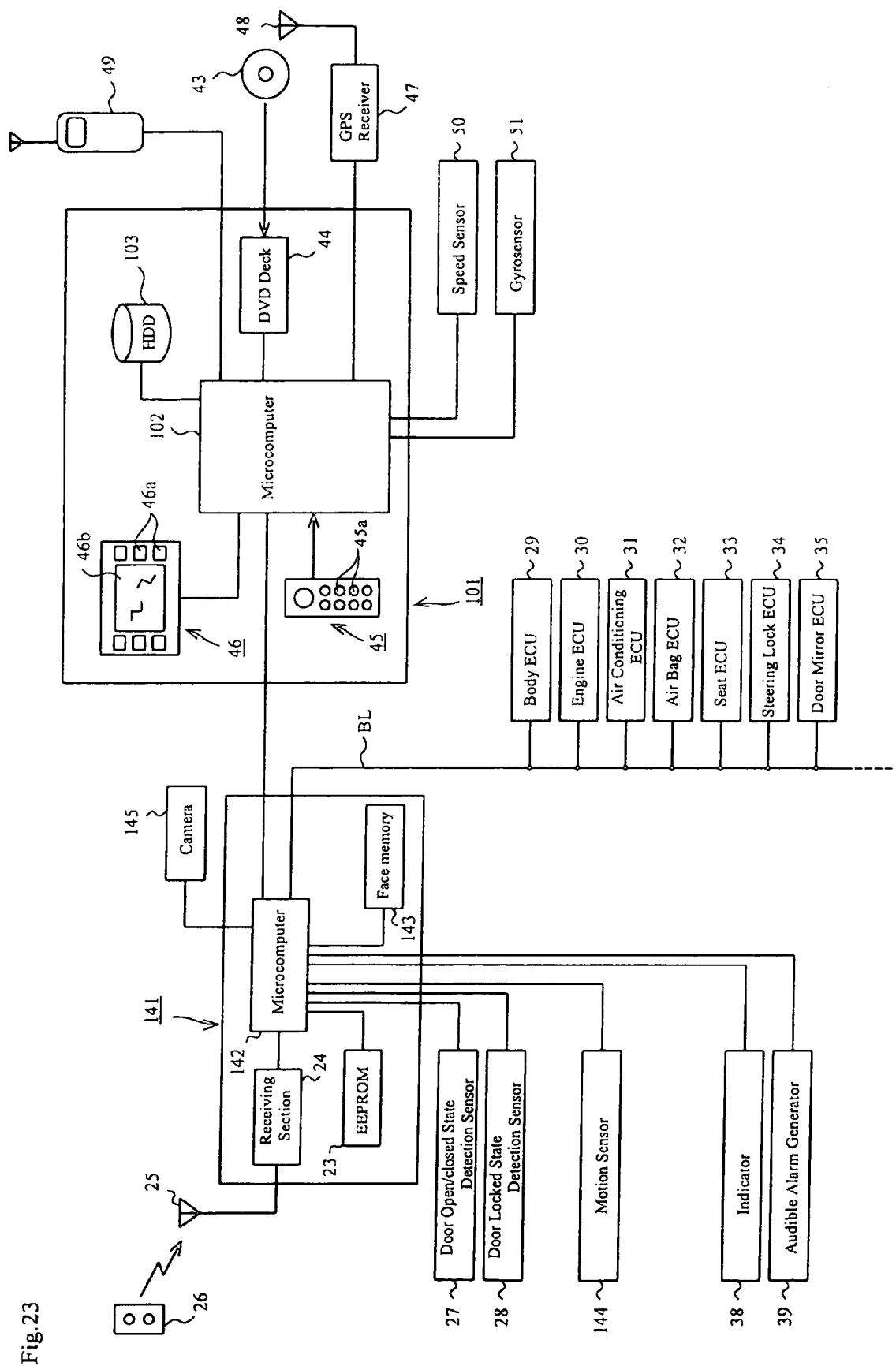
FIG. 23 is a block diagram schematically showing the principal part of an antitheft system comprising a monitoring device according to an eighth embodiment.

FIG. 23 is a block diagram schematically showing the principal part of an antitheft system comprising a monitoring device according to an eighth embodiment. Here, the same components as those of the antitheft system shown in FIG. 1 are similarly marked and are not described here. Reference numeral 141 in the figure represents a monitoring device comprising a microcomputer 142, an EEPROM 23, a receiving section 24 for receiving signals sent from a portable transmitter 26 and a face information storage section 143 for storing information concerning a face of an authorized user of the vehicle M, and an antenna 25 is connected to the receiving section 24.

A door open/closed state detection sensor 27 and a door locked state detection sensor 28 are connected to the microcomputer 142, wherein the open/closed state of doors and the locked state thereof can be grasped. And the microcomputer 142 is connected to a bus line BL and is connected through the bus line BL to a body ECU 29, an engine ECU 30, an air conditioning ECU 31, an air bag ECU 32, a seat ECU 33, a steering lock ECU 34, a door mirror ECU 35 and the like.

To the microcomputer 142, a motion sensor 144 (such as a radio wave sensor) for monitoring the periphery of the vehicle M (e.g. within the range of about 0-1 m), an indicator 38, an audible alarm generator 39 and a camera 145 for taking pictures of the periphery of the vehicle M are connected. In addition, the microcomputer 142 is connected to a microcomputer 102 of multimedia equipment 101 so that data can be exchanged between the microcomputers 142 and 102. Here, the multimedia equipment 101 has a hard disk 103, in which data of various types can be stored.

Figure 24:
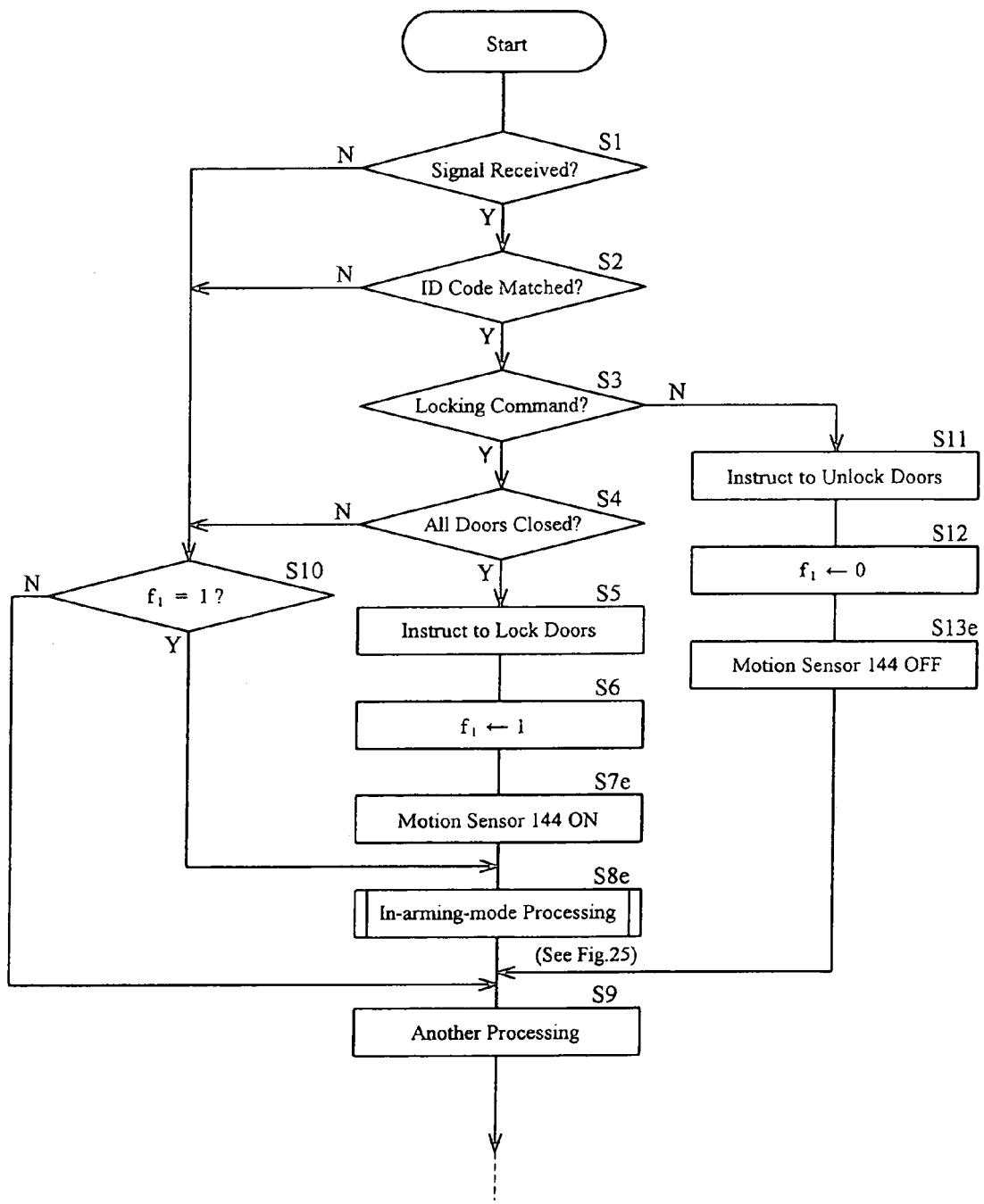
FIG. 24 is a flow chart showing the processing operation performed by a microcomputer in the monitoring device according to the eighth embodiment.

The main operation ⑧ performed by the microcomputer 142 in the monitoring device according to the eighth embodiment is described below by reference to a flow chart shown in FIG. 24. Here, since the main operation ⑧ is similar to the main operation ① performed by the microcomputer 22 in the antitheft device 21 except for Steps 7, 8 and 13, only different Steps 7e, 8e (see FIG. 25) and 13e are described below. In Step 7e, the processing to actuate the motion sensor 144 is conducted, while in Step 13e, the processing to end the operation of the motion sensor 144 is conducted.

Figure 25:
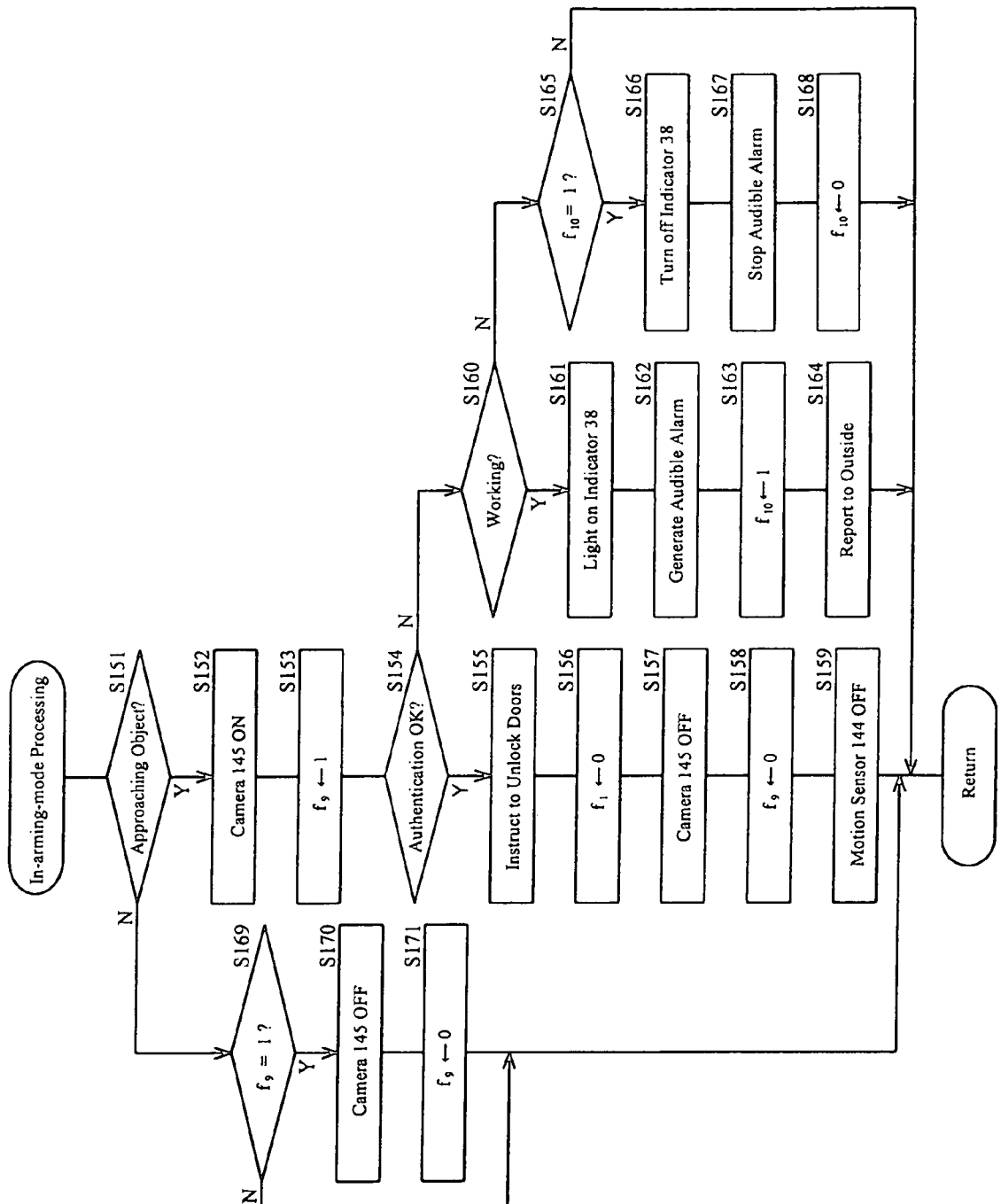
FIG. 25 is a flow chart showing the processing operation performed by the microcomputer in the monitoring device according to the eighth embodiment.

The 'in-arming-mode processing' operation ⑧-a performed by the microcomputer 142 in the monitoring device 141 according to the eighth embodiment is described below by reference to a flow chart shown in FIG. 25. First, whether or not there is an approaching object T toward the vehicle M is judged based on information obtained from the motion sensor 144 (Step 151). When it is judged that there is an approaching object T toward the vehicle M, the camera 145 is switched on so as to start taking pictures (Step 152), and a flag $f_9$ indicating that the camera 145 was switched on is changed to 1 (Step 153).

Based on pictorial information obtained from the camera 145 and the information concerning the face stored in the face information storage section 143, whether or not the approaching object T is the authorized user of the vehicle M is judged (Step 154). When it is judged that the approaching object T is the authorized user thereof (or biometric authentication could be obtained), by outputting a door unlocking instruction signal to the body ECU 29, the doors are unlocked (Step 155). By turning the flag $f_1$ to 0, the arming mode is canceled (Step 156). The camera 145 is switched off (Step 157), the flag $f_9$ is returned to 0 (Step 158), the motion sensor 144 is switched off (Step 159) and the processing operation ⑧-a is ended.

Figure 26A:
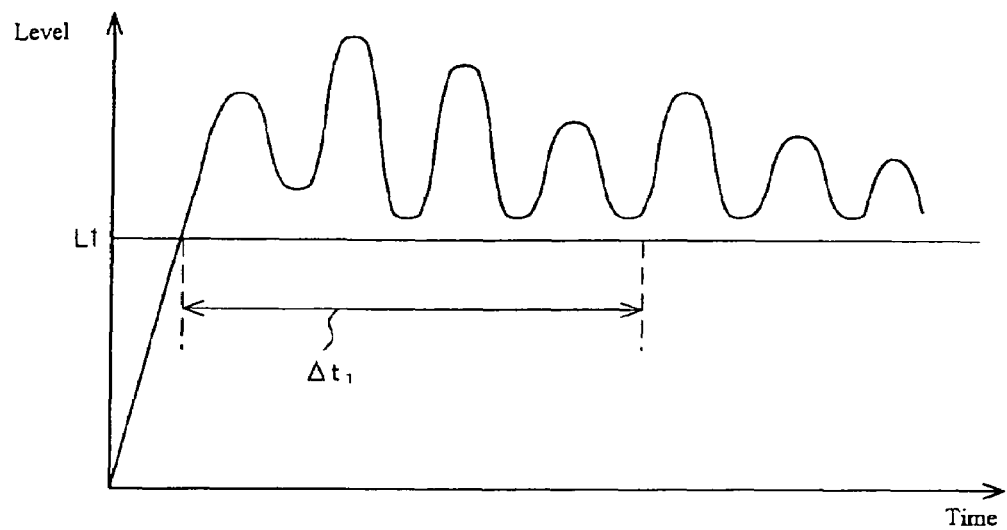
FIGS. 26(a) and 26(b) are diagrams showing an example of a signal waveform detected by a motion sensor.
Figure 26B:
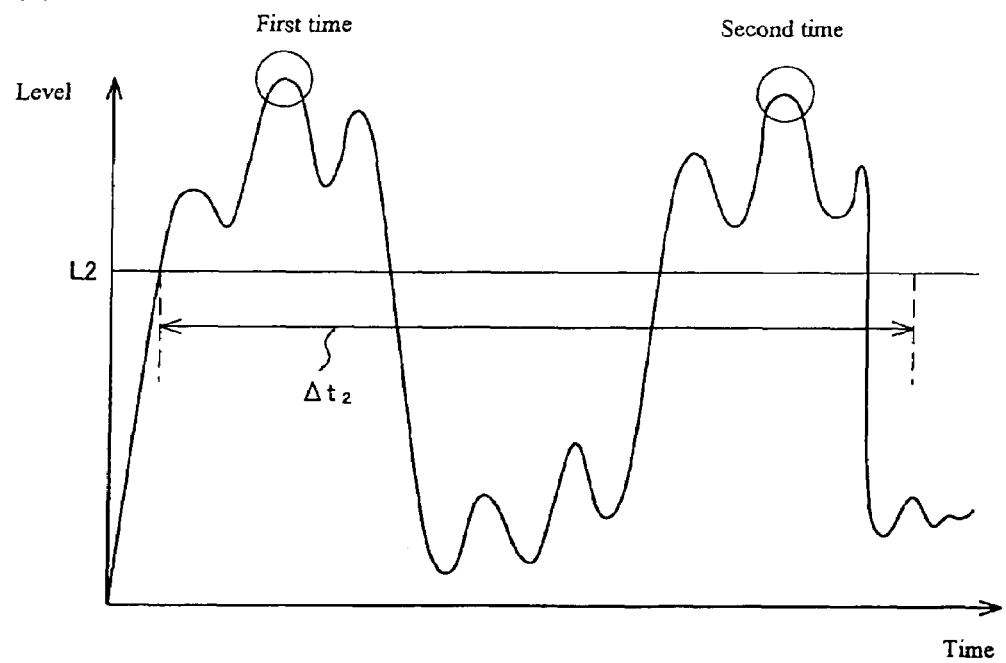

On the other hand, when it is judged that the approaching object T is not the authorized user of the vehicle M, whether or not the approaching object T is doing some activity (or producing some suspicious movement) around the vehicle M is judged based on information obtained from the motion sensor 144 (Step 160). For example, when a period of time detecting a signal at a predetermined level L1 or higher is a prescribed time $\Delta t_1$ or longer as shown in FIG. 26($a$), or when a signal at a predetermined level L2 or higher is detected given times or more within a prescribed time $\Delta t_2$ as shown in FIG. 26($b$), it is judged that the approaching object T is doing some activity such as hanging around the vehicle M.

When it is judged that the approaching object T is doing some activity around the vehicle M, the approaching object T is considered as a suspicious person. In order to threat the suspicious person, the indicator 38 is lit on (Step 161), the audible alarm generator 39 is controlled so as to generate an audible alarm (Step 162), a flag $f_{120}$ indicating the lighting-on of the indicator 38 and the like is turned to 1 (Step 163), and by outputting a theft occurrence signal to the multimedia equipment 101, it is reported to the outside (Step 164). A warning display may be shown on a display panel of the multimedia equipment 101.

On the other hand, when it is judged that the approaching object T is not doing any activity (for example, the approaching object T is just a passerby) in Step 160, whether the flag $f_{10}$ is 1 or not is judged (Step 165). When it is judged that the flag $f_{10}$ is 1, the indicator 38 is turned off (Step 166), the audible alarm generator 39 is controlled so as to stop generating the audible alarm (Step 167), the flag $f_{10}$ is returned to 0 (Step 168), and the processing operation ⑧-a is ended. On the other hand, when it is judged that the flag $f_{10}$ is not 1, the processing operation ⑧-a is ended at once.

When it is judged that there is no approaching object T toward the vehicle M in Step 151, whether the flag $f_9$ is 1 or not is judged (Step 169). When it is judged that the flag $f_9$ is 1, the camera 145 is switched off (Step 170), the flag $f_9$ is returned to 0 (Step 171), and the processing operation ⑧-a is ended. On the other hand, when it is judged that the flag $f_9$ is not 1, the processing operation ⑧-a is ended at once.

Using the monitoring device according to the above eighth embodiment, when the presence of an approaching object toward the vehicle M is detected, the camera 145 is switched on so as to be able to start taking pictures of the surround of the vehicle M, resulting in a reduced power consumption. Since the authentication of whether or not the approaching object T is the authorized user of the vehicle M can be conducted based on a picture of a face being a physical characteristic, a person who desires to use the vehicle M does not have to possess something special for authentication. Since the camera 145 can be used not only for authentication but also for detecting a suspicious person, a highly useful device can be realized.

In the monitoring device according to the above eighth embodiment, whether or not the approaching object T is doing some activity around the vehicle M (or whether the approaching object T is producing suspicious movements) is judged based on the information obtained from the motion sensor 144, but in a monitoring device according to another embodiment, the judgment may be made based on information obtained from a camera 145. The monitoring device according to the above eighth embodiment can detect a suspicious person and the like being present around the vehicle M; so that it can be used as an antitheft device as well.

In the antitheft devices or the monitoring devices according to the above fifth through eighth embodiments, the surround monitoring sensor 93 or 133, or the motion sensor 121 or 144 is switched on during stop of the vehicle M so as to monitor the surround of the vehicle M, but if the surround monitoring sensor 93 or 133, or the motion sensor 121 or 144 is operated at all times, the power consumption becomes high. Therefore, in another embodiment, these sensors may be operated intermittently, resulting in a reduced power consumption. Here, the transmitting time of a transmitting signal or the OFF time can be appropriately set by setting based on a maximum distance for monitoring (e.g. 30 m), the speed of an object to be monitored (e.g. 60 km/h) or the like. As a surround monitoring unit for monitoring the surround of the vehicle M, the surround monitoring sensor or the motion sensor is adopted here, but other sensors such as a camera may be adopted.

In still another embodiment, the timing of the intermittent operation may be adjusted based on the approaching situation of an approaching object T toward the vehicle M (such as the speed of the approaching object T, the distance thereof, the type thereof, for example, either a vehicle or a human). For example, when the approaching object T is not within a prescribed area, a sensor is intermittently operated, while the intermittent operation is stopped and the sensor is continuously operated when the approaching object T is within the prescribed area. Thus, it is possible to properly monitor the approaching object T with keeping a power consumption in balance.

In the antitheft devices or the monitoring devices according to the above fifth through eighth embodiments, the surround monitoring sensor 93 or 133, or the motion sensor 121 or 144 is switched on during stop of the vehicle M so as to monitor the surround of the vehicle M. The more sensors are mounted on the vehicle M, the more appropriately objects being present in every direction can be monitored, but the number of sensors which can be mounted on the vehicle M is limited. Therefore, it is difficult to properly monitor every approaching object being present around the vehicle M.

Accordingly, in another embodiment, when there are multiple approaching objects toward the vehicle M, the risk levels of these approaching objects are calculated and those sensors may be controlled so as to monitor with giving priority to an object at a higher risk level. Here, in the case of a construction where the monitoring of approaching objects toward the vehicle M is divided among multiple sensors, the above control may be conducted when there are multiple approaching objects in a monitoring area by a prescribed sensor. In other words, even if there are multiple approaching objects toward the vehicle M, the above control is not conducted when there is not more than one approaching object in the monitoring area by each sensor.

Figure 27:
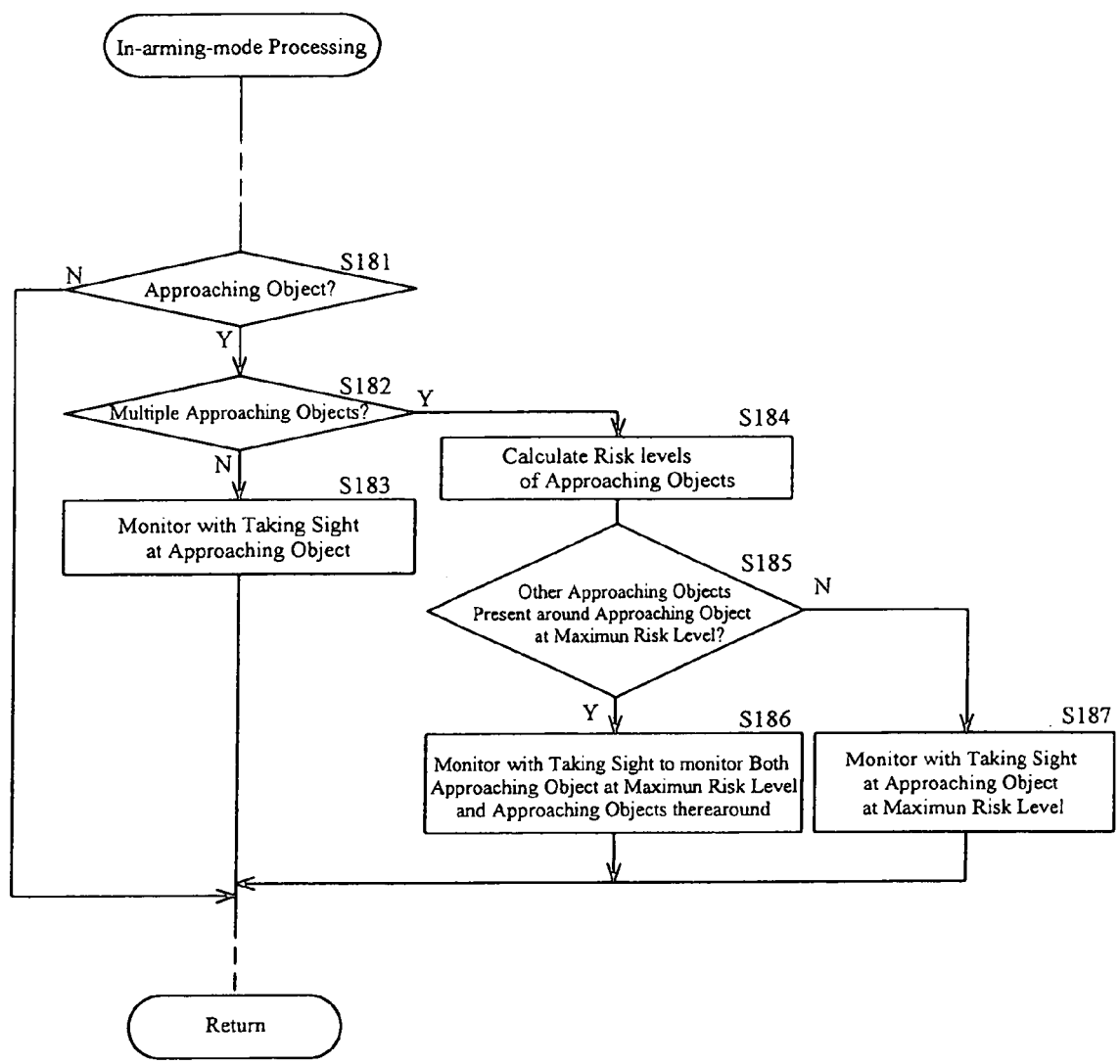
FIG. 27 is a flow chart showing the processing operation performed by a microcomputer in an antitheft device according to a ninth embodiment.
Figure 28:
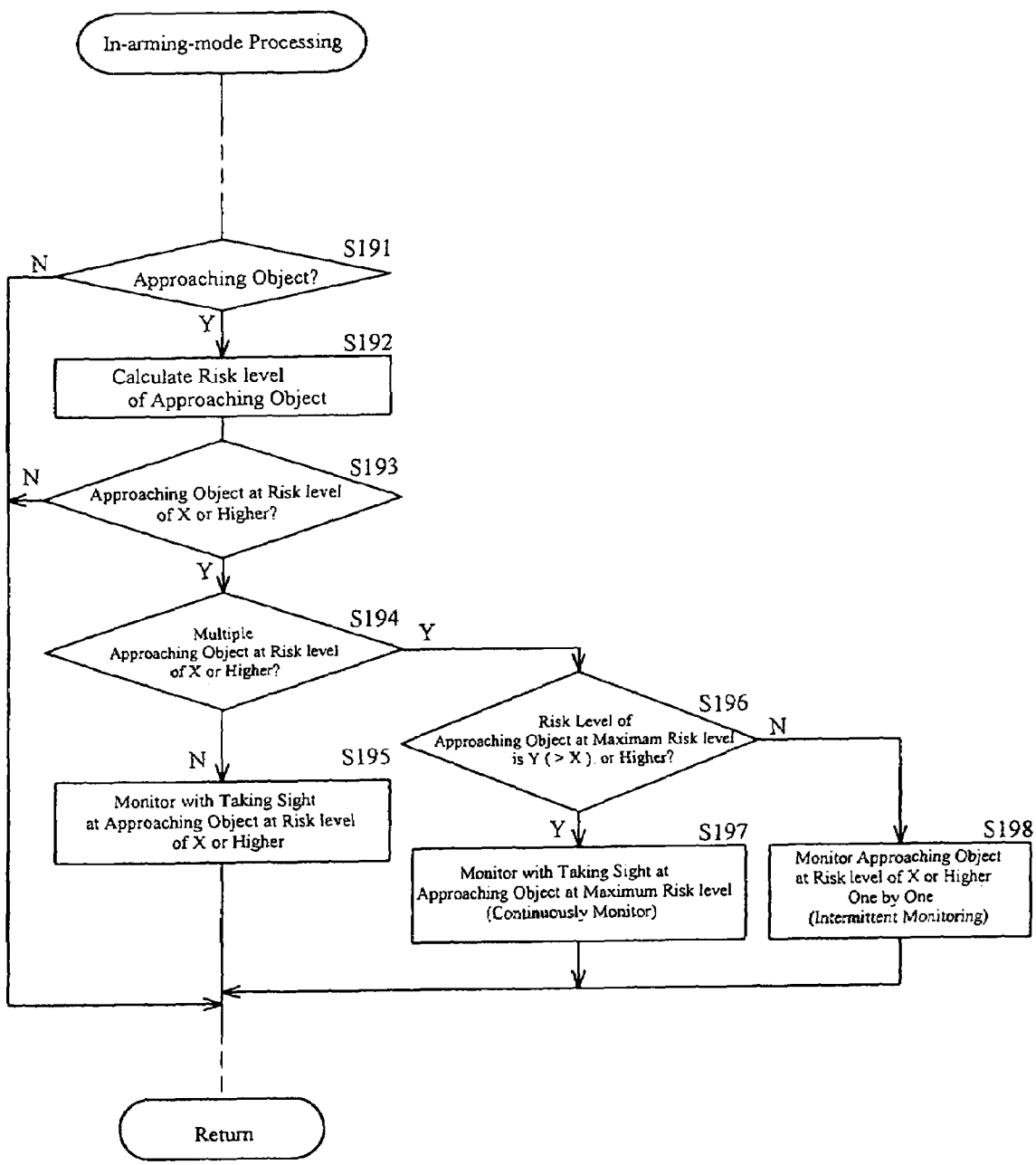
FIG. 28 is a flow chart showing the processing operation performed by a microcomputer in an antitheft device according to a tenth embodiment.
Figure 29:
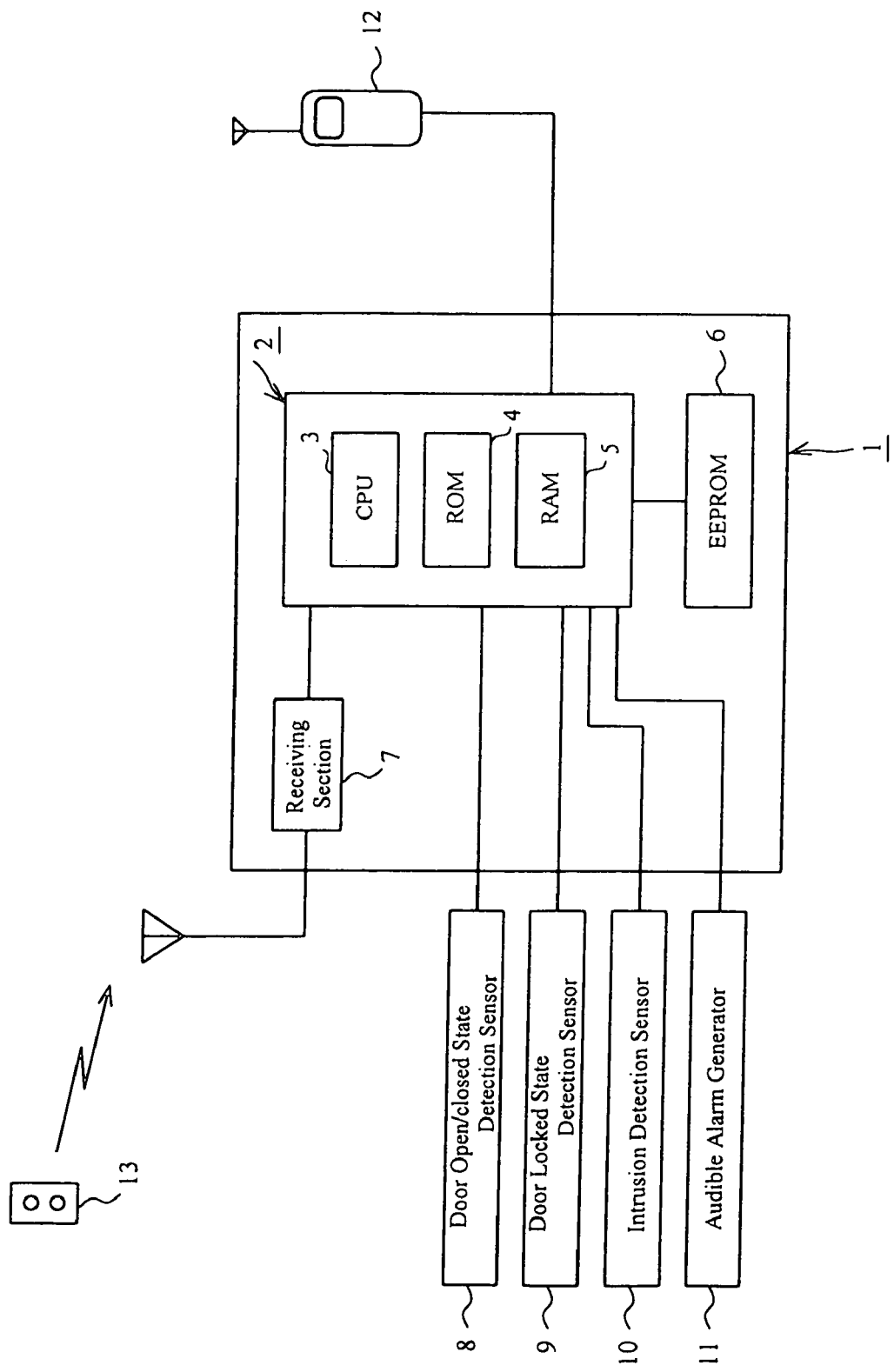
FIG. 29 is a block diagram schematically showing the principal part of an antitheft system comprising a conventional antitheft device.

Part of the processing operation of a microcomputer 91A or 91B in an antitheft device according to the above-mentioned ninth or tenth embodiment is described below by reference to a flow chart shown in FIG. 27 or 28, respectively. First, part of the 'in-arming-mode processing' operation performed by the microcomputer 91A in the antitheft device according to the ninth embodiment is described by reference to the flow chart shown in FIG. 27. Based on information obtained from the surround monitoring sensor 93, whether or not there is an approaching object T toward the vehicle M is judged (Step 181). When it is judged that there is an approaching object T toward the vehicle M, whether or not there are multiple approaching objects T is judged (Step 182). On the other hand, when it is judged that there is no approaching object T toward the vehicle M, the processing operation is ended at once.

When it is judged that multiple approaching objects T are not present, the surround monitoring sensor 93 is controlled so as to monitor with taking a sight at the only one approaching object T (Step 183). On the other hand, when it is judged that there are multiple approaching objects T, the risk levels of these approaching objects T are calculated (Step 184), and whether or not another approaching object $T_{min}$ is present around the approaching object $T_{max}$ at a maximum risk level is judged (Step 185).

Here, as a method for calculating the risk level of the approaching object T, a method is exemplified, wherein the distance from the vehicle M, the type of the approaching object T (a vehicle or a human), the approaching situation of the approaching object T (the speed thereof) and the like are found based on information obtained from the surround monitoring sensor 93, and the risk level is calculated using these parameters. For example, the closer to the vehicle M the approaching object T is, the higher its risk level is. A vehicle is at a higher risk level than a human. And the faster the approaching object T moves, the higher its risk level is.

When it is judged that another approaching object $T_{min}$ is present around the approaching object $T_{max}$, the surround monitoring sensor 93 is controlled so as to be able to monitor both the approaching object $T_{max}$ and the another approaching object $T_{min}$ present therearound (Step 186). On the other hand, when it is judged that no approaching object $T_{min}$ is present around the approaching object $T_{max}$, the surround monitoring sensor 93 is controlled so as to monitor with taking a sight at the approaching object $T_{max}$ (Step 187).

Part of the 'in-arming-mode processing' operation performed by the microcomputer 91 B in the antitheft device according to the tenth embodiment is described below by reference to the flow chart shown in FIG. 28. First, based on information obtained from the surround monitoring sensor 93, whether or not there is an approaching object T toward the vehicle M is judged (Step 191). When it is judged that there is an approaching object T toward the vehicle M, the risk level of the approaching object T is calculated (Step 192). On the other hand, when it is judged that there is no approaching object T toward the vehicle M, the processing operation is ended at once.

Whether or not there is an approaching object T at a risk level of X or higher is judged based on the calculated risk level (Step 193). When it is judged that there is an approaching object T at a risk level of X or higher, whether or not there are multiple approaching objects T at a risk level of X or higher is judged (Step 194). On the other hand, when it is judged that there is no approaching object T at a risk level of X or higher, the processing operation is ended at once.

When it is judged that multiple approaching objects T at a risk level of X or higher are not present, the surround monitoring sensor 93 is controlled so as to monitor with taking a sight at the only one approaching object T at a risk level of X or higher (Step 195). On the other hand, when it is judged that there are multiple approaching objects T at a risk level of X or higher, whether or not the risk level of the approaching object $T_{max}$ at a maximum risk level is a level Y (>X) or higher is judged (Step 196).

When it is judged that the risk level of the approaching object $T_{max}$ is the level Y or higher, the surround monitoring sensor 93 is controlled so as to continuously monitor with taking a sight at the approaching object $T_{max}$ (Step 197). On the other hand, when it is judged that the risk level of the approaching object $T_{max}$ is lower than the level Y, the surround monitoring sensor 93 is controlled so as to monitor the approaching objects T at a risk level of X or higher one by one (Step 198).

Using the antitheft devices according to the above ninth and tenth embodiments, the risk levels of the approaching objects T are calculated and an approaching object at a higher risk level is given a higher priority to be monitored. Therefore, since the monitored subjects are differentiated, it is possible to appropriately monitor the approaching objects T even if a lot of surround monitoring sensors are not mounted. Here, only a case where the approaching objects to be monitored are differentiated by controlling the surround monitoring sensors was described, but the differentiation of the approaching objects to be monitored is not limited to the case of using the surround monitoring sensors. Using other monitoring units such as cameras for taking pictures of the surround of the vehicle M being controlled in the same manner as the above, the approaching objects to be monitored can be differentiated.

What is claimed is:

1. An antitheft device for protecting a vehicle from theft, comprising:
    a first approaching object judgment section for judging whether or not there is an approaching object toward the vehicle based on information obtained from a surround monitoring unit for monitoring the surround of the vehicle;
    a first suspicious person judgment section for judging whether or not the approaching object toward the vehicle is a suspicious person based on information obtained from a periphery monitoring unit for monitoring the periphery and/or the inside of the vehicle when it is judged that there is an approaching object toward the vehicle by the first approaching object judgment section; and
    a first processing section for conducting a first predetermined processing when the approaching object toward the vehicle is judged to be a suspicious person by the first suspicious person judgment section.

2. An antitheft device according to claim 1, comprising a monitoring start controller for allowing the periphery monitoring unit to start monitoring when it is judged that there is an approaching object toward the vehicle by the first approaching object judgment section.

3. An antitheft device according to claim 1, comprising:
    a first stolen state judgment section for judging whether or not the vehicle has been in a stolen state based on the judgment result by the first suspicious person judgment section and information obtained from a theft detector for detecting a theft of the vehicle; and
    a second processing section for conducting a second predetermined processing when it is judged that the vehicle has been in a stolen state by the first stolen state judgment section.

4. An antitheft device for protecting a vehicle from theft, comprising:
    an approaching object judgment section for judging whether or not there is an approaching object toward the vehicle based on information obtained from a periphery monitoring unit for monitoring the periphery and/or the inside of the vehicle;
    a monitored subject controller which allows detection of the presence or absence of a possibility that the approaching object is a human to be included in subjects to be monitored by the periphery monitoring unit when it is judged that there is an approaching object toward the vehicle by the approaching object judgment section;
    a suspicious person judgment section for judging whether or not the approaching object is a suspicious person based on the judgment result by the approaching object judgment section and information obtained from the periphery monitoring unit whose subjects to monitor include the detection of the presence or absence of a possibility that the approaching object is a human; and
    a processing section for conducting a predetermined processing when the approaching object toward the vehicle is judged to be a suspicious person by the suspicious person judgment section.

5. An antitheft device according to claim 4, wherein the monitored subject controller controls the periphery monitoring unit so as to be able to detect whether or not the approaching object is breathing.

6. An antitheft device according to claim 4, wherein:
the periphery monitoring unit is a body temperature detector;
the approaching object judgment section judges whether or not there is an approaching object toward the vehicle from the temperature conditions around and/or inside the vehicle based on information obtained from the body temperature detector being the periphery monitoring unit; and
the monitored subject controller controls the periphery monitoring unit so as to be able to detect whether or not the approaching object is producing motions specific to a suspicious person.

7. An antitheft device for protecting a vehicle from theft, comprising:
a suspicious person judgment section for judging whether or not an approaching object toward the vehicle is a suspicious person from judging whether or not the motions of the approaching object are motions specific to a suspicious person based on pictorial data obtained from a picture-taking unit for taking pictures of the periphery of the vehicle; and
a processing section for conducting a predetermined processing when the approaching object toward the vehicle is judged to be a suspicious person by the suspicious person judgment section.

8. An antitheft device for protecting a vehicle from theft, comprising:
a stolen state judgment section for judging whether or not the vehicle has been in a stolen state; and
a processing section for conducting a predetermined processing when it is judged that the vehicle has been in a stolen state by the stolen state judgment section, wherein:
the stolen state judgment section judges whether or not the vehicle has been in a stolen state based on information obtained from a tilting detector for detecting the degree of tilt of the vehicle.

9. An antitheft device for protecting a vehicle from theft, comprising:
a stolen state judgment section for judging whether or not the vehicle has been in a stolen state; and
a processing section for conducting a predetermined processing when it is judged that the vehicle has been in a stolen state by the stolen state judgment section, wherein:
the stolen state judgment section judges whether or not the vehicle has been in a stolen state based on information obtained from an impact detector for detecting the degree of an impact applied to the vehicle.

10. An antitheft device according to claim 8, wherein the stolen state judgment section judges whether or not the vehicle has been in a stolen state based on information obtained from the tilting detector or the impact detector and information about the velocity of the vehicle.

11. An antitheft device for protecting a vehicle from theft, comprising:
a biometric information storage section for storing biometric information about the body of an authorized user of the vehicle;
a first authorized user judgment section for judging whether or not a person desiring to use the vehicle is the authorized user of the vehicle based on information obtained from a biometric information acquisition unit for acquiring information about the body of the person desiring to use the vehicle and the biometric information stored in the biometric information storage section; and
a processing section for conducting a predetermined processing based on the judgment result by the first authorized user judgment section.

12. An antitheft device according to claim 11, comprising:
an approaching object judgment section for judging whether or not there is an approaching object toward the vehicle based on information obtained from a periphery monitoring unit for monitoring the periphery and/or the inside of the vehicle; and
a unit starting controller for starting a unit used for biometric authentication based on the judgment result by the approaching object judgment section.

13. An antitheft device according to claim 11, wherein the processing section cancels an arming mode for being on the alert for vehicle theft and/or at least unlocks a driver's seat side door when the person desiring to use the vehicle is judged to be the authorized user of the vehicle by the first authorized user judgment section.

14. An antitheft device according to claim 11, wherein the processing section inhibits the use of all of or part of units mounted on the vehicle, or all of or part of functions of the units when the person desiring to use the vehicle is judged not to be the authorized user of the vehicle by the first authorized user judgment section.

15. An antitheft device according to claim 11, wherein:
the first authorized user judgment section judges whether or not the person desiring to use the vehicle is the authorized user of the vehicle based on at least one item of two or more items of biometric information about the body; and
the processing section permits the use of all of or part of units mounted on the vehicle, or all of or part of functions of the units when the person desiring to use the vehicle is judged to be the authorized user of the vehicle by the first authorized user judgment section.

16. A monitoring device for monitoring a vehicle to detect the occurrence of abnormal conditions of the vehicle, comprising:
an approaching object judgment section for judging whether or not there is an approaching object toward the vehicle based on information obtained from a surround monitoring unit for monitoring the surround of the vehicle; and
a picture-taking start controller for allowing a picture-taking unit for taking pictures of the surround of the vehicle to start taking pictures based on the judgment result by the approaching object judgment section.

17. A monitoring device according to 16, comprising:
an another vehicle judgment section for judging whether or not the approaching object is another vehicle, wherein:
the picture-taking start controller allows the taking-picture unit to start taking pictures when the approaching object is judged to be another vehicle by the another vehicle judgment section.

18. A monitoring device according to claim 16, comprising:
a first approaching situation calculation section for finding the approaching situation of the approaching object toward the vehicle based on information obtained from the surround monitoring unit and/or information obtained from pictorial data taken by the picture-taking unit; and
a picture-taking frequency controller for controlling the frequency of picture taking by the picture-taking unit based on the approaching situation of the approaching object toward the vehicle found by the first approaching situation calculation section.

19. A monitoring device according to claim 18, wherein:
the first approaching situation calculation section judges whether or not the approaching object has been within a prescribed area of the surround of the vehicle based on the information obtained from the surround monitoring unit and/or the information obtained from pictorial data taken by the picture-taking unit; and
the picture-taking frequency controller controls the picture-taking unit so that the frequency of picture taking becomes higher when it is judged that the approaching object has been within the prescribed area by the first approaching situation calculation section.

20. A monitoring device for monitoring a vehicle to detect the occurrence of abnormal conditions of the vehicle, comprising:
an approaching object judgment section for judging whether or not there is an approaching object toward the vehicle based on information obtained from a periphery monitoring unit for monitoring the periphery and/or the inside of the vehicle; and
a picture-taking start controller for allowing a picture-taking unit for taking pictures of the periphery of the vehicle to start taking pictures based on the judgment result by the approaching object judgment section.

21. A monitoring device according to claim 20, comprising:
a pictorial information storage section for storing information about a picture showing a physical characteristic such as a face of an authorized user of the vehicle;
an authorized user judgment section for judging whether or not the approaching object is the authorized user of the vehicle based on pictorial information about the approaching object toward the vehicle obtained from the picture-taking unit and the pictorial information stored in the pictorial information storage section; and
a processing section for conducting a seventh predetermined processing based on the judgment result by the authorized user judgment section.

22. A monitoring device according to claim 21, wherein the processing section cancels an arming mode for being on the alert for vehicle theft and/or at least unlocks a driver's seat side door when the approaching object is judged to be the authorized user of the vehicle by the authorized user judgment section.

23. A monitoring device according to claim 21, comprising:
a first at-work judgment section for judging whether or not the approaching object is working around the vehicle based on information obtained from the periphery monitoring unit, wherein:
the processing section conducts processing to be conducted in the case of a suspicious person being present around the vehicle, when the approaching object is judged not to be the authorized user by the authorized user judgment section and it is judged that the approaching object is working around the vehicle by the first at-work judgment section.

24. A monitoring device according to claim 21, comprising:
an at-work judgment section for judging whether or not the approaching object is working around the vehicle based on pictorial information about the approaching object toward the vehicle obtained from the picture-taking unit, wherein:
the processing section conducts processing to be conducted in the case of a suspicious person being present around the vehicle, when the approaching object is judged not to be the authorized user by the authorized user judgment section and it is judged that the approaching object is working around the vehicle by the at-work judgment section.

25. A monitoring device for monitoring a vehicle to detect the occurrence of abnormal conditions of the vehicle, comprising:
an approaching situation calculation section for finding the approaching situation of the approaching object toward the vehicle based on information obtained from a surround monitoring unit for monitoring the surround of the vehicle; and
a monitoring frequency controller for controlling the frequency of monitoring by the surround monitoring unit based on the approaching situation of the approaching object toward the vehicle found by the approaching situation calculation section.

26. A monitoring device according to claim 25, wherein:
the approaching situation calculation section judges whether or not the approaching object has been within a prescribed area of the surround of the vehicle based on the information obtained from the surround monitoring unit; and
the monitoring frequency controller controls the surround monitoring unit so that the frequency of monitoring becomes higher when it is judged that the approaching object has been within the prescribed area by the approaching situation calculation section.

27. A monitoring device for monitoring a vehicle to detect the occurrence of abnormal conditions of the vehicle, comprising:
a risk level calculation section for calculating the risk level of an approaching object toward the vehicle; and
a monitoring priority controller for controlling a surround monitoring unit so as to monitor an approaching object at a higher risk level with priority given based on the risk levels calculated by the risk level calculation section when there are multiple approaching objects toward the vehicle.

28. A monitoring device according to claim 27, wherein the risk level calculation section calculates the risk level of the approaching object based on at least one or more parameters from among the distance from the vehicle, the type of the approaching object and the approaching situation of the approaching object.

29. A monitoring device according to claim 27, wherein the monitoring priority controller controls the surround monitoring unit so that approaching objects at a first prescribed risk level or higher are included in subjects to be monitored.

30. A monitoring device according to claim 27, wherein the monitoring priority controller controls the surround monitoring unit so that an approaching object at a maximum risk level is given top priority to be monitored when the risk level of the approaching object is a prescribed risk level or higher.

31. An antitheft system, comprising:
an antitheft device, having;
a stolen state judgment section for judging whether or not a vehicle has been in a stolen state; and
an processing section for conducting an predetermined processing when it is judged that the vehicle has been in a stolen state by the stolen state judgment section; and
a controller for controlling electronic equipment mounted on the vehicle, wherein:
the processing section conducts processing including outputting of a theft signal to the controller; and
the controller sets the electronic equipment to be in abnormal conditions when receiving the theft signal.

32. An antitheft system according to claim 31, wherein the controller controls the switch-on/-off of lamps, the controller prohibiting the switch-on of the lamps when receiving the theft signal.

33. An antitheft system according to claim 31, wherein the controller controls the operation of meters, the controller prohibiting the operation of the meters when receiving the theft signal.

34. An antitheft system, comprising:
an antitheft device, having:
an arming mode setting section for setting an arming mode for being on the alert for vehicle theft;
an arming mode canceling section for canceling the arming mode;
a stolen state judgment section for judging whether or not the vehicle has been in a stolen state while the arming mode has been set; and
a processing section for conducting a predetermined processing when it is judged that the vehicle has been in a stolen state by the stolen state judgment section; and
a controller for controlling electronic equipment mounted on the vehicle, wherein:
the antitheft device comprises an arming signal output section for outputting an arming signal to the controller when predetermined conditions are met;
the controller controls the electronic equipment so as to realize a state of inconvenience for driving the vehicle when receiving the arming signal; and
the predetermined conditions include that the arming mode has been set by the arming mode setting section.

35. An antitheft system according to claim 34, wherein the predetermined conditions include that a prescribed time has elapsed after setting of the arming mode.

36. An antitheft system according to claim 34, wherein:
the antitheft device comprises a cancel signal output section for outputting a cancel signal to the controller when the arming mode is canceled by the arming mode canceling section; and
the controller controls the electronic equipment so as to clear the state of inconvenience for driving the vehicle when receiving the cancel signal.

37. An antitheft system according to claim 34, wherein the controller controls seats, the controller moving a seat position forward or tilting a backrest of a seat toward the front when receiving the arming signal.

38. An antitheft system according to claim 34, wherein the controller smokes windows, the controller smoking the windows when receiving the arming signal.

39. An antitheft system according to claim 34, wherein the controller controls an engine or a transmission, the controller locking a gear or restricting gear shifting when receiving the arming signal.

40. An antitheft system according to claim 34, wherein the controller controls the locked state or free state of a steering wheel, the controller making the steering wheel in the locked state or free state when receiving the arming signal.

41. An antitheft system according to claim 34, wherein the controller controls the opening/closing of door mirrors, the controller prohibiting the opening operation of the door mirrors when receiving the arming signal.

42. An antitheft system according to claim 34, wherein the controller controls battery charging, the controller prohibiting the battery charging when receiving the arming signal.

* * * * *